United States Patent [19]

Aoki et al.

[11] Patent Number: 5,719,970
[45] Date of Patent: Feb. 17, 1998

[54] IMAGE PROCESSING METHOD AND DEVICE

[75] Inventors: Mikio Aoki; Takashi Nitta, both of Suwa, Japan

[73] Assignee: Seiko Epson Corporation, Tokyo, Japan

[21] Appl. No.: 585,583

[22] Filed: Jan. 16, 1996

Related U.S. Application Data

[63] Continuation-in-part of Ser. No. 499,537, Jul. 7, 1995.

[30] Foreign Application Priority Data

Jul. 8, 1994 [JP] Japan ............................ 6-157451
Jan. 13, 1995 [JP] Japan ............................ 7-0044881

[51] Int. Cl.$^6$ .................................................. H04N 1/024
[52] U.S. Cl. ........................... 382/313; 382/314; 358/473
[58] Field of Search ............................... 382/313, 314, 382/321, 324; 358/473; 235/472

[56] References Cited

U.S. PATENT DOCUMENTS

| | | | |
|---|---|---|---|
| 4,731,668 | 3/1988 | Satomura et al. | 382/313 |
| 4,809,351 | 2/1989 | Abramovitz et al. | 382/313 |
| 4,947,261 | 8/1990 | Ishikawa et al. | 382/313 |
| 4,947,345 | 8/1990 | Paradise et al. | 358/442 |
| 4,949,391 | 8/1990 | Faulkerson et al. | 382/313 |
| 5,023,922 | 6/1991 | Abramovitz et al. | 382/313 |
| 5,063,508 | 11/1991 | Yamada et al. | 382/313 |
| 5,532,825 | 7/1996 | Lim et al. | 358/474 |

FOREIGN PATENT DOCUMENTS

| | | |
|---|---|---|
| 56-108175 | 8/1981 | Japan . |
| 59-8088 | 1/1984 | Japan . |
| 60 83462 | 5/1985 | Japan . |

OTHER PUBLICATIONS

U.S. Patent Application Serial No. 08/499,537, filed Jul. 7, 1995 entitled *Information Input Device and Information Input Method*, Attorney's Docket No. P2254a.

U.S. Patent Application Serial No. 08/508,860, filed Jul. 23, 1995, entitled *An Image Metod And Apparatus*, Attorney's Docket No. P2255a.

*Primary Examiner*—Thomas L. Stoll
*Attorney, Agent, or Firm*—W. Glen Johnson

[57] ABSTRACT

A two-line sensor type image input and processing apparatus and method for accurately determining the current scan state, start of scanning and end of scanning events, as well as estimating scanning speed corresponding thereto, and for performing high precision distortion correction on the basis of these estimated scanning speeds. This image input and processing method or apparatus may comprise 1) overall speed judgment that judges the scanning speed based on feature data from the two sensors; 2) stop state judgment that judges whether or not the image input member is in a scan stop state with the input switch for facilitating image data input in the ON state; 3) pre/post stop state speed judgment that judges the scanning speed before and after the scan stop state based on the scan stop time judged by stop state judgment and the overall scanning speed judged by overall speed judgment; 4) scan start judgment that judges whether or not the image input member started scanning; 5) scan start speed judgment that judges the scanning speed at scan start; 6) scan end judgment that judges whether or not the image input member has ended scanning; 7) scan end speed judgment that judges the scanning speed at scan end; 8) ring buffer write end position updating that uses a ring buffer as the buffer for storing image data and updates the write end address in the ring buffer; and means for correcting images based on speed and start/stop information generated from these various speed judgment devices or processes.

55 Claims, 34 Drawing Sheets

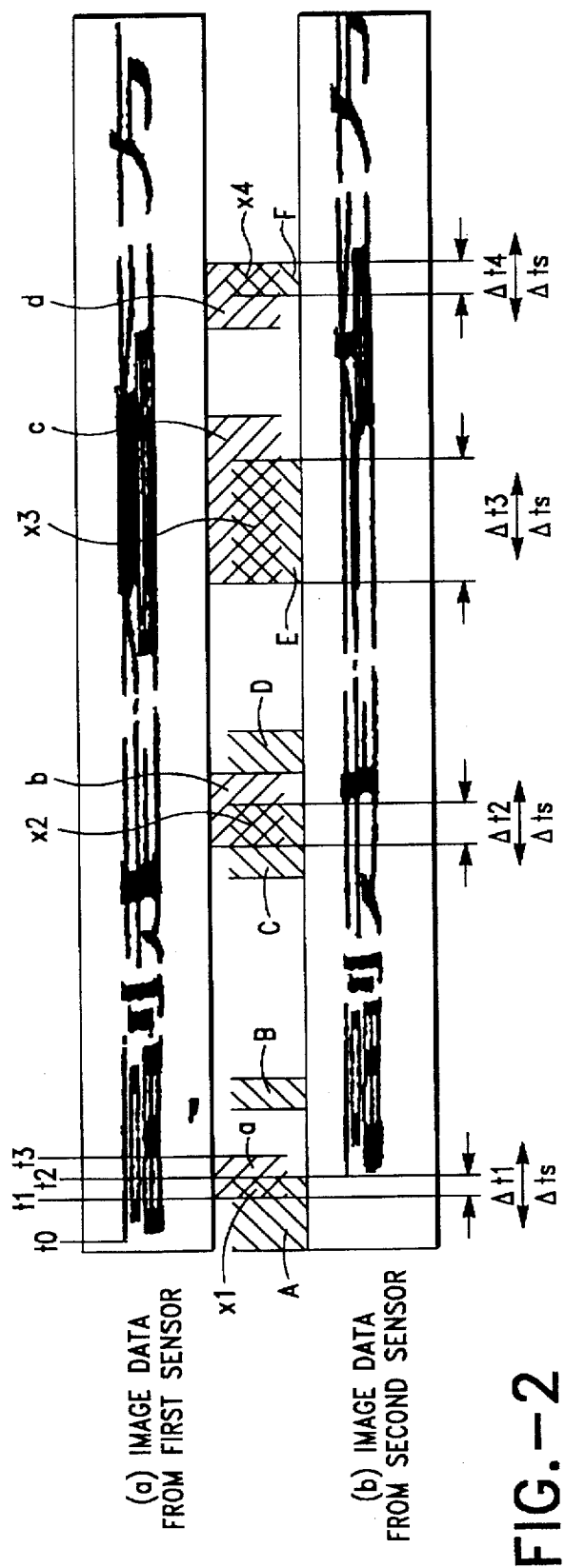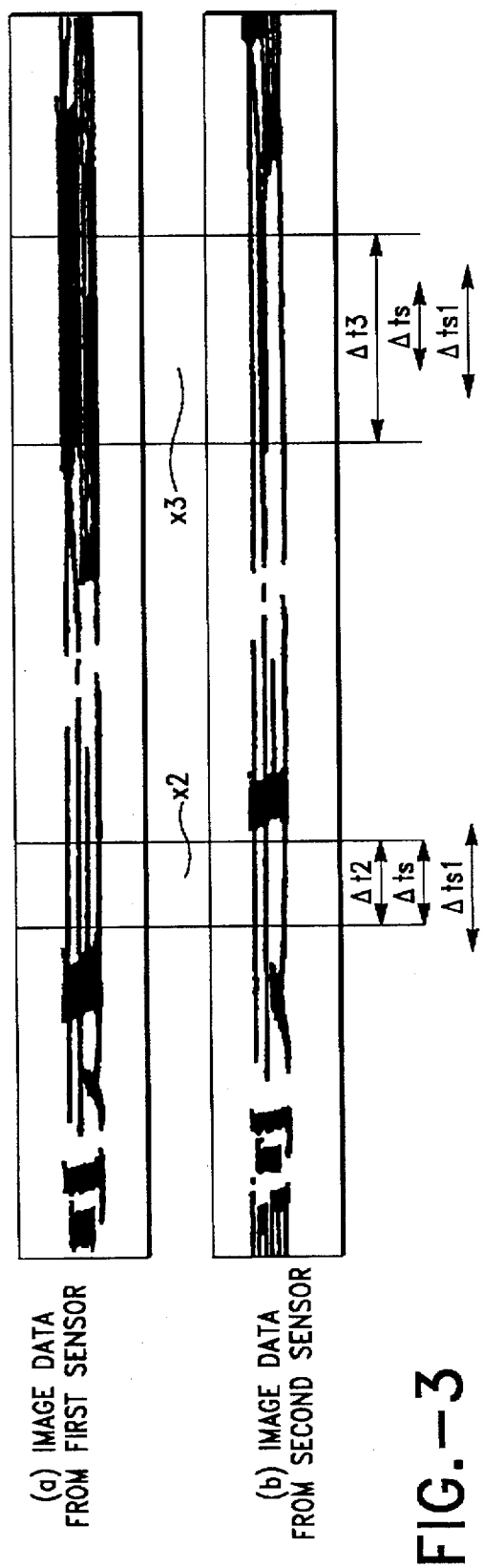
FIG.-2
FIG.-3

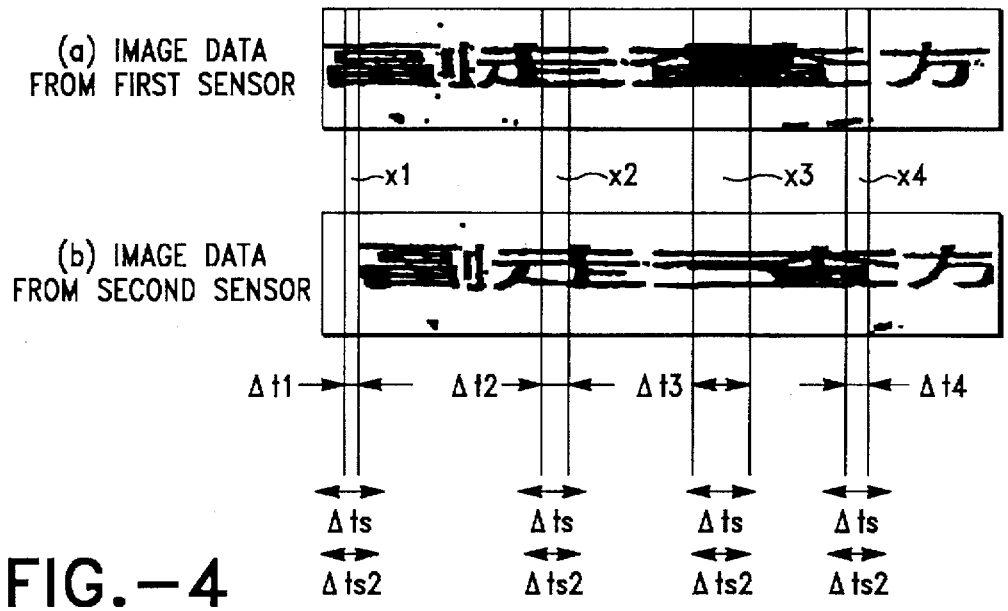
FIG.−4
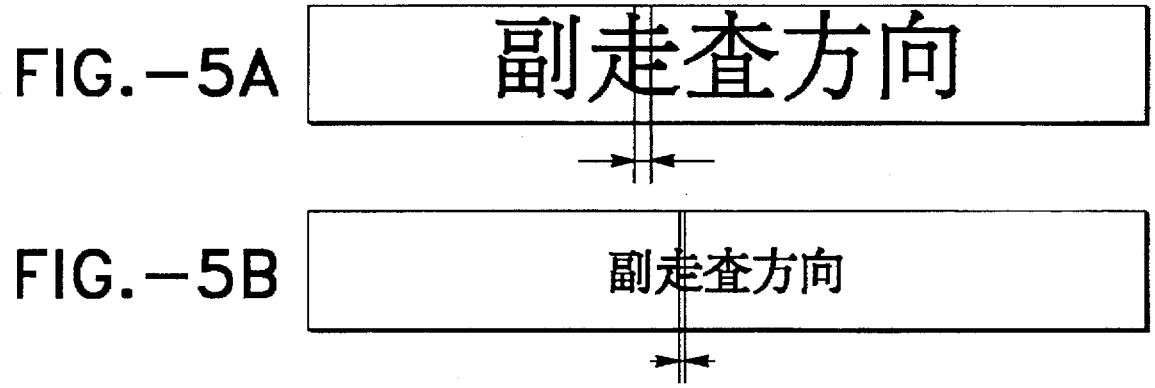
FIG.−5A
FIG.−5B

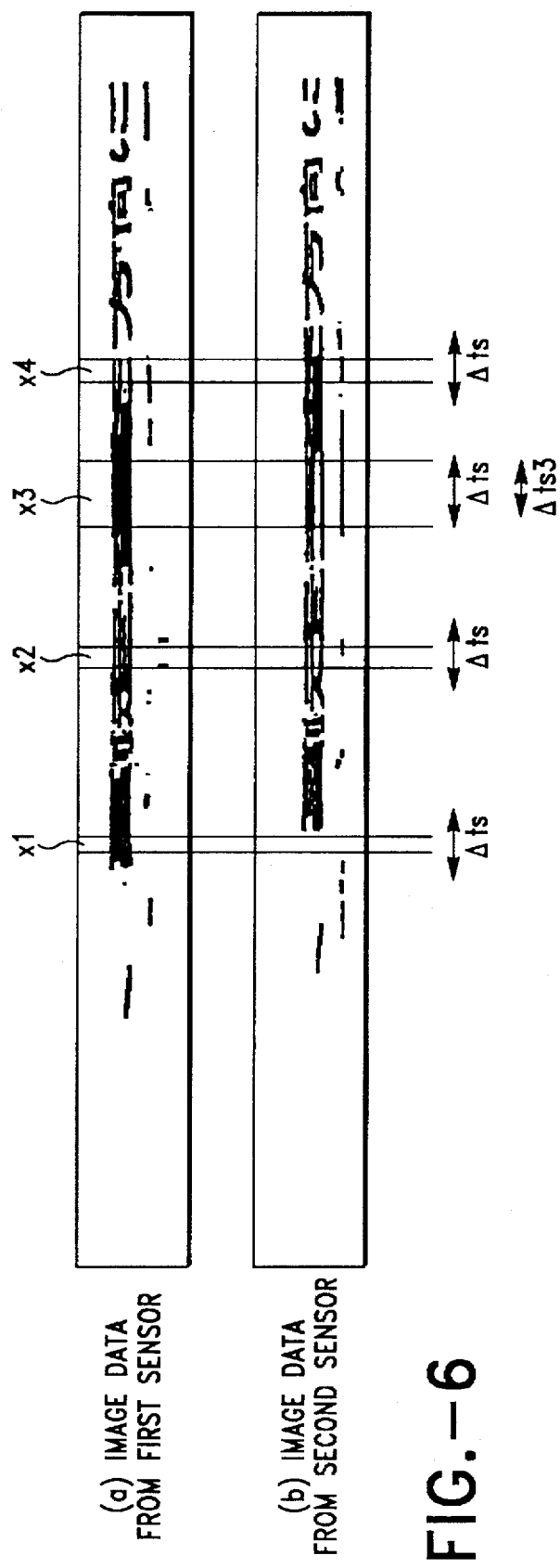
(a) IMAGE DATA FROM FIRST SENSOR
(b) IMAGE DATA FROM SECOND SENSOR
FIG.−6
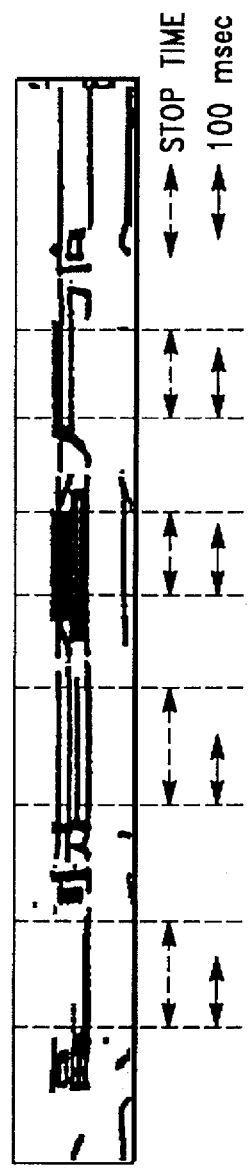
FIG.−7

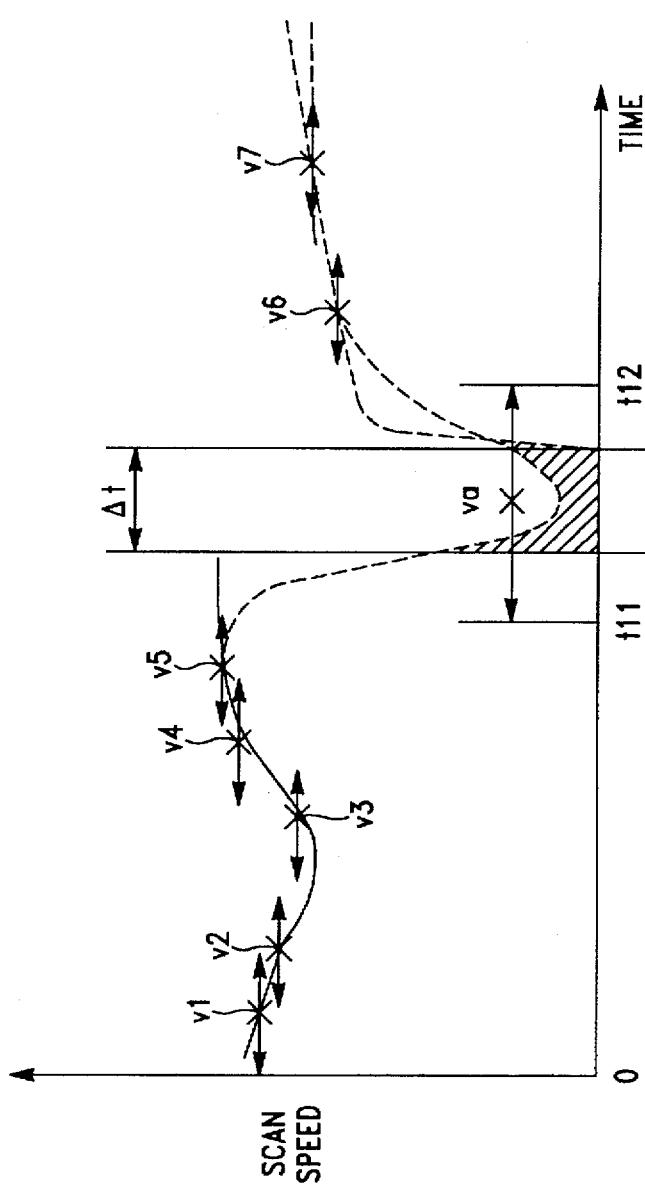
FIG.—8A
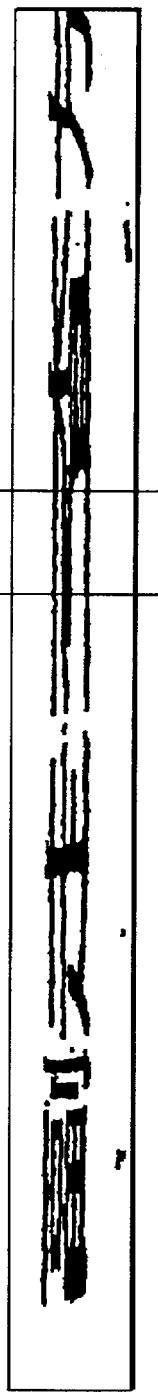
FIG.—8B

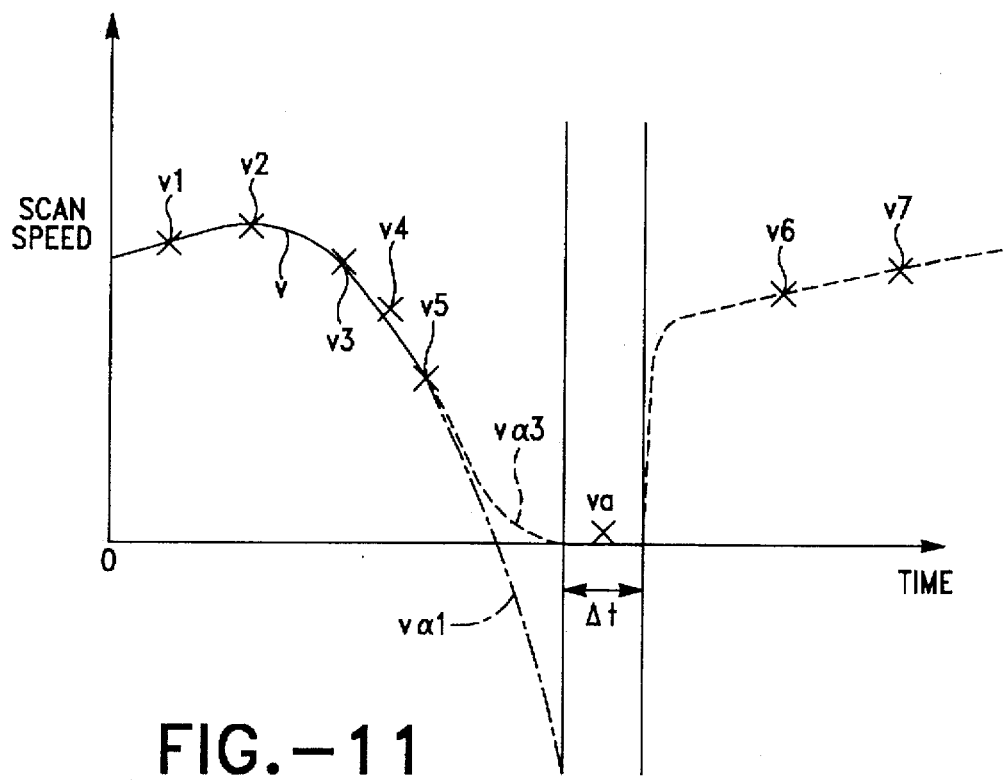
FIG.−11
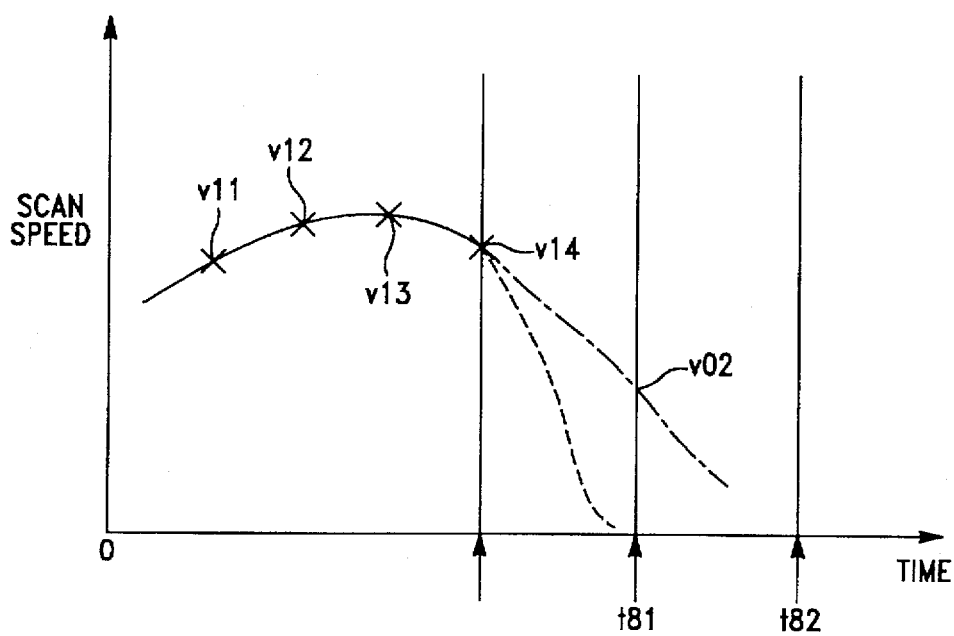
FIG.−29

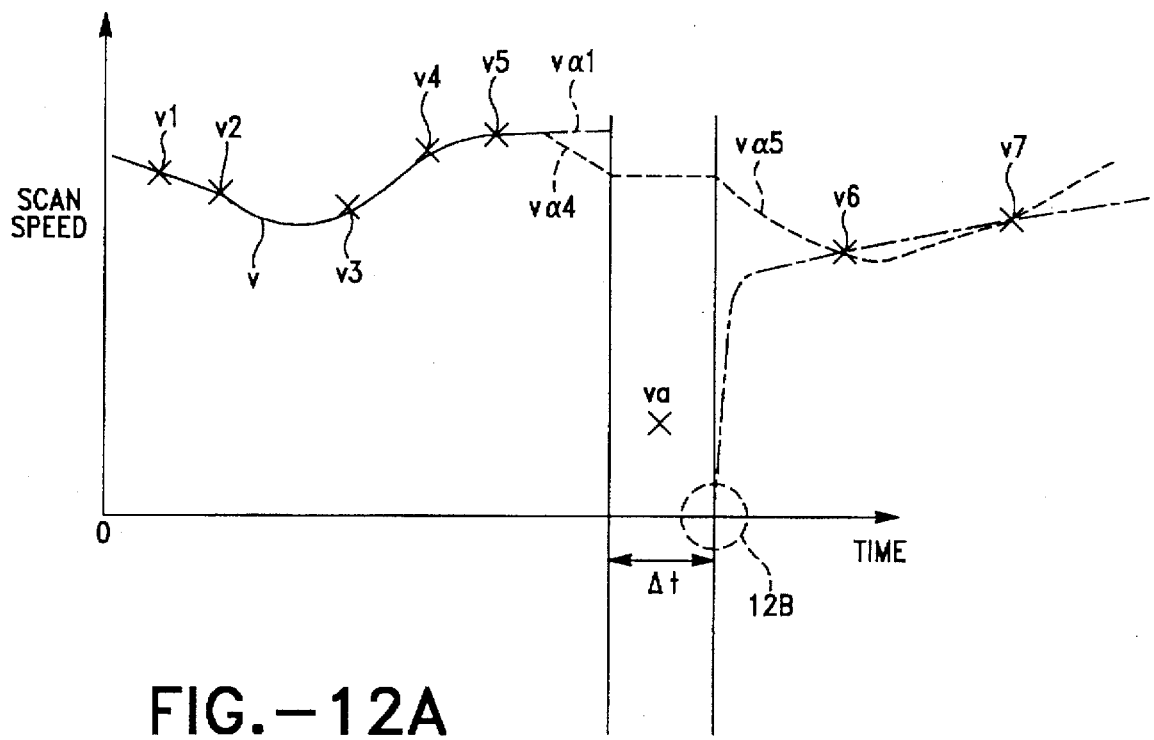
FIG.—12A
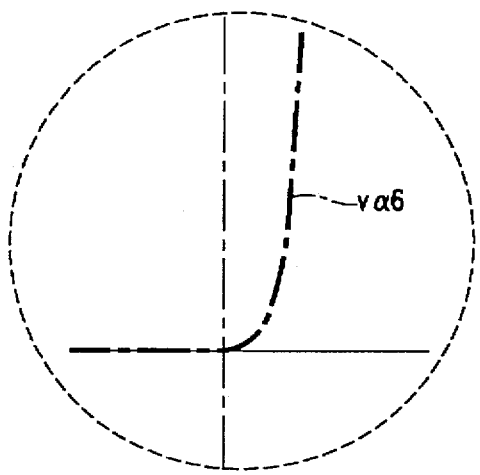
FIG.—12B

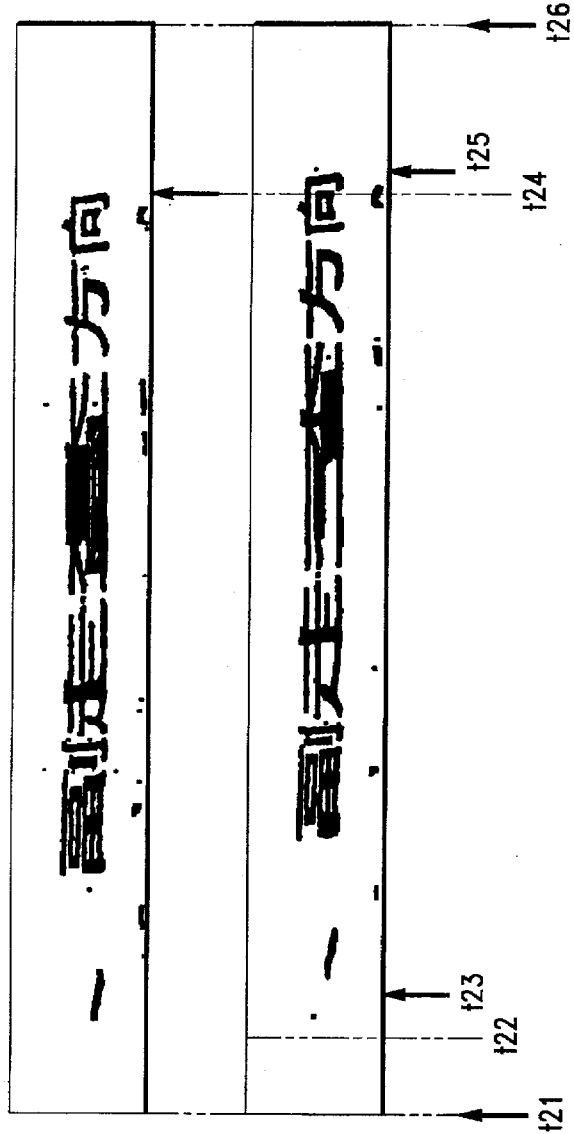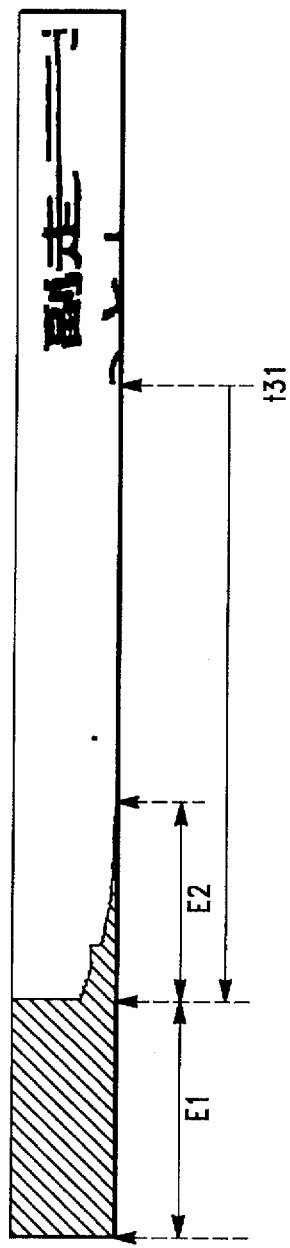
FIG.-15A IMAGE DATA FROM FIRST SENSOR
FIG.-15B IMAGE DATA FROM SECOND SENSOR
FIG.-16

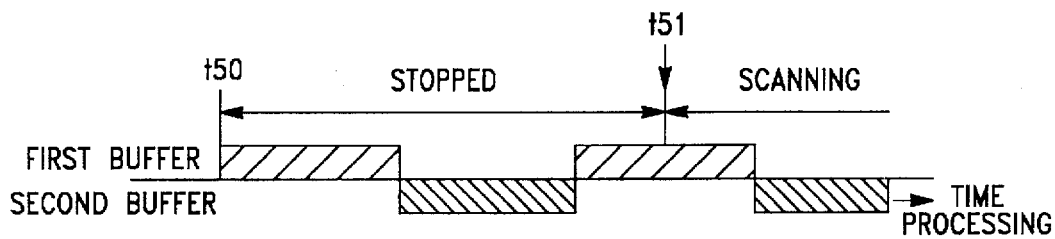
FIG.—24A
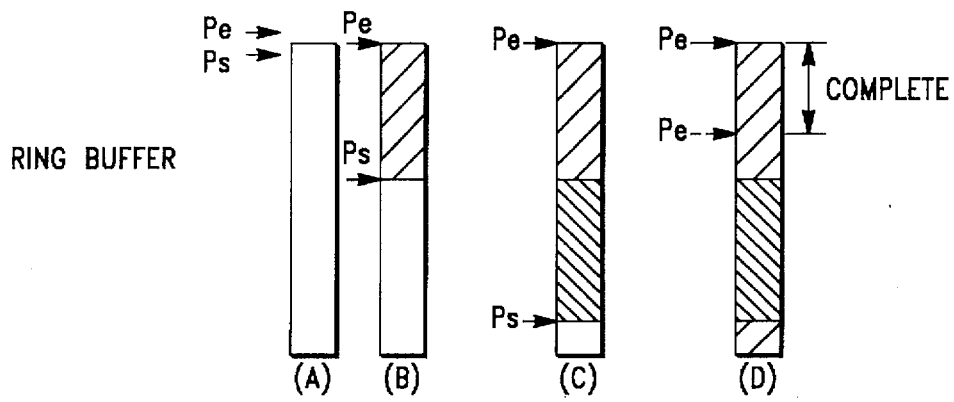
FIG.—24B
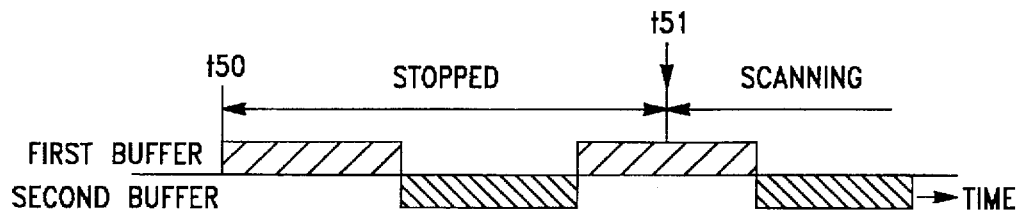
FIG.—25A
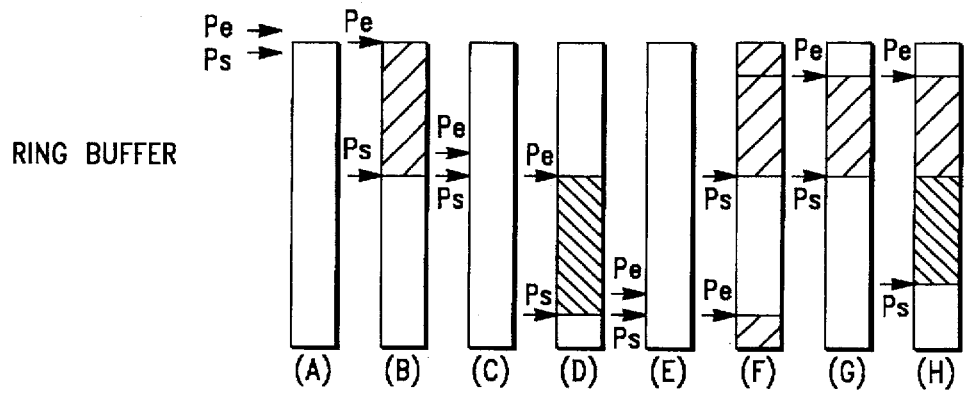
FIG.—25B

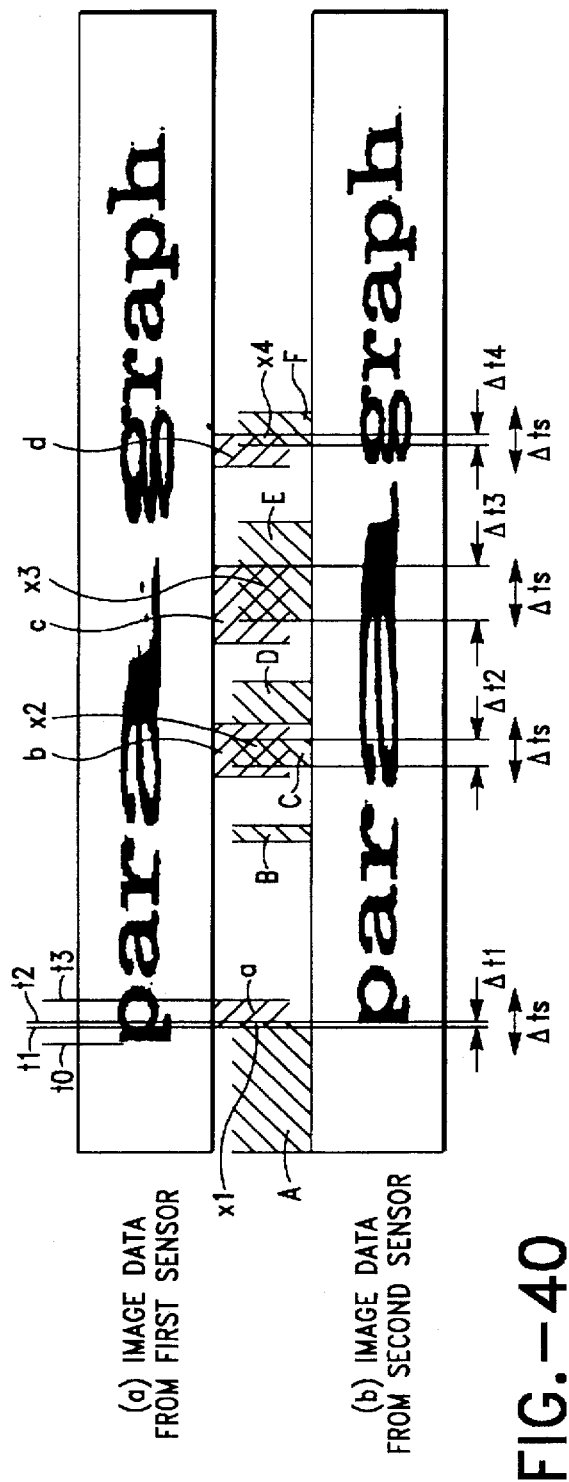
FIG.—40
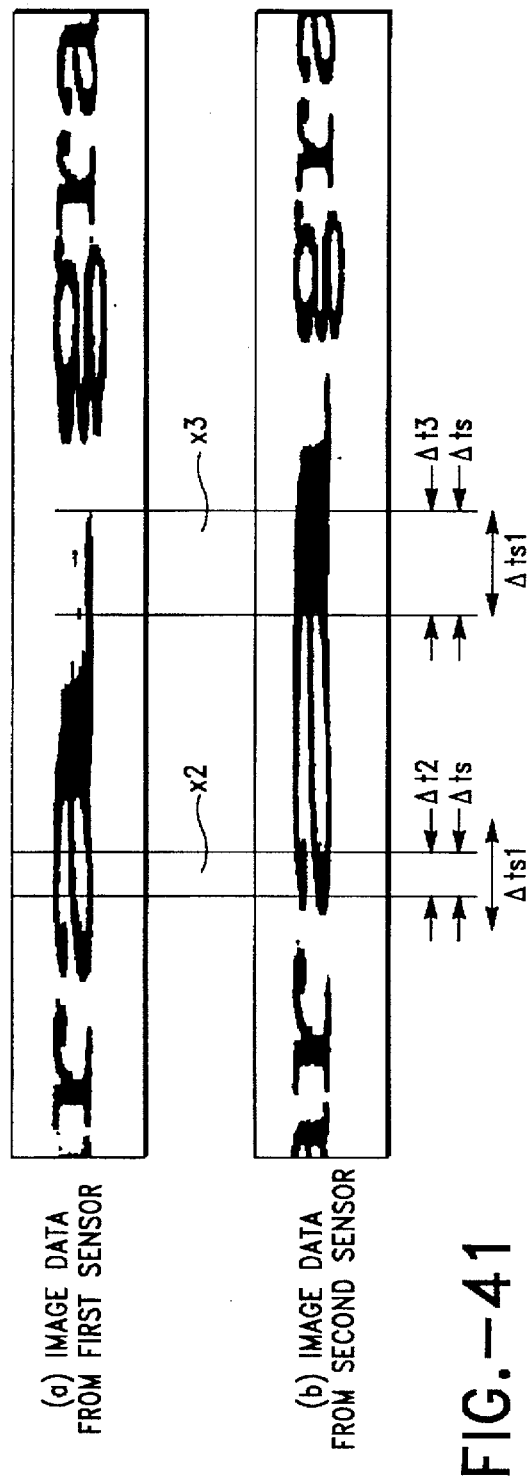
FIG.—41

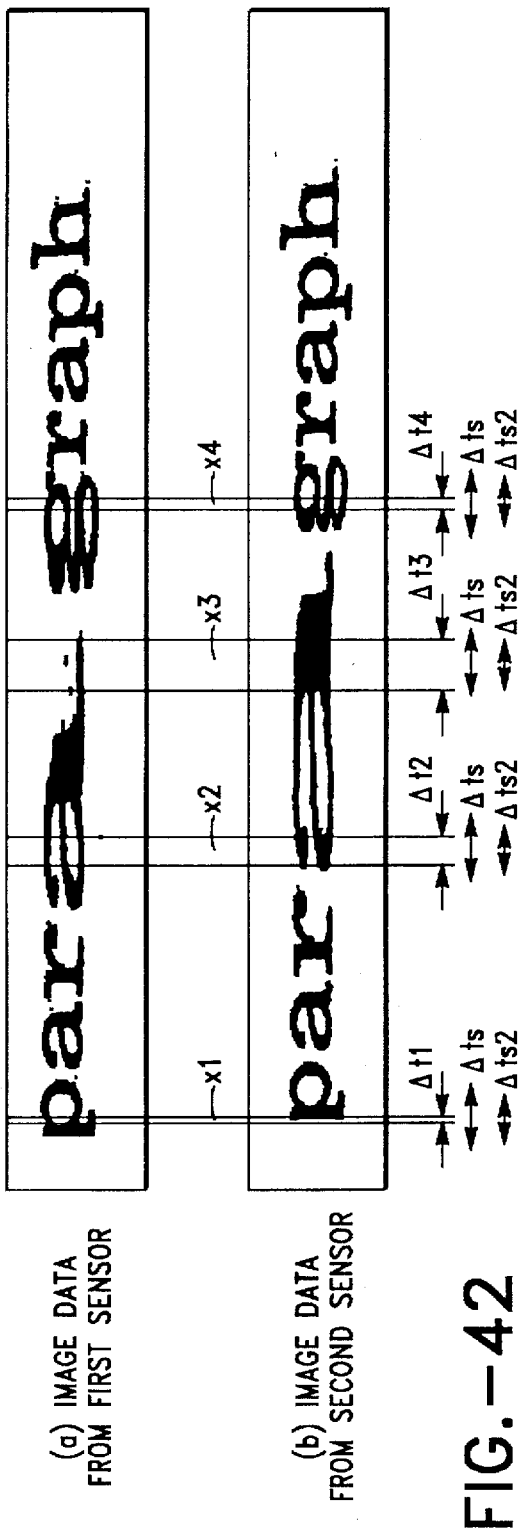
(a) IMAGE DATA FROM FIRST SENSOR
(b) IMAGE DATA FROM SECOND SENSOR
FIG.—42
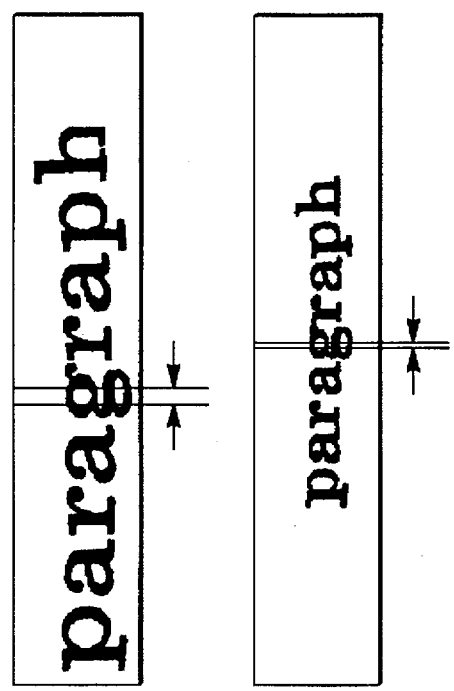
FIG.—43A
FIG.—43B (a) IMAGE DATA FROM FIRST SENSOR (b) IMAGE DATA FROM SECOND SENSOR

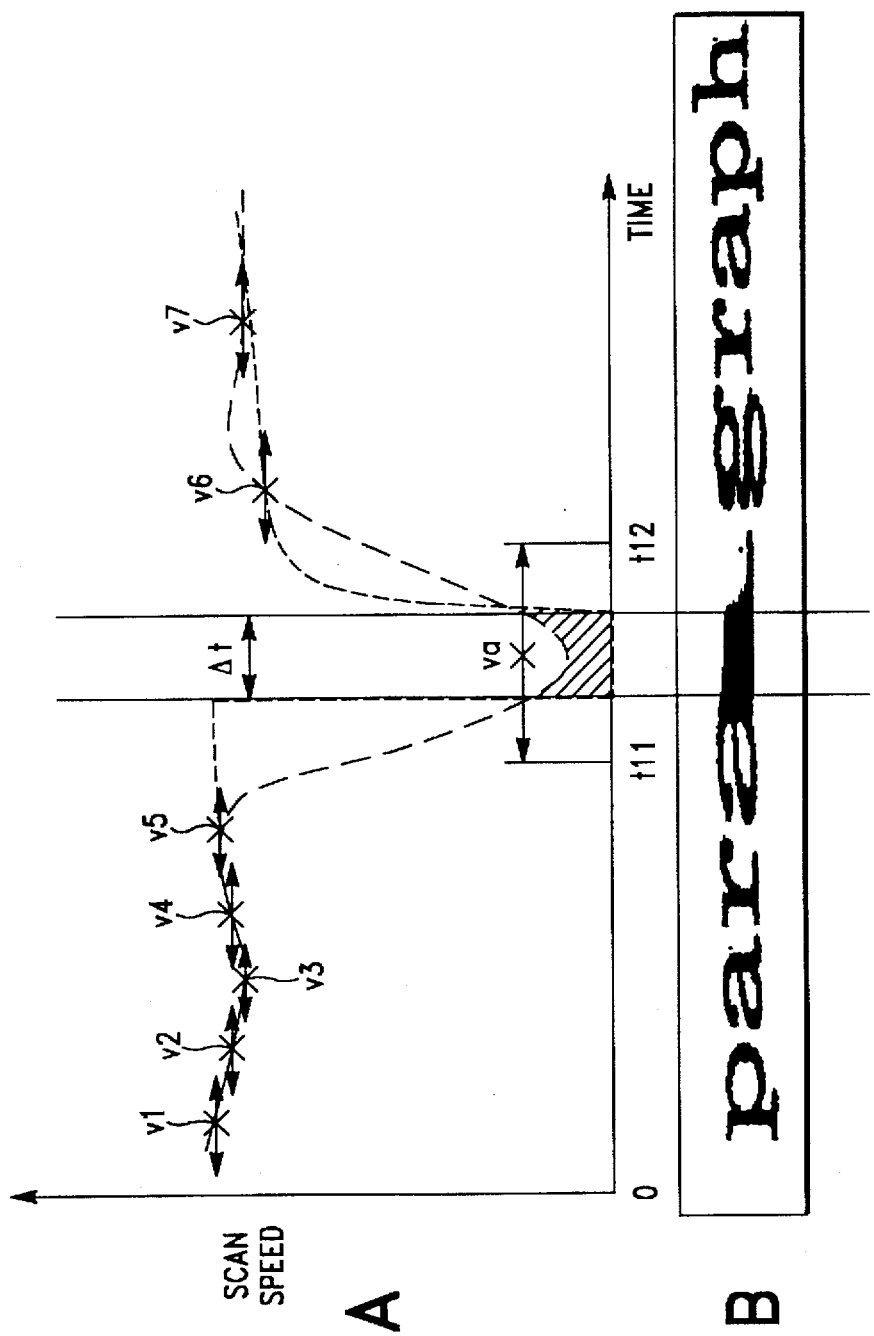
FIG.—46A
FIG.—46B

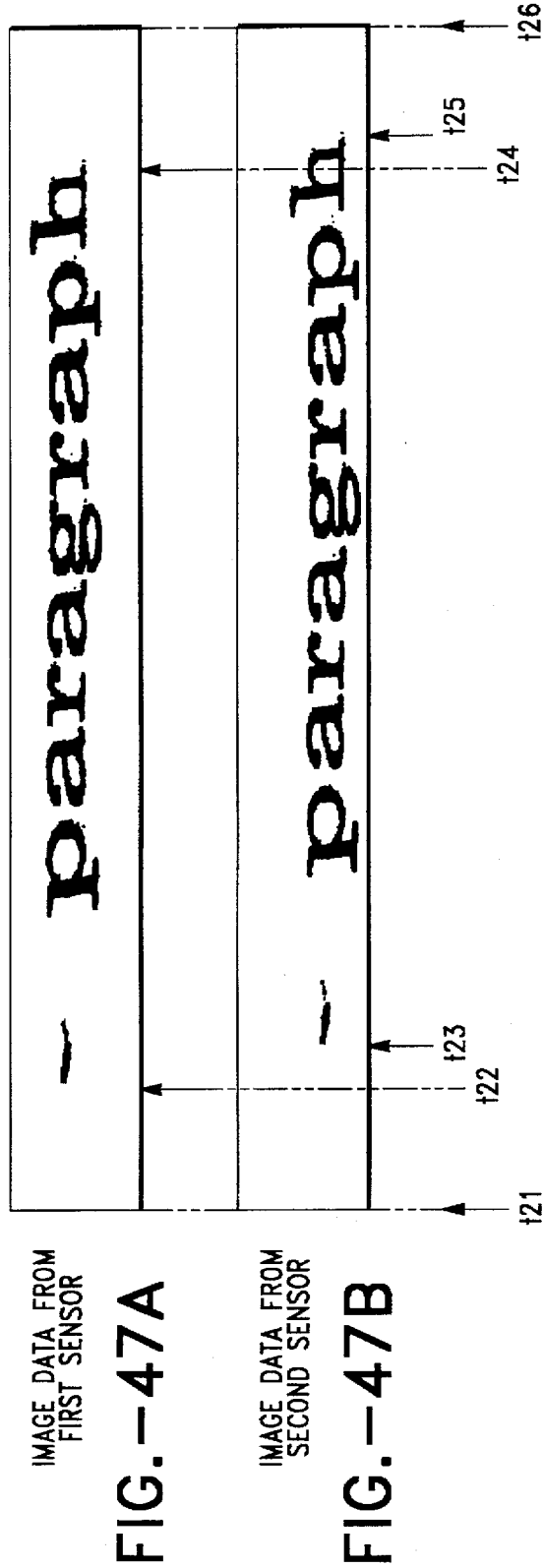
FIG.–47A IMAGE DATA FROM FIRST SENSOR
FIG.–47B IMAGE DATA FROM SECOND SENSOR
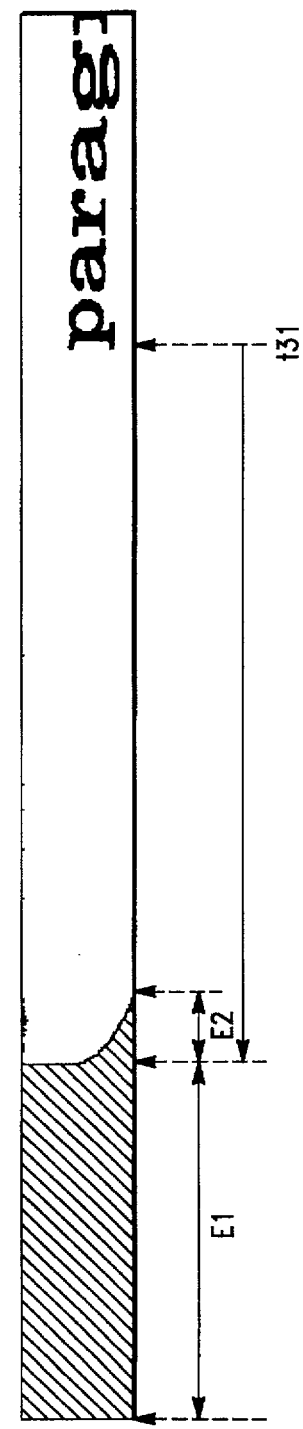
FIG.–48

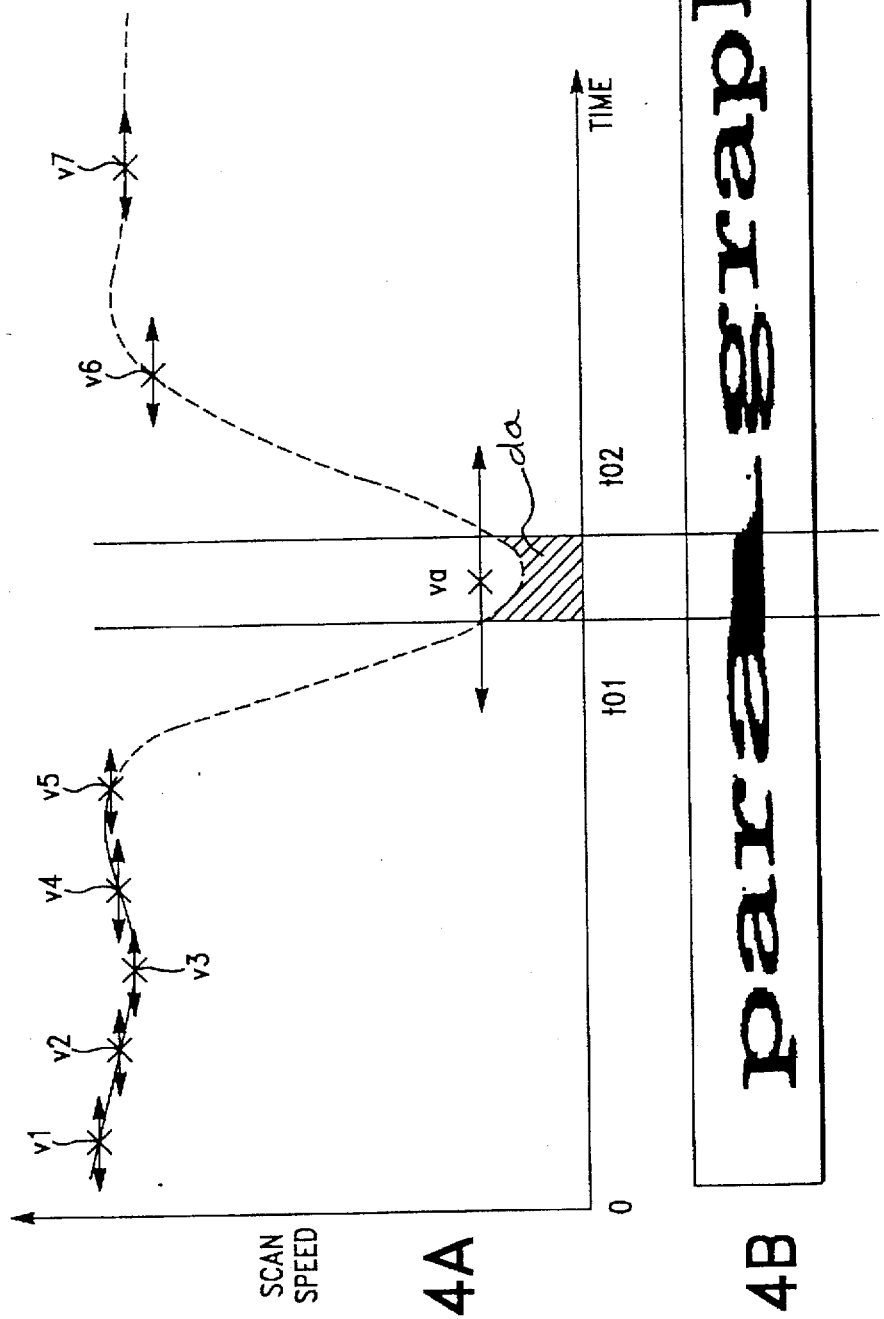
FIG.—54A
FIG.—54B

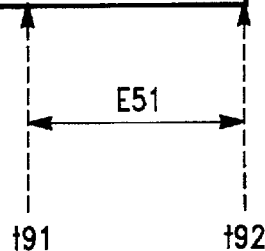
FIG.−53
FIG.−55A
(PRIOR ART)
FIG.−55B
(PRIOR ART)
FIG.−55C
(PRIOR ART)

IMAGE PROCESSING METHOD AND DEVICE

RELATED APPLICATIONS

This application is a continuation in part of copending application Ser. No. 08/499,537, filed Jul. 7, 1995, naming Mikio Aoki and Takashi Nitta as inventors and assigned to Seiko-Epson Corporation of Tokyo, Japan, the current assignee of the present application. This application is also related to copending application Ser. No. 08/508,860, filed Jul. 28, 1995, also naming Takashi Nitta and Mikio Aoki as inventors and assigned to Seiko-Epson Corporation of Tokyo, Japan

BACKGROUND OF THE INVENTION

1. Field of the invention

The present invention relates to an image processing method, apparatus, and computer program product which compensate for correcting distortions in a scanned text image to enable and enhance character recognition thereof.

2. Description of the Related Art

Handheld scanners which manually scan images written on a hard-copy document are widely available today. A handheld scanner commonly found in the marketplace is of the rolling type, in which the user physically presses the scanning wand against the document and rolls the wand across the desired image area. A roller member is provided on the scanning wand adjacent the scanner window to physically contact the document when external pressure is applied and enable movement while maintaining contact. The images on the document are optically read as the scanner is moved, converted to image data, and uploaded to the host device to which the scanner is connected.

In order to obtain acceptable character recognition rates in rolling type handheld scanners, the roller member must be moved in a stable manner along the text and in continuous contact with the document original roller. Typically, this roller member reads image data 16 times for every 1 mm of travel. The width of the roller member is sized to provide a certain linearity to the scanning direction, thereby enabling best-scenario scanning without meandering lines irrespective of the speed at which the scanner is moved (the "scanning speed"). However, it is normally difficult for most users to move the scanner such that the rollers consistently contact the document. This commonly results in scanning document portions while the roller members are separated from the image. When this happens, the scanner to document distance ("scanning distance") cannot be obtained, accurate image scanning is therefore not possible, and linearity may be lost. As a result, the scanned text lines may meander or be scanned at an angle.

Another drawback to this type of scanner is that the overall size of the scanner wand housing (particularly the scanning window end) is rather bulky in relation to net scanning area to accommodate the rolling member and an encoder unit. The encoder unit generates a pulse signal according to the distance traveled in relation to detected rolling member rotations as the scanning wand is moved across the document. Durability-related problems also arise with frequent use due to the use of rollers or other mechanical moving members which frictionally engage the paper documents, which wear and can break down.

Two-line sensor handheld scanners eliminate the need for a roller member have likewise been developed. These two-line sensor scanners generally comprise two sensors (a first and a second sensor), and compares the image scanned at any given position by the first sensor, which precedes the second sensor in the scanning direction and therefore scans a given point first, with the image scanned by the second sensor to detect the scanning speed from the time difference between scanning the two images. An exemplary two-line sensor scanner apparatus is disclosed in U.S. patent application Ser. No. 08/499,537, filed Jul. 8, 1995, naming T. Nitta and M. Aoki as inventors and commonly assigned with the present application to Seiko Epson Corporation of Tokyo, Japan, which is incorporated herein fully by reference. As disclosed in that application, the two line sensor technique eliminates the need for the roller member, and thereby resolves various problems present in roller-type scanners.

As shown in FIG. 36, this two-line sensor scanner, in addition to two line sensors 101, 102 (referred to below as first sensor 101 and second sensor 102) as one-dimensional image sensors, two light transmission holes 111, 112 spaced apart at a prescribed interval, is configured such that the light from LED 1 passes through light transmission holes 111, 112 and irradiates characters, picture images, etc., presented on a source document. In tun, the reflected light is received by first sensor 101 and second sensor 102 via optical system 3.

FIG. 37 illustrates a block diagram of an image processing system employing the 2-line sensor scanner of FIG. 36, including the image input member 100 (scanner) and the image processing member 200 that processes the image data read by image input member 100. As discussed hereinabove, the image input member 100 comprises the first sensor 101, second sensor 102, read timing signal generation circuit 103 which provides read timing signals to these sensors, first and second buffers 104, 105 which store image data read by the first and second sensors 101, 102, input buffer switching circuit 106 which selects one or the other of first and second buffers 104, 105 for storing image data read by the first and second sensors 101, 102, and output buffer switching circuit 107 on the output side which fetches image data from the buffer of the first and second buffers 104, 105 in which a predetermined amount of image data has been stored and transfers it to image processing member 200.

This input buffer switching circuit 106 selects, for example, first buffer 104, whereby image data read by first and second sensors 101, 102 is stored in first buffer 104. When a predetermined amount of image data is stored in this first buffer 104, then second buffer 105 is selected or switched in and data read by first and second sensors 101, 102 is stored in this second buffer 105. Thereafter, when a predetermined amount of image data is stored, second buffer 105 is switched out from receiving image data and first buffer 104 is once again selected.

When a predetermined amount of image data is stored in first buffer 104 and the storing of image data switches to second buffer 105, for example, the buffer switching means 107 on the output side selects first buffer 104 according to a prescribed timing, fetches the image data stored in this first buffer 104 and transfers it to image processing member 200.

Image processing member 200 comprises mainly buffer 210, speed detector 220 and image correcting device 240. The speed detector 220 generally includes a first feature extractor 221, second feature extractor 222, feature buffer 223, feature comparator 224 and overall speed judgment device 225. Typically, the speed detector 220 components and the image correcting device comprise interdependent threads executing on one or more processing devices present within a general purpose computer.

In this type of configuration, image processing member 200 temporarily stores the image data read by image input member 100 in buffer 210, performs speed detection by means of speed detector 220 and corrects the image based on the detected speed by means of image corrector 240.

Typically (though not shown here) hand scanners normally include an input button as a switch for facilitating user coordination of image input. Only when this input button is depressed will the scanning wand 100 perform scanning operations. Therefore, even if image input member 100 is moved, if the input button is not depressed, no image data is input. By contrast, even if the scanning wand 100 is not moved, if the input button is depressed, image data will normally be input and a stationary image will be retrieved.

Further, in image processing member 200, image data is fetched from buffer 210 and scanning speed is detected by speed detector 220. More particularly, first feature extractor 221 extracts the features of the image data from first sensor 101 at a certain point, that feature data is stored in feature buffer 223, and the feature data stored in this feature buffer 223 is compared by feature comparator 224 with the features extracted by second feature amount extractor 222 from the image data from second sensor 102 to check the conformity of both. This means determining if the input position of the image data from first sensor 101 has arrived at second sensor 102, and measuring the time lag before correspondence, if any, is reached. Therefore, using the interval between the two as a basis, speed judgment circuit 225 judges the scanning speed of image input member 100. Further, using this scanning speed as a basis, image correction means 240 corrects distortion in the input image data. This correction processing need only be performed on the image data input from one of the sensors 101, 102.

Image input devices which use the aforementioned 2-line sensor type scanning wand and associated image processing system perform quite well in correcting image distortion as a result of uneven scanning speed. However, when the user initiates wand movement, stops wand movement, and then restarts wand movement all while depressing the scanning input button (which commonly occurs as the user pauses to review what he has scanned or plans to scan next), this system has no means to consider the time period image data input scanning was stopped or the scan stop state. Therefore, even if the speed was temporarily reduced to zero, distortion correction would be performed based on an average speed sought from the distances traveled before and after stopping, without taking into account the time stopped. This results in an inaccurate scan.

This shortcoming is best explained in conjunction with Japanese language FIGS. 38A and 38B and similar English language FIGS. 54A and 54B. FIG. 38A shows the relationship between time and scanning speed for an example scan of the Japanese text "副走査方向" (fukusosahoko) where the user momentarily stops moving the scanning wand 100 from time period t01 to t02 but continuing to depress the scanning input button. In the figure, points v1, v2, . . . , v7 represent the scanning speeds calculated by the speed judgment circuit 225 and actually indicate the average speeds in the intervals indicated by the arrows extending respectively therefrom.

Likewise, FIG. 54A depicts a scanning speed vs. time diagram for the scan of the English text "paragraph". In both examples, in the interval between time t01 and time t02, the scanning speed is actually 0, the aforementioned 2-line sensor image processing system would still consider the scanning wand as moving in the t01–t02 time interval at the average speed vs. Subsequently, image correction is performed on these scanned images utilizing this false average scan velocity. The curve indicated by a dashed line in each of FIGS. 38A and 54A represents the estimated speed change in the interval between v5 and v6.

Therefore, even if the scanning speed in the interval between times t01 and t02 is actually 0, distortion correction is performed assuming that travel is still taking place (in fact, hatched area da represents the falsely assumed distance traveled by scanning wand 101 during the t01–t02 time interval), resulting in an overcorrected, distorted set of image data. The graphical result of this overcorrection may be represented as shown in FIGS. 38B (Japanese) and 54B (English) respectively, where the image collected by the second sensor 102 appears "stretched out" during time period t01–t02, as it takes a particularly long time to fetch the same image data. Also, though distortion correction is performed by image corrector 240 based on speed information (v1, v2, . . . , va, . . . , v7) calculated by speed judgment circuit 225, since distortion is corrected according to speed va during the interval travel is stopped as described above, a correction result can only be obtained in which distortion remains as in the "査" (sa) part of "副走査方向" (fukusosahoko) as shown in FIG. 39C, or the "a" in "paragraph" as shown in FIG. 55C.

Moreover, in using the 2 line sensor image processing system described above, a less-adept user may depress the input scanning button while still attempting to align the scanning wand with the beginning of the desired image to be scanned. In other words, it is common for the user to depress the image input button before the scanning wand is correctly positioned. Conversely, it is quite typical for a less-adept user to keep the image input button momentarily depressed once an image scan is completed before ultimately releasing it the input button is depressed even though scanning may be stopped. Either situation results in "overscanning" in which necessary image data is unintentionally acquired and must be filtered out. This adds unnecessary memory and processing overhead and may result in a blackened, grayed or otherwise distorted image considered undesirable for character recognition or similar image operations.

It is, therefore an object of the present invention to obtain high quality images with negligible distortion through detecting a scan stop state during scanning by the scanning wand when scanning is temporarily stopped and then resumed while the scanning input button remains depressed throughout, thus facilitating distortion correction processing that considers a stopped state. It is also an object of the present invention to prevent disable correction processing when scanning motion is restarted after stopping for a short period with the input button depressed to filter out undesirable image data acquisition during wand alignment and pausing operations, and thereby improve memory and processing efficiency. It is yet another object of the present invention to recognize and disable scanning when the input button is switched OFF after the scanning wand has not moved for a at that position for a short period with said input button depressed, thus effectively utilizing memory resources and reducing correction processing time.

SUMMARY OF THE INVENTION

In accordance with these and related objects, image processing according to the present invention generally involves a two line sensor scanning image input member and an image processing member that corrects image data read by this image input member. Preferably, this image input member includes first and second spaced-apart sensors configured as one-dimensional image sensors which read characters, graphics, etc., printed on an original document illuminated by a light source. These sensors are aligned such that the first sensor is in the forward position in the direction of the scanning movement and the second sensor is in the rear position.

The image processing member estimates the scanning speed by measuring the time taken for a certain image point to be read by the first and second sensors in sequence, and corrects the image data according to this scanning speed. This is accomplished in part by an overall speed judgment process or device which extracts distinct imaging features from images read by the first and second sensors, temporarily stores feature data extracted from said first sensor in a feature buffer, compares the feature data stored in this feature buffer with the feature data extracted from the second sensor, judges their proximal correlation, and thereafter calculates the scanning speed with respect to the image input position based on the judged correlation.

Further, this image processing member may preferably include a stop state judgment process or device which determines whether or not the scanning wand comprising the image input member is in a "scan stop state" while its input switch or button is closed or depressed; a pre/post stop state speed judgment process or device for estimating the scanning speed immediately before and after a scan stop state has been perceived, based on the duration of the scan stop state developed by stop state and overall scanning speed judgment; and an image correction process or device for correcting distortion of the input image based on speed information generated by pre/post stop state speed judgment and overall speed judgment.

This stop state judgment process or device observes the temporal changes in the image data obtained respectively from the first and second sensors of the scanning wand and determines that the wand is stationary or reached a "scan stop state" when there is no change in the perceived images for more than a predetermined period of time. This predetermined time can be selected based on the overall scanning speed before the scan stop state and/or the size of the characters being read. In practical application, this predetermined time will typically range from 100 to 200 milliseconds to offset effects of jittery hand movement by the user during scanning operations.

Moreover, in this embodiment, the overall scanning speed is calculated using an estimated scan stop time interval whenever a scan stop event is encountered. Further, when a scan stop is detected, the estimated scanning speed determined immediately prior to the encountered scan stop state (i.e. the pre scan stop scanning speed) can be based on previously ascertained and stored scanning speeds. Likewise, the estimated scanning speed of the scanning wand immediately after termination of the scan stop state (i.e. the post scan stop scanning speed) may based on the determined pre scan stop scanning speed.

More specifically, speed estimation can be performed by the image processing member or process in a manner which, when the overall estimated scanning speed is less than zero, continuously links the estimated scanning speed immediately prior to a scan stop state with that estimated at the beginning of the scan stop state interval. Also, it may discontinuously link the estimated scanning speed immediately prior to the scan stop state to the scanning speed at the start of the scan stop state when the estimated overall scanning speed is at least zero. Finally, scanning speed estimation is performed that continuously links the scanning speed estimated immediately after the scan stop state to the scanning speed determined at the end of the scan stop state.

Further, image processing according to the present invention may additionally or alternatively include a scan start event judgment process or device that determines if the user has initiated a scanning event through moving the scanning wand from a stationary position with the input switch switched on or button depressed; a scan start speed judgment process or device for judging the scanning speed when the scanning wand actually begins to perform image scanning operations; and an image correction process that corrects distortion of the input image based on the calculated scan start speed and the overall scanning speed.

More specifically, in this embodiment of the present invention, the scan start event judgment process or device may observe the temporal changes in the respective image data obtained from the first and second sensors and determines that scanning has started when there is a change in the image data. Further, it may also determine that scanning has not started when a black area of the image data exists at an edge of the read area even if there is a change in the image data.

Also, the scan start speed judgment process or device estimates the scanning speed at the scan start position calculated by scan start event judgment based on the estimated scan start speed encountered by overall speed in conjunction with the composition of the input image detected immediately prior thereto. To this end, the scan start speed judgment process or device either: 1) assumes the scanning speed at the detected scan start position to be 0 when a black area exists within the input image before scan start which does not extend to the edge of the read area in the main scanning direction; or 2) estimates it to be the scanning speed immediately after scan start as judged according to speed judgment when either the input image before scan start is entirely white or when a black area existing in the input image is detected at an edge of the read area. Also, according to this embodiment, the scanning speed at the scan start position is assumed to be 0 when the estimated scanning speed is less than 0 as derived from the scanning speed immediately after the scan start event is detected.

Also, the image processing member of the present invention may additionally include a ring buffer and a ring buffer write end position update process or device which directs the ring buffer to stores the image data read by the first and second sensors of the scanning wand and then updates the write end address in this ring buffer. The ring buffer write end position update process continually updates the write end address in the ring buffer for the data written during the period until a scan start event has been detected by the aforementioned scan start event judgment process or device.

Finally, the image processing member of the present invention may, in addition or in the alternative, include: a scan end event judgment process or device for determining whether the scanning wand has terminated scanning operations; a scan end speed judgment process that calculates the scan end event scanning speed; and an image correction process that corrects distortion of the input image based on the scanning speed at the end of scanning determined by scan end speed judgment and the overall scanning speed judged by said speed judgment process.

In this embodiment, the scan end event judgment process or device observes the temporal changes in image data perceived obtained from the first and second sensors respectively and determines the starting point of a state in which there is no change in the perceived image data for a predetermined threshold time interval as the scan end position while the scanning wand input switch is in an OFF state. Further, this scan end event judgment process or device determines the scan end position as the last of the image data in which a black area does not exist at an edge of the read area, even the observed image data changes when the black area of that image data exists at an edge of the read area and the input switch is in an OFF state.

Also, in this embodiment, the scan end speed can be determined by the scan end speed judgment process or device based on the scanning speed immediately before the scan end event as calculated by overall speed judgment and the contents of input image before scan end. More particularly, the scan end speed judgment process or device: 1) assumes the scanning speed at the estimated scan end position to be 0 when there is a black area in the input image after scan end detection which fails to extend to a read area edge; or 2) estimates the scanning speed at the scan end position from the estimated scanning speed immediately before scan end as determined by overall speed judgment when either the input image after scan end is entirely white, or a black area existing in the input image extends to an edge of the read area. Further, scanning speed at the scan end position is assumed to be 0 when the estimated speed is less than 0 as in the case of the scan start speed discussed hereinabove.

Through selective employment of the above-described devices or techniques, it is possible to reliably determine during scanning by the image input member whether or not it is in a scan stop state with the input switch for facilitating image data input in the ON state, and, if so, account for the scanning speed during the stop interval. Also, by estimating the speed changes before and after the scan stop event, based on the scan stop state information calculated by stop state judgment and the speed information obtained from speed judgment, speed changes more in line with the actual scanning state can be obtained and can serve as the basis for more accurate distortion correction can be performed when scan stop events are encountered.

Further, by being able to reliably judge whether or not scanning was initiated through movement of the scanning wand and depression of the scanning input button preferably contained thereon, and by estimating the speed changes at the start of scanning by the aforementioned scan start speed judgment, speed changes more closely tracking the actual scan state can be obtained. By performing distortion correction based on the speed changes at the start of scanning and the speed information obtained from overall speed judgment, more accurate distortion correction than heretofore known is now possible, and by disregarding image data perceived before the start of scanning, distortion correction time can be reduced as well. This can be conveniently implemented using a ring buffer for transient storage of perceived image data and a complementary write end position process/device in which the write end position is continually updated in the ring buffer for the image data input until scan start judgment determines that scanning operations have in fact started. Therefore, unnecessary image data input before scanning starts is not stored in the ring buffer and is overwritten prior to image distortion correction and processing, thus effectively utilizing memory resources.

Finally, by being able to reliably determine if scanning operations were terminated and by estimating the speed changes at the end of scanning through aforementioned scan end speed judgment, speed changes more closely reflecting actual scanning operations can be obtained. Therefore, by performing distortion correction based on these more accurate speed changes calculated at the end of scanning and overall speed information, better distortion correction is possible, and by not considering unnecessary data input after the end of scanning, distortion correction time can be reduced and correction accuracy can be improved.

Other objects and attainments together with a fuller understanding of the invention will become apparent and appreciated by referring to the following description of specific, preferred embodiments and claims taken in conjunction with the accompanying drawings.

BRIEF DESCRIPTION OF THE DRAWINGS

In the drawings, wherein like reference numbers refer to like parts:

FIG. 2 is a Japanese language example used to describe stop state judgment according to the first embodiment;

FIG. 3 explains, using a Japanese language example, stop state judgment according to the first embodiment when overall scanning speed is relatively slow;

FIG. 4 explains, using a Japanese language example, stop state judgment according to the first embodiment when overall scanning speed is relatively fast;

FIGS. 5A and 5B explain, using Japanese language examples, stop state judgment according to the size of the characters according to the first embodiment;

FIG. 6 explains, using a Japanese language example, stop state judgment according to the first embodiment when image characters are small;

FIG. 7 illustrates a Japanese language example in which scanning and stopping actions are repeated in short intervals according to the first embodiment;

FIGS. 8A and 8B explain a Japanese language example in which the scanning speed is calculated astride the stop time according to the first embodiment;

FIG. 11 explains how the scanning speeds immediately before and after the stop interval is estimated in a case in which the estimated speed before the stop interval is less than 0 according to the first embodiment;

FIGS. 12A and 12B (inset) explain how the scanning speed immediately before and after the stop interval is estimated in a case in which the estimated speed before the stop interval is not less than 0 according to the first embodiment;

FIGS. 15A and 15B explain scan start and end using a Japanese language example;

FIG. 16 shows a Japanese language input image example obtained when position alignment is performed before scan start, according to the second embodiment;

FIGS. 24A–24B and 25A–25B explain ring buffer operation according to the third embodiment;

FIG. 29 diagrammatically explains the estimation of the speed change at scan end for the image shown in FIG. 27 according to the fourth embodiment;

FIG. 40 is an English language example used to describe stop state judgment according to the first embodiment;

FIG. 41 explains, using an English language example, stop state judgment according to the first embodiment when the scanning speed is relatively slow;

FIG. 42 explains, using an English language example, stop state judgment according to the first embodiment when the scanning speed is relatively fast;

FIGS. 43A and 43B explain, using an English language example, stop state judgment according to the size of the characters according to the first embodiment;

FIGS. 46A and 46B explain an English language example in which the scanning speed is calculated astride the stop time according to the first embodiment;

FIGS. 47A and 47B explain scan start and end using an English language example;

FIG. 48 shows an English language input image example obtained when position alignment is performed before scan start, according to the second embodiment;

FIG. 53 diagrammatically explains the estimation of the speed change at scan end for the image shown in FIG. 51 according to the fourth embodiment;

FIGS. 54A and 54B explain, using an English language example, image processing when scanning temporarily stops according to the image processing device illustrated in FIG. 37;

FIGS. 55A–55C show English language examples of image data correction using known techniques.

DESCRIPTION OF THE PREFERRED EMBODIMENTS

First Embodiment

Figure 1:
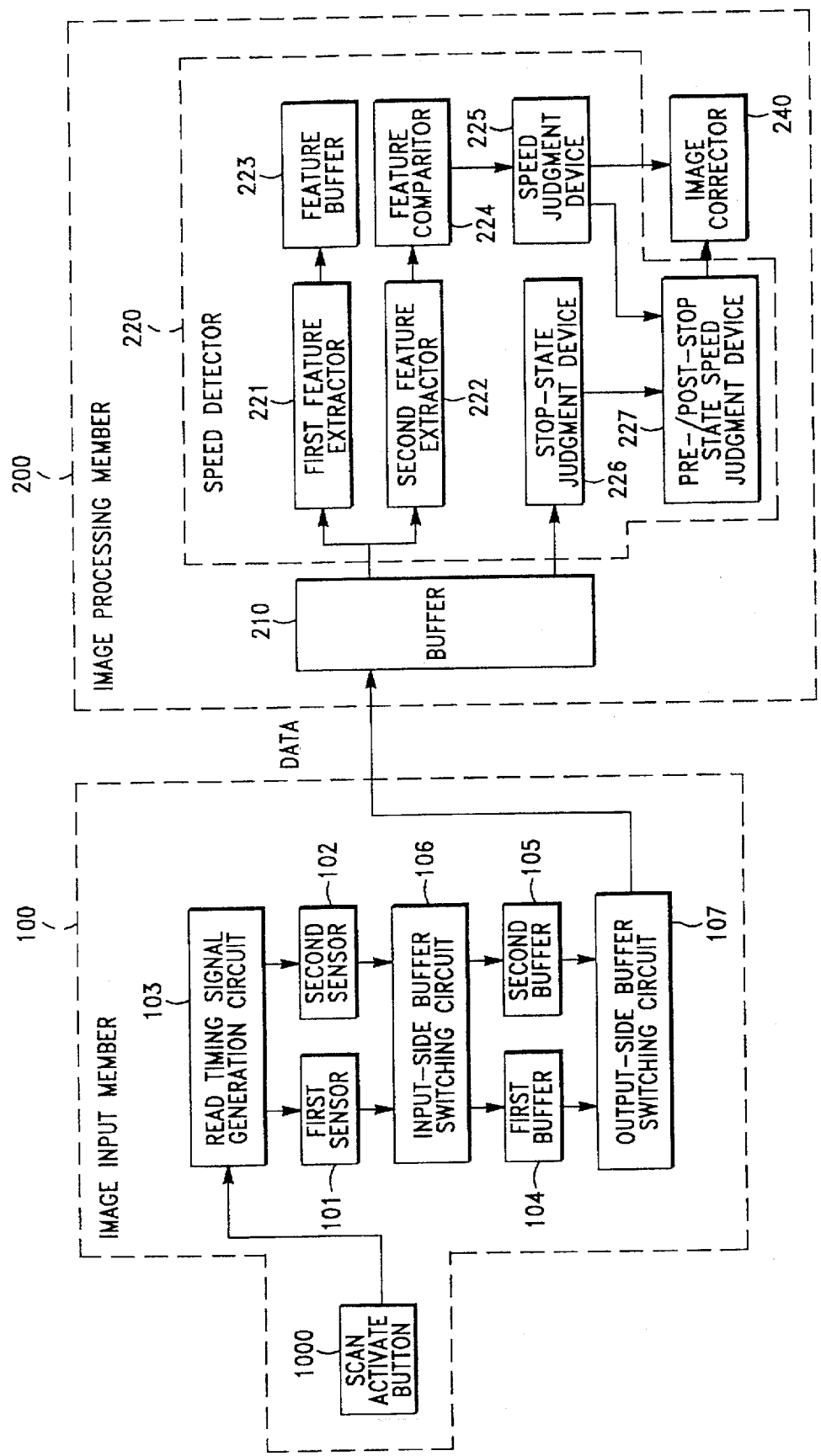
FIG. 1 is an overall block diagram of the first embodiment of the present invention.

Turning now to the drawings, FIG. 1 is a block diagram of the overall constitution of an image scanning and processing apparatus according to the first preferred embodiment of the invention. In this embodiment, as in the prior art, this apparatus generally comprises a handheld scanning wand or image input member 100 which streams digitized image data to the image processing member 200 for image enhancement and distortion correction discussed in greater detail hereinbelow.

Figure 37:
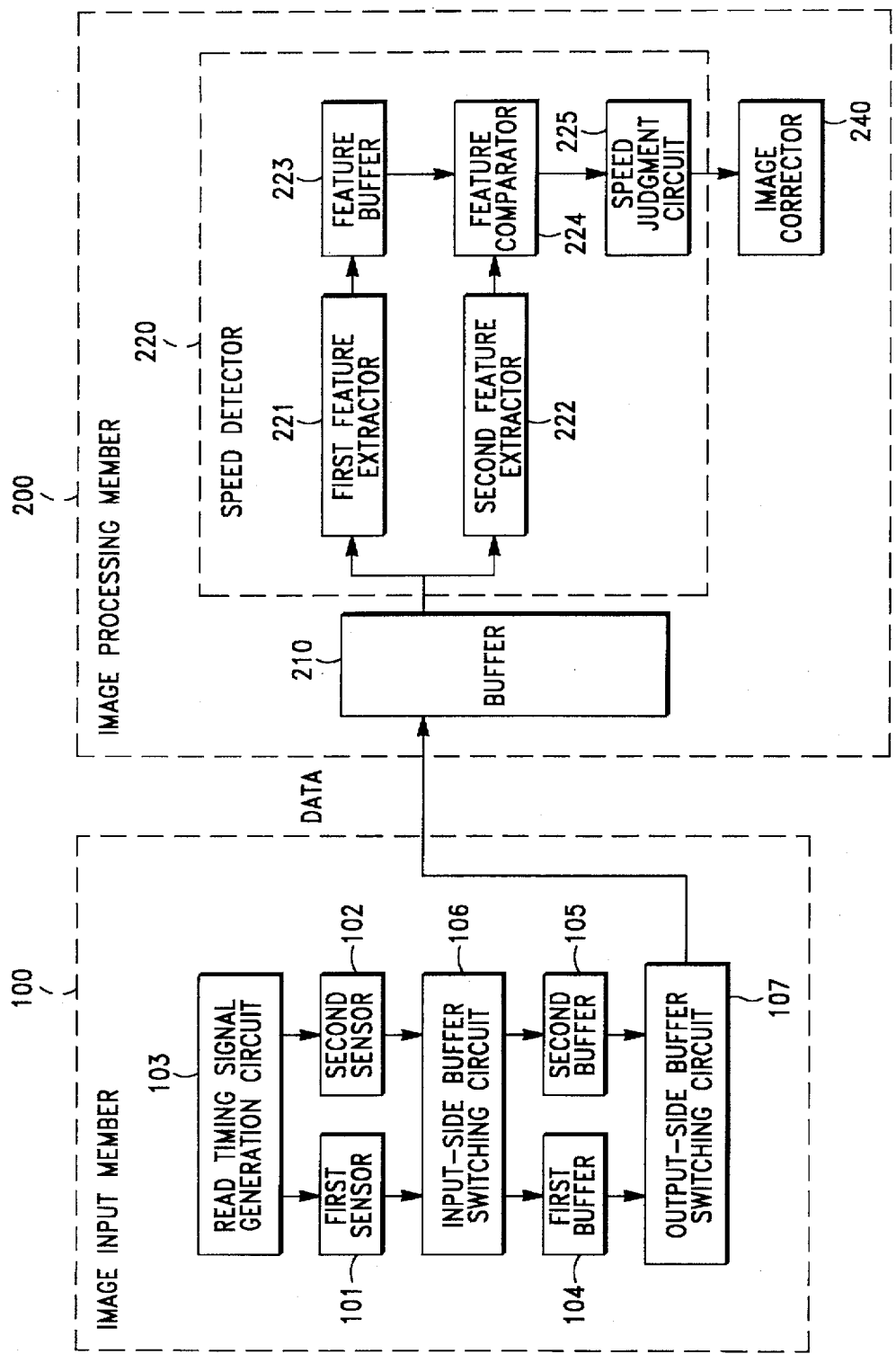
FIG. 37 is a block diagram of a known image processing device.

Scanning wand 100 generally comprises a two-line sensor type image input device as described in connection with FIG. 37 hereinabove and includes: first sensor 101, second sensor 102, read timing signal generation circuit 103 which provides read timing signals to these sensors, first and second buffers 104, 105 which store image data read by the first and second sensors 101, 102, input-side buffer switching circuit 106 which selects one of first and second buffers 104, 105 for storing image data read by the first and second sensors 101, 102, and output-side buffer switching circuit 107 which fetches the image data from the first and second buffers 104, 105. Also shown is scan activate button 1000 connected to read timing signal generation circuit 103 which allows the user to selectively enable or disable scanning operations within the scanning wand 100.

Image processing member 200 generally comprises buffer 210, speed detector 220, and image corrector 240. In addition to the first feature extractor 221, the second feature extractor 222, feature buffer 223, feature comparator 224 and overall scanning speed judgment device 225 previously described above in connection with FIG. 37, the speed detector 220 of the first embodiment also comprises stop state judgment device 226 coupled to buffer 210 for determining whether scanning movement of the image input member 100 has stopped while scan activate button 1000 remains depressed, along with pre/post stop state speed judgment device 227 coupled to the stop state judgment device 227, overall speed judgment device 225 and image corrector 240 for calculating the scanning speed before and after the scan stop state of image input member 100 based on information developed from the stop state judgment device 226 and from the overall scanning speed judgment device 225.

It should be noted here that the components of this invention may be conveniently implemented using a conventional general purpose digital computer programmed according to the teachings of this specification, as will be apparent to those skilled in the computer arts. Appropriate software coding can be readily prepared based on the teachings of the present disclosure, as will be apparent to those skilled in the software art. The present invention may also be implemented by the preparation of application specific integrated circuits or by interconnecting an appropriate network of conventional component devices and circuits, as will be readily apparent to those skilled in the art.

Figure 56:
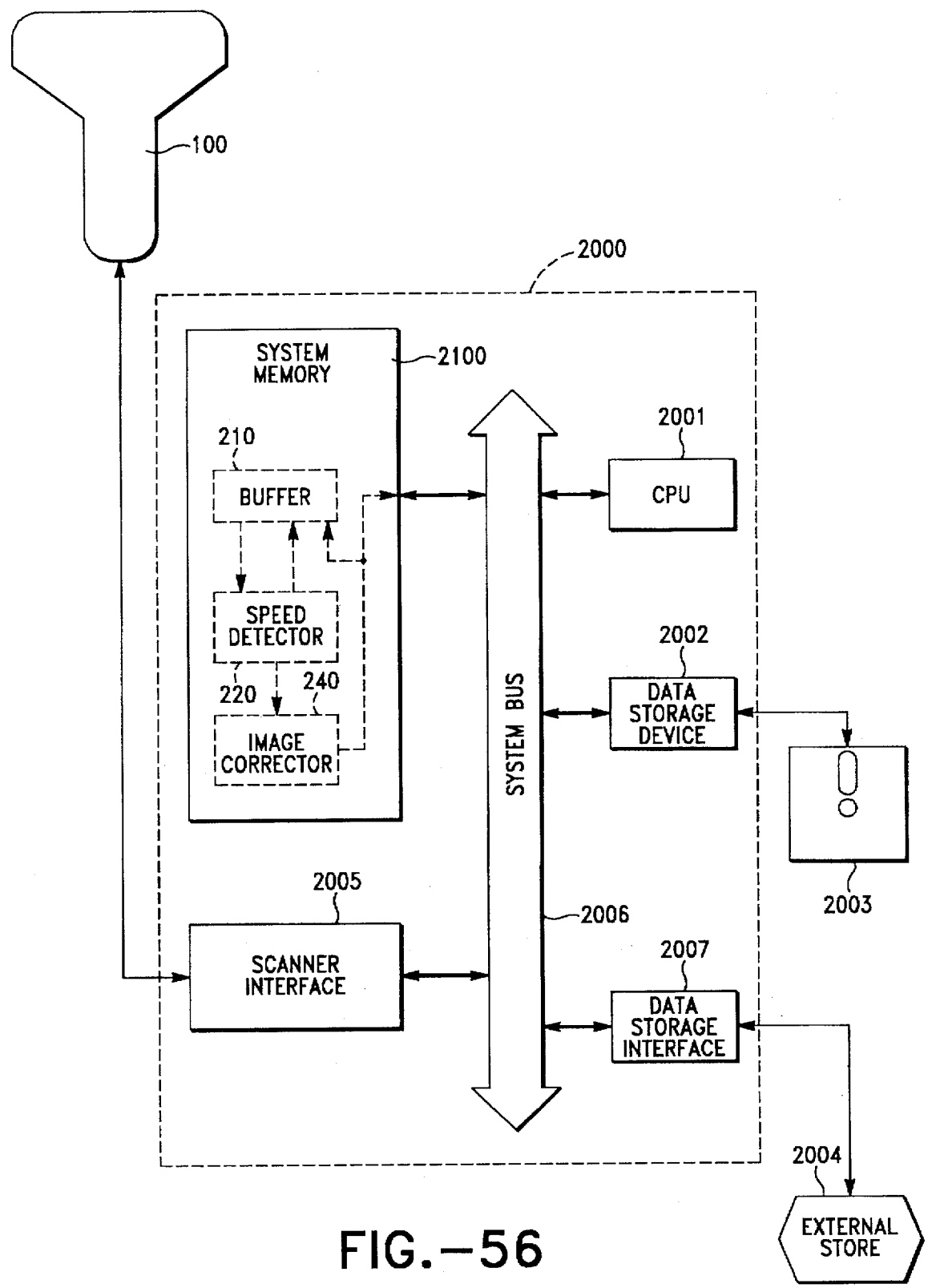
FIG. 56 is a block diagram of a representative processing system capable of implementing the presently preferred embodiments.

In each of the following preferred embodiments of the present invention, including, but not limited to, the first embodiment, the first and second feature extractors 221, 222, feature comparator 224, stop-state judgment device 226, pre/post stop state judgment device 227, overall speed judgment device 225, and image corrector 240 take the form of interdependent threads executing on a general purpose processing system 2000 (FIG. 56). These threads permit the processing system 2000 to carry out the image development techniques and processes of the preferred embodiments when the processing system 2000 reads and executes their corresponding programming instructions from a computer readable storage medium. The storage medium containing the thread instructions can include, but is not limited to, any type of disk media including floppy disks, optical disks, CD-ROMs, magneto-optical disks, hard drives or disk arrays whether located within or external to the processing system 2000. Alternatively, the storage medium can include ROM, RAM, EPROM, EEPROM, Flash EEPROM or any other type of media suitable for storing computer readable instructions.

FIG. 56 illustrates in more detail a representative processing system 2000, which includes system memory 2100, CPU 2001 and scanner interface 2005 interconnected via a system bus 2006 well known in the computer arts. Also interconnected to the system bus 2006 is system-addressable storage device 2002 capable of accepting, reading and writing information to a type of removable media 2003 and external store 2004 as representative storage mediums in communication with representative processing system 2000. Accordingly, in this representative processing system, programming instructions corresponding to the first and second feature extractors 221, 222, feature comparator 224, stop-state judgment device 226, pre/post stop state judgment device 227, overall speed judgment device 225, and image corrector 240 may be partially or fully contained within external store 2004, removable media 2003, or system memory 2100 as is well known in the art.

Moreover, feature buffer 223 and buffer 210 may be constructed within system memory 2100 as an integral part thereof or may comprise discrete circuitry as is well-known in the computing arts.

Removable media 2003 may include a floppy disk, CD-ROM, ROM cartridge or other apparatus suitable for holding information in computer readable form. Similarly, external store 2004 may include another processing system, a computer readable storage component, a collection or network of processing systems and/or storage components, or similar device or devices in communication with processing system 2000 to exchange information including the above-mentioned thread instructions. Further, in this embodiment, processing system 2000 is indicated as being a general purpose personal computer. However, an ordinary skill with knowledge of the presently preferred embodiment according to the present invention should know that the particular processing system could alternatively include, for example, a special-purpose dedicated micro-controlled subsystem or similar processing device as long as it has sufficient resources for at least sequential execution of the techniques described and charted hereinbelow and has sufficient interfacing resources to communicate and exchange information with the image input member or scanning wand 100.

In general operation, image processing member 200 periodically fetches uncorrected image data stored in buffer 210 in order to calculate scanning speed and wand orientation for subsequent distortion correction operations. Within speed detector 220, features corresponding to received image data from first sensor 101 are extracted by first feature extractor 221 and stored in feature buffer 223 in a well-known manner. The feature data stored in this feature buffer 223 and the features of the image data from second sensor 102, as extracted by second feature extractor 222 are compared by feature comparator 224, whereby the conformance of both is checked. Here, if the image data of both conform, it means that the second sensor 102 has traveled to the input position of the image data from first sensor 101. Therefore, based on the time delay between the first and second sensors perceiving the some image, the overall scanning speed of image input member 100 can be determined by speed judgment device 225. Also, based on this scanning speed, distortion of the input image data is corrected by image corrector 240. It should be realized here that, once scanning velocities have been determined, data perceived by one of the two sensors may be discarded as only one copy of data is necessary to perform correction operations.

The stop state judgment device 226 determines whether the user has momentarily stopped scanning operations, and it does this by monitoring the respective image data streams emanating from first and second sensors 101, 102 as stored in buffer 210 and detecting whether or not there is a non-changing area in the image data existing longer than a prescribed time period.

FIG. 2 illustrates a Japanese language example illustrating stop state judgment according to the first embodiment in more detail. FIG. 40 similarly illustrates stop state judgment according to this embodiment using an English language example. The upper scanning line in each figure, denoted by (a), represents example scanned in image data from the first sensor 101 plotted against time whereas the lower scanning line (b) represents the same image data as perceived from second sensor 102, also plotted against time. As illustrated in each of FIGS. 2 and 40, portions of each scan line may contain multiple non-changing portions or areas which may represent potential scan stop events. For example, in the first sensor scan line (a) of FIGS. 2 and 40, the right slanting hatched areas a, b, c and d can tentatively be judged to be possible scan stop events as perceived within the image data collected from first sensor 101. Likewise, the left-slanted hatched areas A, B, C, D, E and F of these figures can tentatively be judged to be possible scan stop events in the image data collected from second sensor 102. Note, as used herein, a non-changing area is an area in which there is no change in the image data for predetermined period of time.

Note, however, in each of FIGS. 2 and 40, a change does occur in the image data from first sensor 101 at time t0, but there is no change in the image data from second sensor 102 at this same time. In FIG. 2, a short time from time t1, the image data from first sensor 101 has scanned in picture elements are arranged such that there is no change in their position in the horizontal direction of the character "福" (fuku), and therefore since there is no change in the image, the image data from first sensor 101 enters a potential non-changing area until time t3. The non-changing area of the image data from second sensor 102, however, stops at time t2, as it begins to read the scanning line (b) of the figures.

FIG. 40 shows somewhat more compressed no-change areas since there is more picture element variation with respect to a horizontal scanning direction when the English letter "p" is read in.

Since first and second sensors 101, 102 are commonly housed in the same scanning wand 100, when first sensor 101 is in a scan stop state, it follows that second sensor 102 is also at a scan stop state though the input positions are different. That is, in a scan stop state, first and second sensors 101, 102 are inputting images at different positions at the same time. Therefore, the time differences Δt1, Δt2, Δt3 and Δt4 of those areas (cross hatched areas x1, x2, x3 and x4 in each figure) where the possible scan stop times (a), (b), (c) and (d), and (A), (B), (C), (D), (E) and (F) of first and second sensors 101, 102 in FIGS. 2 and 40 overlap can be considered time periods in which scanning by image input member 100 may have stopped. These times are referred to as "possible image input member scan stop times".

Next, it is judged whether or not image input member 100 is actually in a stop state during the possible image input member scan stop times Δt1, Δt2, Δt3 and Δt4, which are considered to be possible times during which image input member 100 is stopped. To perform this judgment, the possible image input member scan stop times Δt1, Δt2, Δt3 and Δt4 are compared with a pre-set threshold value, and possible image input member scan stop times deemed larger than this threshold value are assumed to be image input member scan stop times.

Here, the threshold value is Δts and when said Δt1, Δt2, Δt3 and Δt4 are compared with this Δts, only Δt3 is larger than Δts as can be seen in FIGS. 2 and 40, and therefore the image scanning position corresponding to the duration of Δt3 is determined to be an image input member scan stop position. That is, assuming the image data from second sensor 102 is to be corrected in this case, the second "a" in FIG. 40, for example, can be judged to lie within the scan stop interval (interval in which image data is input with scanning by image input member 100 in a stop state) in the image data of (b). Parts other than Δt3 are probably cases in which scanning by image input member 100 did not stop but was extremely slow, for example.

Image correction at the image input member scan stop position judged in this manner corrects distortion by eliminating the portions input while the image input member 100 is in a stop state in conjunction with formulated scanning speeds for before and after stopping event.

Figures 36, 39A, 39B, 39C:
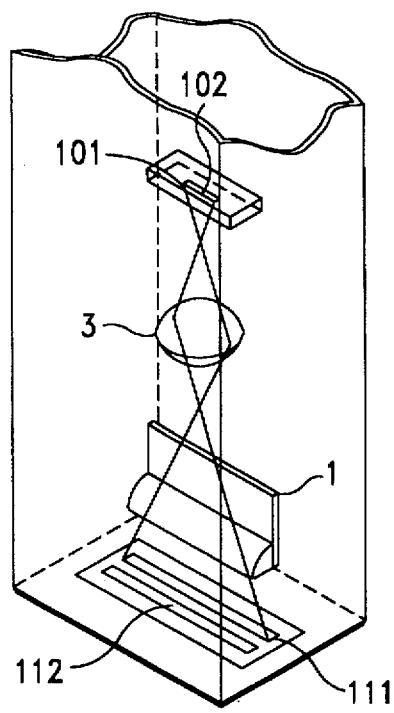
FIG. 36 is a diagram of a two line sensor image input member.
FIGS. 39A–39C show example of image data correction using known techniques.

The threshold value Δts is not always a fixed time period, but rather threshold value Δts is determined by the scanning speed of image input, the size of the characters being input, etc. If the threshold value Δts is fixed, the degree of distortion in the scanning direction (secondary scanning direction) of the image data obtained from first and second sensors 101, 102 differs as shown in Japanese language FIGS. 3 and 4 and similarly in English language FIGS. 41 and 42. Herein, FIGS. 3 and 41 represent the case in which scanning movement progresses at a slow speed, and FIGS. 4 and 42 represent the same image scanned relatively quickly. That is, when the image is input at a slower scanning speed than the scanning speed in the case of FIGS. 2 and 40 described above, the overall image data will take on an elongated shape in the scanning direction as shown in FIGS. 3 and 41, and if this is compared with the same threshold value Δts as above, a portion of the scanning line in which scanning had not been deemed stopped (Δt2 part in FIGS. 2 and 40) would become Δt2>Δts, and would now be incorrectly judged as an image input member scan stop position. As a result, image corrector 240 would perform correction processing as if it were a scan stop state. That is, even though scanning had not been stopped, since scanning would be judged as stopped and correction processing corresponding to the scan stop state would be performed, the "走" (so) part of the "副走査方向" (fukusosahoko) image would be excessively shrunk after correction as shown in FIG. 39A. Likewise, for the English language example shown in FIG. 41, the resultant image after image correction operations in which Δts is held constant will be undesirably compressed, as shown be the compressed "a" in FIG. 55A.

On the other hand, when the image is input at a scanning speed faster than the scanning speed in the case of FIGS. 2 and 40 described above, the overall data will take on a shrunken shape in the scanning direction, and if this is judged by the same threshold value Δts above, the part in which scanning actually stopped (Δt3 part in FIGS. 2 and 40) will become Δt3<Δts and this part will be judged as not being a scan stop position. Therefore, the images in FIGS. 4 and 42 will be judged as not having a scan stop state, and as a result image corrector 240 will not perform accurate correction processing. That is, even though there was a state in which scanning did stop (Δt3 part), correction processing is performed in which scanning is judged as not stopping, and therefore the image after correction becomes an image in which the "走" (sa) part of the "副走査方向" (fukusosahoko) image is excessively elongated as shown in FIG. 39C, or the horizontally stretched second "a" in "paragraph" as shown in FIG. 42.

To solve these potential problems, in this embodiment the threshold value Δts is set according to the scanning speed. That is, the threshold value Δts is set based on the scanning speed immediately before the image position for which the possible image input member scan stop times Δt1, Δt2, Δt3 and Δt4 at which scanning by image input member 100 may have stopped are sought. That is, if the scanning speed is slow, the threshold value Δts becomes a large threshold value accordingly, and if the scanning speed is fast, the threshold value Δts becomes a small threshold value accordingly. For example, in a case in which the scanning speed is slow as in either FIG. 3 or 41, by setting the threshold value Δts to the larger threshold value Δts1, the Δt3 part is judged as a state in which scanning stopped as in the case of FIGS. 2 and 40. Also, in a case in which the scanning speed is fast as in FIGS. 4 and 42, by setting the threshold value Δts to a smaller threshold value Δts2, the Δt3 part of x3 is judged as a state in which scanning stopped again as in FIGS. 2 and 40. By setting the threshold value based on the scanning speed immediately before the image input position for which a possible image input member scan stop time is sought, the threshold value is set according to the scanning speed and the result of correction processing by image correction means 240 results in a distortion-free image as in FIGS. 39B and 55B regardless of the scanning speed.

To be more specific, in a case in which the read width of image input member 100 is about 8 mm, the size of the character that can be input is less than 7 mm×7 mm. Therefore, assuming a maximum character size of 7 mm and assuming that the read interval of first and second sensors 101, 102 is 1 mm, the same image will not be continuously fetched for more than 6 mm. Therefore, assuming the scanning speed range in which an individual will scan this type of image input member is generally 60 mm/sec to 30 mm/sec, the maximum time the same image will continue will be less than 100 msec if scanning at 60 mm/sec and the maximum time the same image will continue will be less than 200 msec if scanning at 30 mm/sec. Therefore, in a case such as that above with such conditions as the read width of image input member 100, the read interval of first and second sensors 101, 102 or the scanning speed range, if the threshold value Δts is set between 100 msec and 200 msec, the correct stop state can be judged and distortion correction of the image can be accurately performed.

Alternatively, Δts may be varied according to the relative size of characters contained in the When the size of the input images are different; that is, if large characters as shown in FIGS. 5A or 43A are read in and small characters as shown in FIGS. 5B or 43B are input, then it becomes necessary to determine an appropriate threshold value Δts, whereby it is judged if a scan stop state exists or not, according to the size of the character to be input.

Figure 44:
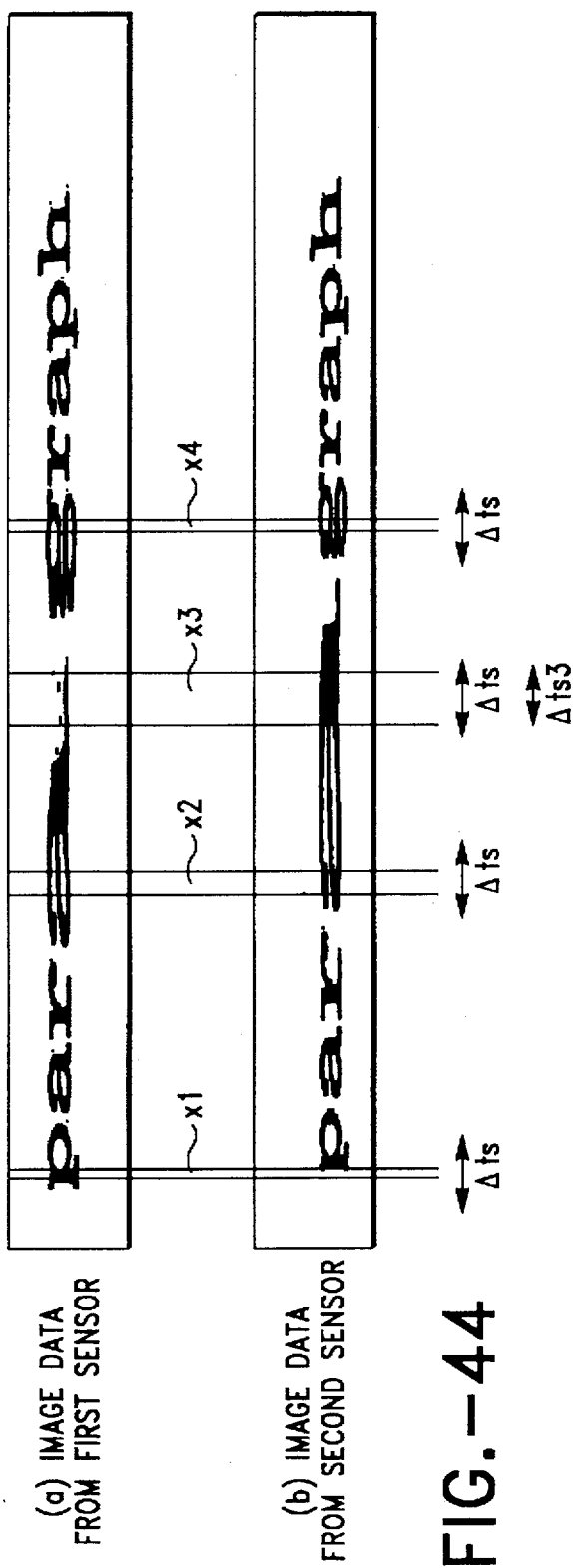
FIG. 44 explains, using an English language example, stop state judgment according to the first embodiment when image characters are small.

FIGS. 6 and 44 each show an image comprising the small characters in FIGS. 5B and 43B respectively, input at the same scanning speed as in FIGS. 2 and 40 described previously. Again, the upper scan line of each figure shows the image data from first sensor 101 and the lower scan line shows the image data collected from second sensor 102, and when the possible stop positions are estimated from these image data sets, the four possible stop positions x1 to x4 are estimated. When these possible stop positions are judged by the same threshold value Δts as shown in FIG. 2, all four possible stop positions x1 to x4 are judged as not being stop states in this case.

To avoid this problem, the size of the input character is considered in this invention and the threshold value Δts is set according to the size of the character. For example, if the threshold value Δts3 is set according to the size of the characters in the case of the small characters shown in FIGS. 5B and 43B, the Δt3 part of x3 is judged as a state in which scanning stopped as in FIG. 2 when the newly set threshold value Δts3 is utilized. By setting the threshold value based on the size of the characters in this way, a threshold value corresponding to the scanning speed is set and a distortion-free image can be obtained as a result of correction processing by image corrector 240.

More specifically, if the read width of image input member 100 is about 8 mm, the size of the characters that can be input is less than 7 mm×7 mm. Therefore, assuming the largest character size is 7 mm and the read interval of first and second sensors 101, 102 is 1 mm, the same image will not be continuously fetched for more than 6 mm. Therefore, assuming the scanning speed range in which an individual will scan this type of image input member is generally 60 mm/sec to 30 mm/sec, the maximum time the same image will continue will be less than 100 msec if scanning at 60 mm/sec and the maximum time the same image will continue will be less than 200 msec if scanning at 30 mm/sec. Further, in the case of smaller characters, 4-mm characters for example, the same image will not be continuously fetched for more than 3 mm by an image input member like that described above. Therefore, the maximum time the same image will continue will be less than 50 msec if scanning at 60 mm/sec and the maximum time the same image will continue will be less than 100 msec if scanning at 30 mm/sec. Therefore, in a case such as that above with such conditions as the read width of image input member 100, the read interval of first and second sensors 101, 102 or the scanning speed range, if the threshold value Δts is set between 50 msec and 100 msec according to the size of the characters, the correct stop state can be judged and distortion correction of the image can be accurately performed.

This threshold value Δts, more specifically, assumes an input character size of 2 mm to 7 mm, and if the character size is 2 mm with an input speed of 60 mm/sec to 30 mm/sec, an image input member 100 read width of 8 mm and a read interval of 1 mm between first and second sensors 101, 102, then the maximum time the same image will continue will be 20 msec if the input scanning speed is 60 mm/sec and the maximum time the same image will continue will be 40 msec if the input scanning speed is 30 mm/sec. If the character size is 7 mm, then the maximum time the same image will continue will be 100 msec if the input scanning speed is 60 mm/sec and the maximum time the same image will continue will be 200 msec if the input scanning speed is 30 mm/sec.

Figure 45:
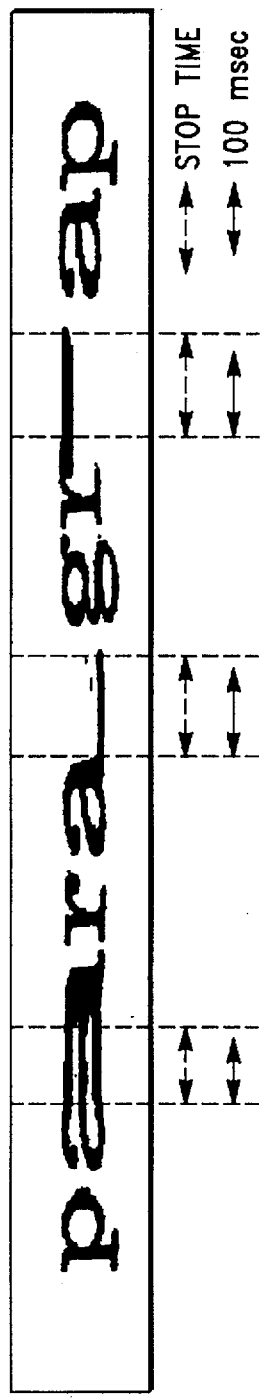
FIG. 45 illustrates an English language example in which scanning and stopping actions are repeated in short intervals according to the first embodiment.

Therefore, the time the same image will continue will be from 20 msec to 200 msec, but in actuality, if scanning is temporarily stopped during scanning and then scanning is immediately started again after stopping, then the same image will definitely be input for more than 100 msec (this has been demonstrated in repeated experiments), and if said threshold value Δts is set between 100 msec and 200 msec, then images input at an input speed of 60 mm/sec to 30 mm/sec can be accommodated. FIGS. 7 and 45 show Japanese and English language images obtained by repeating scanning and stopping at actually small intervals, and even if the action of changing from stop to scan is extremely fast, the stop state at all stop parts is always greater than 100 msec. Therefore, since it is impossible to have a stop state shorter than 100 msec in normal operation, said threshold value Δts can be set between 100 msec and 200 msec in practical application.

By seeking a new threshold value that considers both the threshold value corresponding to the scanning speed and the threshold value corresponding to the size of characters which are set as described above and using a threshold value that includes both these, more precise stop state judgment can be performed.

The processing whereby a scan stop state is judged during scanning was explained above, but below is an explanation of how a scan stop state is processed in the event a scan stop state is detected.

When scanning is performed in which scanning is temporarily stopped and then started again during scanning, there are cases in which the correlation of the images from first and second sensors 101, 102 obtained by feature comparison means 224 straddles the stop state time Δt as shown in FIGS. 8A, 8B and 46A, 46B and the image scanning lines are judged equivalent (i.e., after feature point detection by first sensor 101 is performed at t11, that feature point is detected at time t12 by second sensor 102). In this case, as described in the prior art, distortion correction could be performed in a manner which assumes that scanning is being performed at the average speed va even while image data input scanning is stopped using conventional overall scanning speed judgment. That is, in the scan stop state, even though the scanning speed is actually 0, in the case of FIGS. 8A, 8B and 46A, 46B, distortion correction corresponding to the average speed va between time t11 and time t12 is performed, thus resulting in incorrect distortion correction being performed.

If, however, the correlation of the images from first and second sensors 101, 102 obtained by feature comparison means 224 straddles the stop state time Δt as indicated in FIGS. 8A, 8B and 46A, 46B, shown as the distance between t11 and t12, and the images are assumed to be the same when scanning is temporarily stopped and then started again, then processing is performed that assumes the scanning speed to be 0 in the stop state and distributes the amount of travel during the stop interval to before and after the stop state as indicated by the dashed velocity line portion in FIGS. 8A, 8B and 46A, 46B.

Figures 38A, 38B:
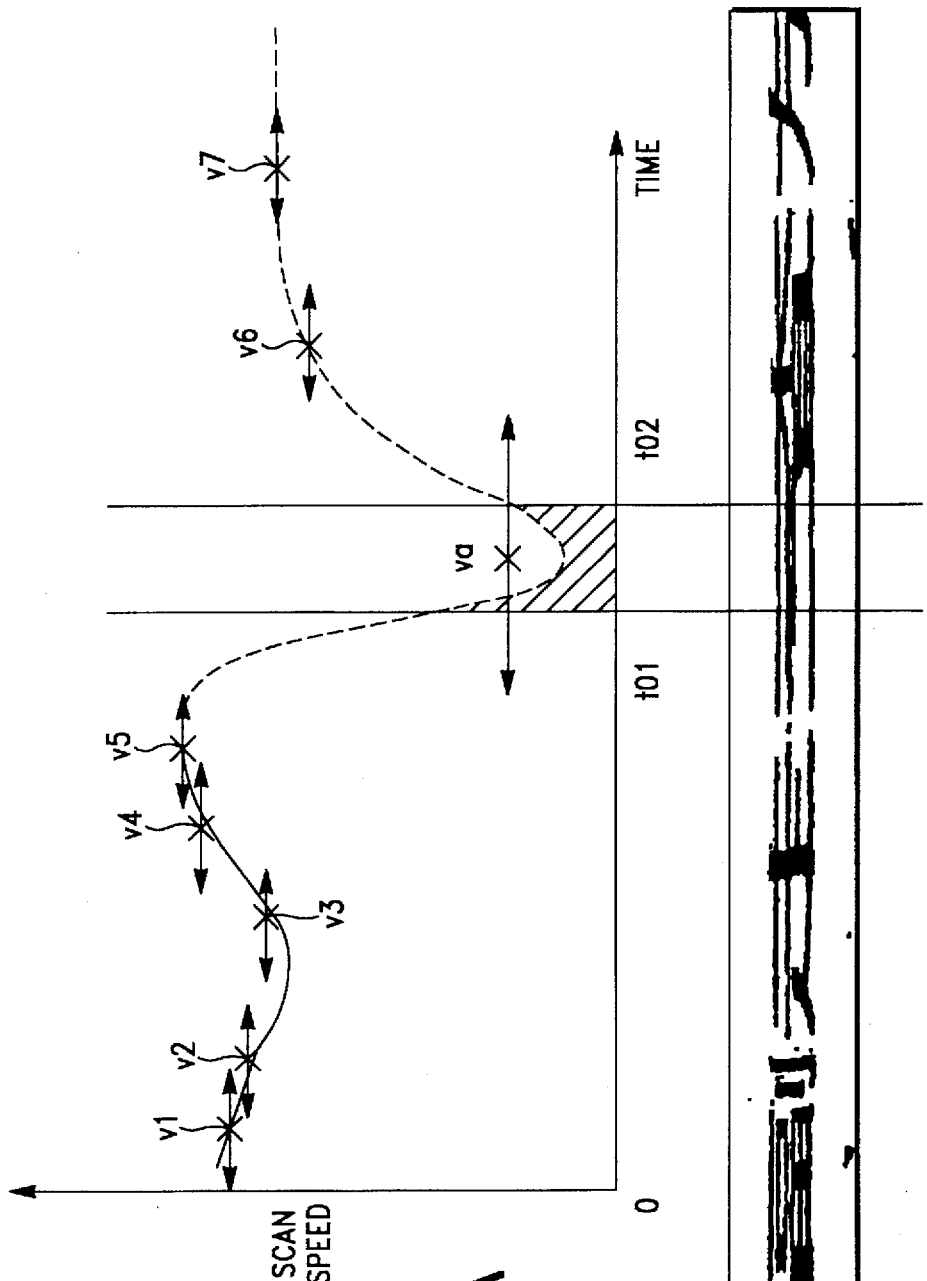
FIGS. 38A and 38B explain, using a Japanese language example, image processing when scanning temporarily stops according to the image processing device illustrated in FIG. 37.

That is, the change in speed before and after and including the stop state in the prior art shown in FIGS. 38 and FIG. 54A (dashed line in figure) does not consider that the speed during the stop interval is 0, but the amount of travel of image input member 100 sought from the speed change across the stop interval is itself a correct value. Therefore, simply considering the speed during the stop interval to be 0 and using the prior art speed change (dashed line in figure) as the speed before and after the stop interval will not actually degrade scanning quality to a perceivable degree.

Figure 9:
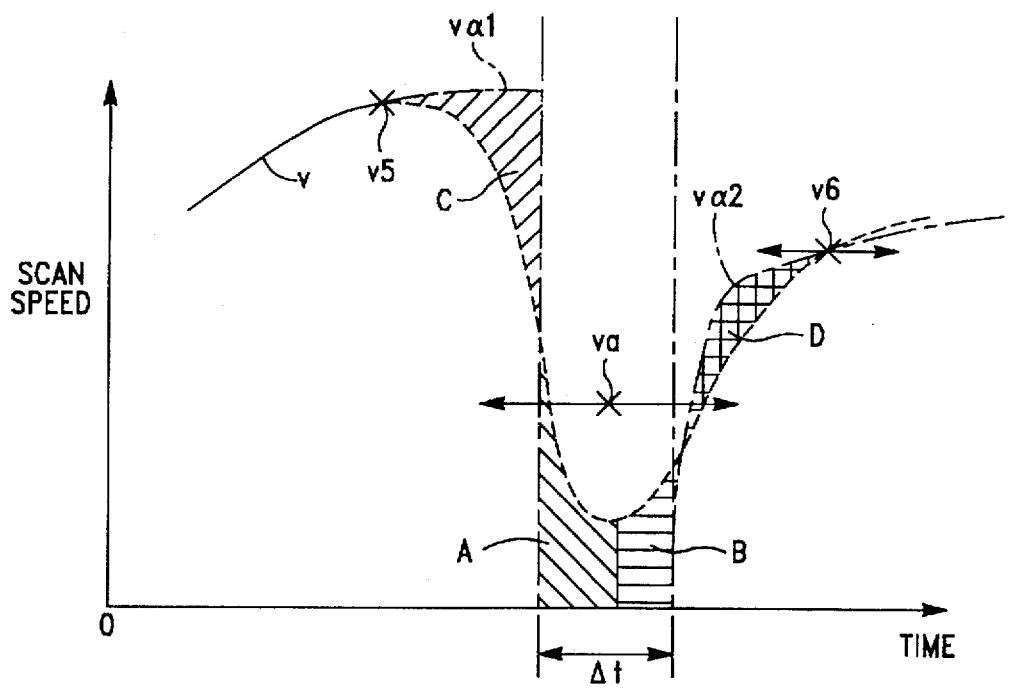
FIGS. 9 and 10 explain how the scanning speed before and after the stop interval is estimated in a case in which the scanning speed is calculated astride the stop time according to the first embodiment.
Figure 10:
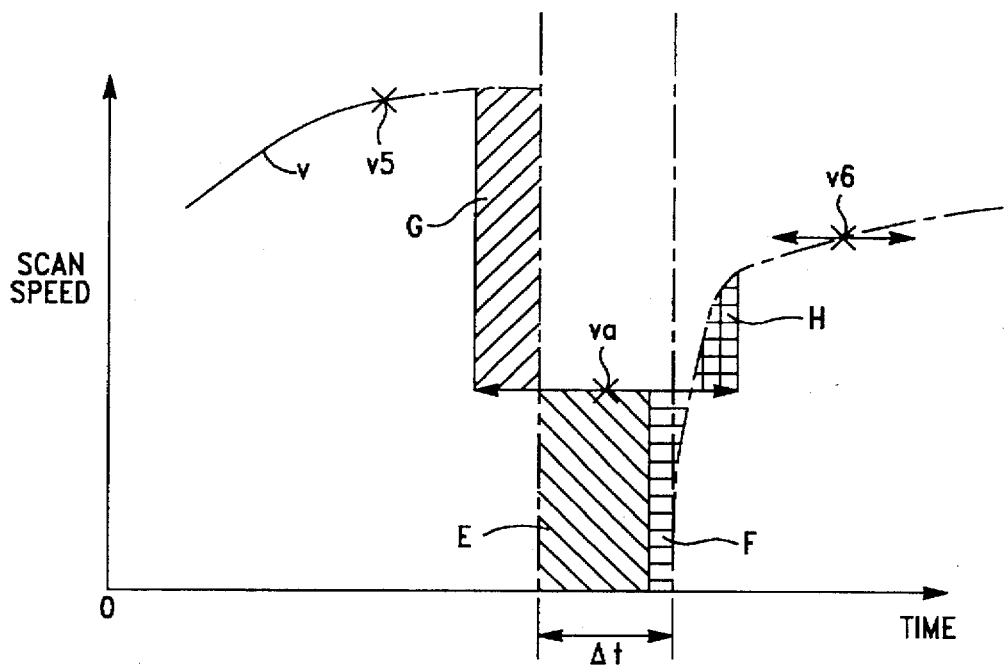

Here (FIGS. 8A, 8B and 46A, 46B), by distributing the amount of travel in the stop interval (hatched part in figure) into sequences before and after the stop interval, the change in scanning speed immediately before the stop interval (change in scanning speed from the point where speed v5 is detected to the point where the stop state begins in the same figure) and the change in speed immediately after the stop interval (change in scanning speed afar stop state end in the same figure) can be accurately estimated. As shown in FIG. 9, this speed estimation is performed such that of the amount of travel in the stop interval in the prior art (hatched area A and horizontal line area B in the figure), travel amount A equals area C, which is the difference between the newly estimated speed change (indicated by the chained line) and the speed change estimated in the prior art (indicated by dashed line), and of the amount of travel in the stop interval in the prior art (hatched area A and horizontal line area B in the figure), travel amount B equals area D, which is the difference between the newly estimated speed change (indicated by chained line) and the speed change estimated in the prior art (indicated by dashed line). Further, when also considered with respect to average speed, this means that, as shown in FIG. 10, travel amount E of the stop interval of the average speed va detected across the stop state is the same as area G, and travel amount F of the stop interval of the average speed va is the same as area H. By this means, it is possible to estimate the correct speed change, which considers the effect on speed change in the stop state.

However, the amount of movement cannot be distributed if the change in scanning speed before the stop interval cannot actually be determined. Therefore, based on scanning speed change V before the stop interval, scanning speed change vα1 from the detection point of speed v5 to the stop state starting point is estimated as indicated by the vertical chained line in FIG. 9, the travel amount A is sought based on travel amount C from this estimated speed change, travel amount B is sought by subtracting travel amount A from the travel amount in the prior art stop interval (hatched area A and horizontal line area B in figure), and scanning speed change vα2 after the stop state end point is estimated such that travel amount D is the same as travel amount B.

When estimating scanning speed change vα1 up to the stop state starting time based on scanning speed change V before the stop interval, the estimated speed may drop below 0 as indicated by the chained line of the scanning speed change vα1 in FIG. 11, depending on the condition of scanning speed change V before the stop interval. However, in this case, speed change vα3 continuous to scanning speed change V before the stop interval will be instead utilized, such that the scanning speed at the stop state starting point will be set equal to 0. Also, depending on the condition of scanning speed change V before the stop interval, if the estimated speed does not become 0 as indicated by the dashed line of scanning speed change vα1 in FIG. 12A, speed change vα4 non-continuous to scanning speed change V before the stop interval is instead estimated.

Next, the speed when the stop state is ended and scanning is started again is estimated. As an example wherein the speed is estimated when scanning is started again, estimation of a speed change such as vα5 which progresses from speed change vα4 before the stop interval can be considered. This performs speed estimation by excluding the average speed across the stop interval and the stop time from the speed estimation data. However, though it is clear that the scanning speed is 0 at the end of the stop interval, since there is a certain speed at the end point of the stop interval by this method, a distortion corresponding to the speed difference will result if distortion correction is performed as is.

Therefore, speed estimation when the stop state ends and scanning is started again estimates a speed change that is continuous from scanning speed 0. That is, using FIGS. 12A and 12B as an example, speed estimation when scanning starts again estimates speed change vα6 like that shown in the dashed circle, which is an enlargement of the encircled portion of FIG. 12A. By this means, a speed extremely close to the actual speed change can be estimated.

Figure 13:
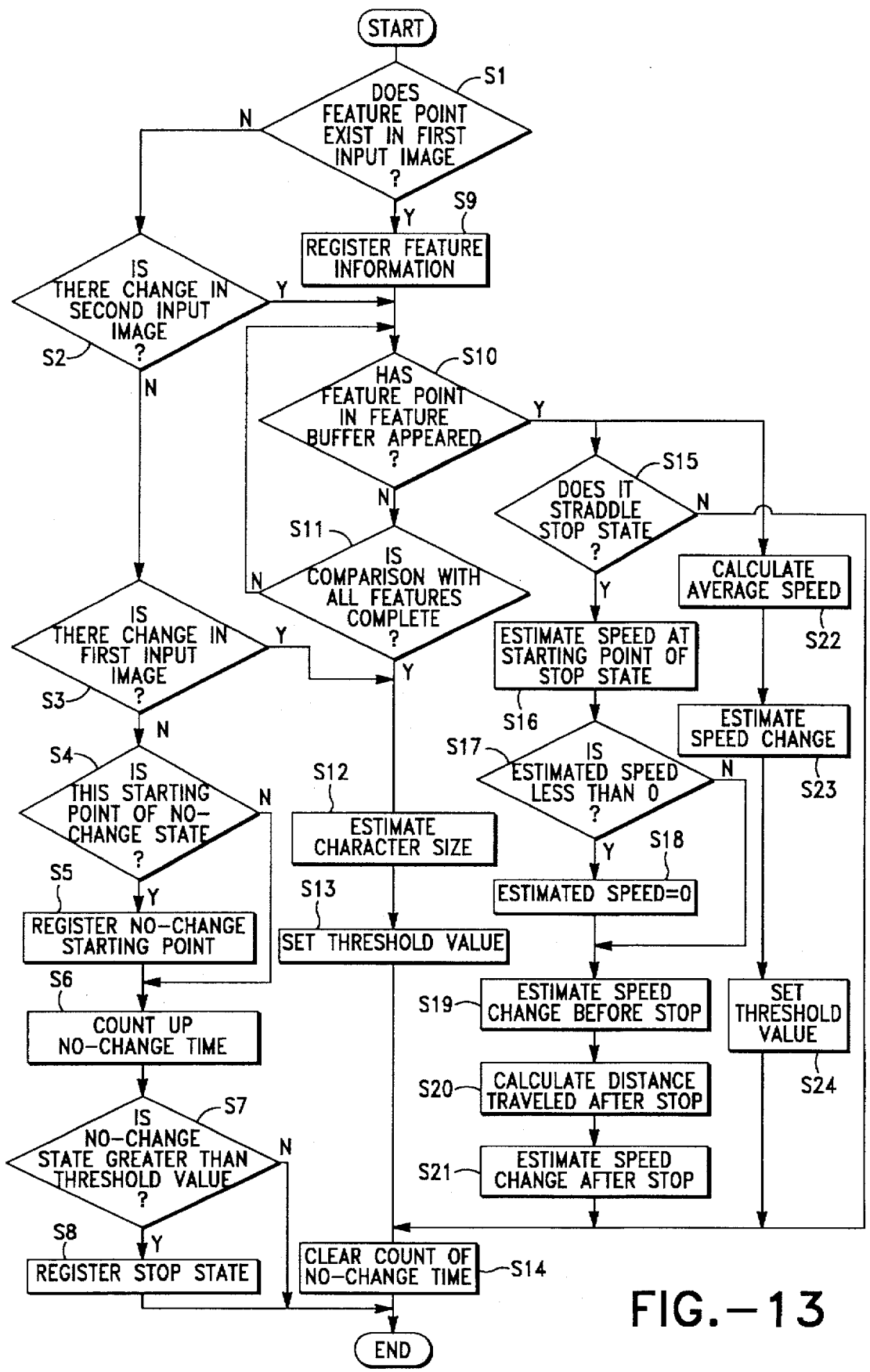
FIG. 13 is a flowchart explaining image processing according to the first embodiment.

FIG. 13 is a flow chart that explains the processing by speed detector 220 in the first embodiment of the invention explained above. Detection of the stop state is shown in step S1 to step S8 of the same figure. In summary, this stop state detection processing first judges whether or not there is a feature point in the image data (first input image) from first sensor 101 (step S1), and if there is no feature point, then it judges whether or not there is a change in the image data (second input image) from second sensor 102 (step S2). If there is a change, it indicates that image input member 100 is moving, and if there is no change, then it is possible that it is stopped. Therefore, at step S2, it is determined that there is no change in the second input image, then control passes to step S3 and it is judged if there is change in the first input image.

At step S3, if it is judged there is no change in the first input image in this step S3, there is a strong possibility image input member 100 has stopped and then it is judged whether or not that the current image position has been defined as a starting point for a non-change state (step S4).

If so, that point or image position is registered as a non-change state starting point (step S5) and measurement of the non-change time begins (step S5).

If, however, in step S4, the point is judged as not being the starting point for a non-change state (i.e. if a non-change state starting point is already registered and still in effect), measurement of the non-change time has already been started and so control jumps to step S6, in which non-change time continues to be counted from that point. Also, it is judged whether or not the count number is greater than a previously set threshold value Δts (step S7), and if the count member is greater than the threshold value Δts, it is registered as being a stop state (step S8).

As described above, the threshold value Δts is set by setting a threshold value based. The threshold value corresponding to the scanning speed of the perceived image data input is set, as shown in step S22 to step S24 in the flowchart in FIG. 13, by calculating the average speed of image input scanning as estimated by overall speed judgment device 225, estimating the speed change based on this average speed and then setting a threshold value corresponding to this scanning speed. Further, the threshold value corresponding to the size of the characters being input is determined by setting a threshold value corresponding to the character size after estimating the character size as shown in steps S12 and step S13 of the figure.

More specifically, estimation of average scanning speed (step S22) is done in a case in which a feature point is judged to exist in the first input image (step S1), for example, by loading the feature information of the first input image in feature buffer 223 (step S9) and then judging whether or not the feature point of the first input image loaded in feature buffer 223 appears in the second input image (step S10). If it does appear, then the average speed is calculated based on the temporal shift or time delay between the first and second sensors perceiving this feature (step S22), as is well known in the art.

Moreover, estimation of character size (step S12) is performed when a feature point is judged to exist in the first input image (step S1), for example, by loading the feature information of the first input image in feature buffer 223 (step S9) and then judging whether or not the feature point of the first input image loaded in feature buffer 223 appears in the second input image (step S10). Then, after comparing with all of the features (step S11), control passes to step S12 in which the character size for the perceived image data is estimated (step S12) as discussed previously. When corresponding threshold values are set, counting of the non-change time is cleared (the current non-change time interval is reset) (step S14). Processing then terminates naturally within the speed detector of the first embodiment.

If, however, in step S10 it is determined that a second image feature point does appear in the feature buffer 223 containing image data perceived from the lead or first sensor, control passes to concurrent threads S15–S21 and S22–S24. Steps S22–S24 have already been described above. However, in step S15, the appearance of the common feature point is judged as to whether or not it straddles a stop state (step S15) (or, is being scanned while the scanning wand is in a stop state), and if it does straddle a stop state, then the speed of the stop state starting point is estimated (step S16) as discussed hereinabove and the estimated speed is judged as to whether or not it is less than 0 (step S17). In this judgment, as explained with reference to FIG. 11, if the estimated speed is less than 0, the speed change before the stop state is estimated (step S19) using 0 as the speed at the stop state starting point (step S18). Further, if the estimated speed is not less than 0 in the judgment in step S17, then the speed change before the stop state is estimated in step S19 as described previously.

Also, processing is performed in step S20 that calculates the amount of travel after stopping, and once the speed change after stopping is estimated in step S21, then processing is performed that clears the count of the non-change time (step S14). As explained with reference to FIG. 9 hereinabove, the processing in steps S20 and S21 seeks travel amount A, based on travel amount C sought from the speed change before the stop state, and travel amount B, which is the result of subtracting travel amount A from the travel amount in the prior art stop interval, and estimates scanning speed change Vα2 after the stop state end point so that travel amount D is the same as travel amount B. If in step S15 it is judged that the appearance of the feature point does not straddle a stop state, then the count of the non-change time is cleared (step S14).

In summary, the explanation of the first embodiment relates to processing that judges whether or not a state existed in which image input member or scanning wand 100 was momentarily stopped while the scan activation button remained depressed, and if so, how the speed before and after the stop interval should be estimated assuming the scanning speed during the scan stop interval was 0. According to the first embodiment, a scanning stop state during scanning is judged to be a scanning stop state or not by setting a threshold value corresponding to the scanning speed before the stop state or the character size and comparing it with this threshold value, and therefore accurate scan stop state judgment can be performed. Further, if a scan stop state does occur, then the speed before and after the scan stop interval is estimated by distributing the amount of travel during the scan stop interval to time intervals before and after, whereby a speed change very close to the actual scan state can be obtained, thus facilitating accurate distortion correction.

Second Embodiment

Figure 14:
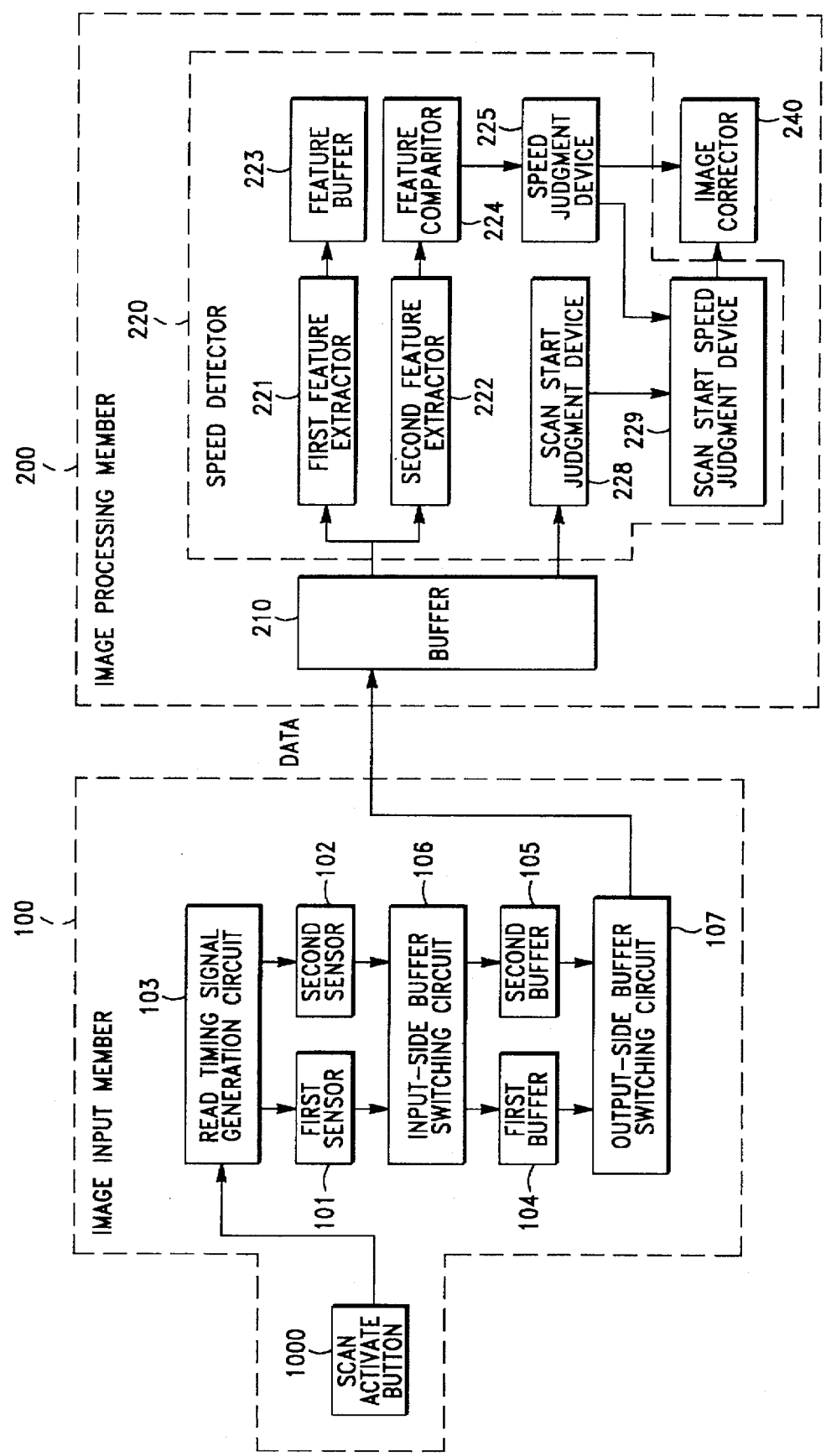
FIG. 14 is a block diagram of the second embodiment of the present invention.

Below is an explanation of the second embodiment of the present invention. FIG. 14 is a block diagram of the image input device related to the second embodiment. The configuration of image input member 100 is essentially the same as in FIGS. 1 and 37 described previously, and the same components as in FIGS. 1 or 37 are identified by the same numbers and explanations of their respective functions are omitted here.

Further, as in the first embodiment, image processing member 200 mainly comprises buffer 210, speed detector 220, and image corrector 240. Also, in addition to first feature extractor 221, second feature extractor 222, feature buffer 223, feature comparator 224 and overall speed judgment device 225, the speed detector 220 of the second embodiment also includes scan start judgment device 228 coupled to the raw image data buffer 210 for determining whether scanning movement of the image input member 100 has started, along with scan start speed judgment device 229 coupled to overall speed judgment device 225, scan start judgment device 228 and image corrector 240, which calculates the scanning speed at the start of scanning by image input member 100 based on information developed by the scan start judgment device 228 and overall speed judgment device 225.

In this embodiment of the present invention, as in the case of the first embodiment described hereinabove, the first and second feature extractors 221, 222, feature comparator 224, scan start judgment device 228, scan speed start judgment device 229, overall speed judgment device 225, and image corrector 240 take the form of interdependent threads executing on a general purpose processing system 2000 (FIG. 56). These threads permit the processing system 2000 to carry out the image development techniques and processes of the second embodiment when the processing system 2000 reads and executes their corresponding programming instructions from a computer readable storage medium. The storage medium containing the thread instructions can include, but is not limited to, any type of disk media including floppy disks, optical disks, CD-ROMs, magneto-optical disks, hard drives or disk arrays whether located within or external to the processing system 2000. Alternatively, the storage medium can include ROM, RAM, EPROM, EEPROM, Flash EEPROM or any other type of media suitable for storing computer readable instructions.

As described above, in the case of a prior art roller type image scanner, even if the input or scan activation button is depressed, an image is not input as long as the roller is not turning. However, in a two-line sensor type image scanners, even if scanning movement is stopped, an image is normally input while the input button is depressed, and a user will often start scanning a short while after depressing the input button in order for document alignment and image selection purposes.

If the input button is depressed for a short period before starting scanning, image data is input, but this image data is not data the user intended to input and should be considered unnecessary image data. Storing this unnecessary image data results in wasted processing and requires a large memory capacity, and contributes to an inefficient use of computing resources. Therefore, the scan start judgment device 228 monitors the image data collected from first and second sensors 101, 102 and judges that scanning by image input member 100 has started when the image data changes in certain ways, indicating movement of the sensors and the scanning wand they are mounted on. This will be explained in more detail using the Japanese language example presented in FIGS. 15A–15B and corresponding English example as shown in FIGS. 47A and 47B.

In these figures, an image is input from image input member 100 beginning from time t21 when the input button is depressed. By observing the images from first and second sensors 101, 102, the scan start judgment device 228 detects time t22 (FIGS. 15A and 47A) when the image from first sensor 101 first starts to change and time t23 (FIGS. 15B and 47B) when the image from second sensor 102 first starts to change. It is thereafter determined in a routine manner that image input member or scanning wand 100 started scanning at time t22. Consequently, only image data after time t22 will be stored in buffer 210.

Note, though, that there is no guarantee that the image from first sensor 101 will definitely change first, and this is greatly affected by the type of input image, scanning start position and even scanning wand 100 orientation. Therefore, the images from both first and second sensors 101, 102 are observed, and the point at which a change first occurs in either is judged as the scan start time.

If the user aligns the position with the input button depressed when this type of scan start judgment is performed, the sensors (first and second sensors 101, 102) are not focused on anything if image input member 100 is in mid-air. In this condition, the light from the LED, which is the light source, does not focus back on the sensors when reflected off the paper. Therefore, the light from the LED does not reach the sensors, and only ambient light enters the sensors as noise. Therefore, the image obtained from the sensors is essentially a black image as shown in the E1 interval in FIGS. 16 (Japanese) and 48 (English). Following this, as image input member 100 nears the paper surface to be input, the light from the LED is reflected off the paper and enters the sensors, whereby an image like that shown in the E2 interval in FIGS. 16 and 48 appears, and the perceived raw image data eventually morphs into a black on white image as shown to the right of the E2 time interval in both figures.

However, the image change occurring during interval E2 in either figure is an image change that occurs when the sensors begin to focus, and it is not a change in the image as a result of scanning operations. The following processing is preferably performed so that this kind of image change is filtered out and not considered as a scan starting point.

That is, when a miniaturized optical system is used for image input, the aberration is least pronounced near the center of the image. Near the periphery, however, the aberration is great, and if the focus is very much off, a clean image cannot be collected. This phenomenon is the reason why the image becomes white from the center out and the black areas remain in the periphery as image input member 100 comes close to the paper. Therefore, even if a change appears in the image, if the black area of the image exists in the periphery, then image input member 100 can be judged as not in contact with the paper. There are also cases in which the input image originally has black areas in the periphery, but since a change from a black area to a white area will definitely occur in this case, it does not present a problem. Accordingly, judgment is made as to whether a black area exists in the edge of the image input by the sensors, and if a black area such as that shown in E2 of FIGS. 16 or 48, should exist, it is not judged as a scan starting point. Therefore, when the peripheral black edges finally and completely disappear, according to the second embodiment, the scan starting point is calculated (time t31 in FIGS. 16 and 48)

Figure 17:
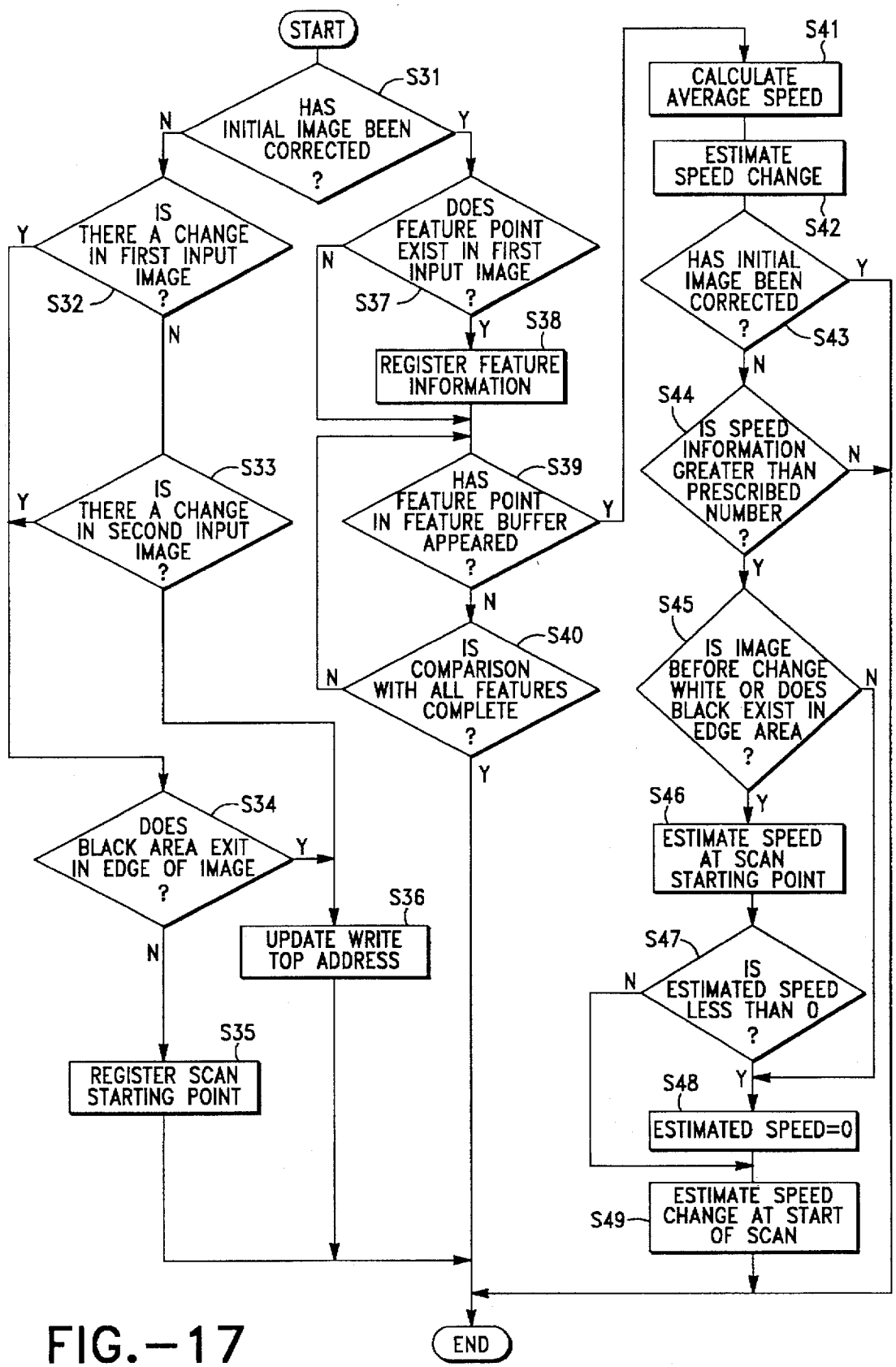
FIG. 17 is a flowchart explaining image processing according to the second embodiment.

The processing up to this stage is more clearly shown in reference to steps S31 to S36 in the flowchart of FIG. 17. In FIG. 17, first it is judged whether or not correction of the initial image is complete (step S31), and if correction is not complete, then it is judged if a change exists in the first input image (step S32), and if there is no change, then it is judged if a change exists in the second input images (step S33). When it is judged there is a change in at least one of the first and second input images, control within the speed detector 220 then passes to step S34, where it is judged if a black area exists on any edge or periphery of the image data, and if a black area does not exist, then image input member 100 is judged to be in a scan state and the scan starting point is registered (step S35).

If, however, it is judged that no change exists in both the first and second input images in steps S32 and S33, or if it is judged a black area exists in the edge of the image data in step S34, image input member 100 is not yet in a scan state in either case, and therefore the write top address in buffer 210 is updated (step S36), which essentially disregards any unprocessed image data perceived to this point. By continually updating the write start address in buffer 210 before scan start in this way, the image data after scan start has been judged is written to the top address in buffer 210, and subsequent image processing is based only on the image data collected from the scanning start point onward.

The scan start speed at this scan starting point is greatly affected by how the user depressed the scan activate button on image input member 100 and is not a fixed value. However, by looking at the overall change in the input image data, the scanning speed at the scan starting point can be judged to a certain degree. In this embodiment, by estimating the scan start speed by means of the scan start speed judgment device 220 which analyzes the scanning speed immediately after a scan start event and the attributes of input image data immediately before scan start, a speed change very near the actual input operation can be estimated, as will be explained in greater detail hereinbelow.

Figure 18:
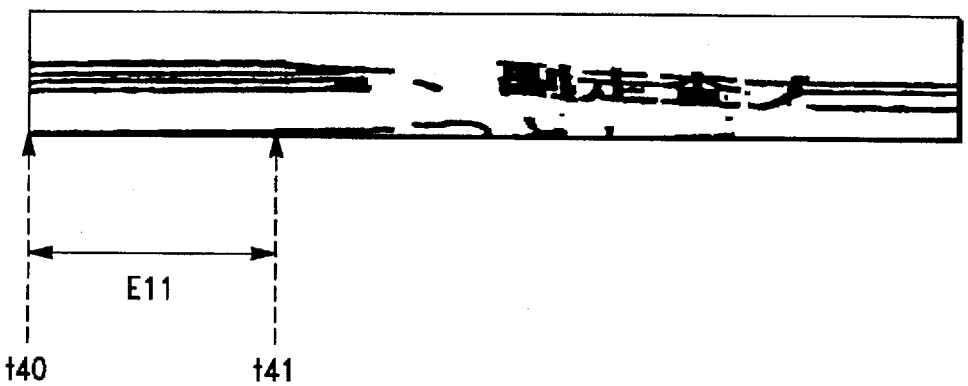
FIG. 18 shows a Japanese language example of an input image obtained in the scan stop state when a scan start event is detected according to the second embodiment.

FIGS. 18 (Japanese) and 49 (English) show input example image data when scanning is started a short while after the input button is depressed with image input member 100 in contact with the paper surface. A black area with no change in the horizontal direction continues for a while before scan start (E11 interval), but because this black area does not exist in the edge of the image data, it can be judged to be part of the desired source image. Therefore, assuming scanning was started thereafter, since a change should appear in the image data (time t41), it can be said that scanning by image input member 100 has not started in interval E11. Therefore, when a change appears in the image data in this situation (time t41), the scanning speed of image input member 100 is 0 and scanning is judged to have started from this point.

Figure 19:
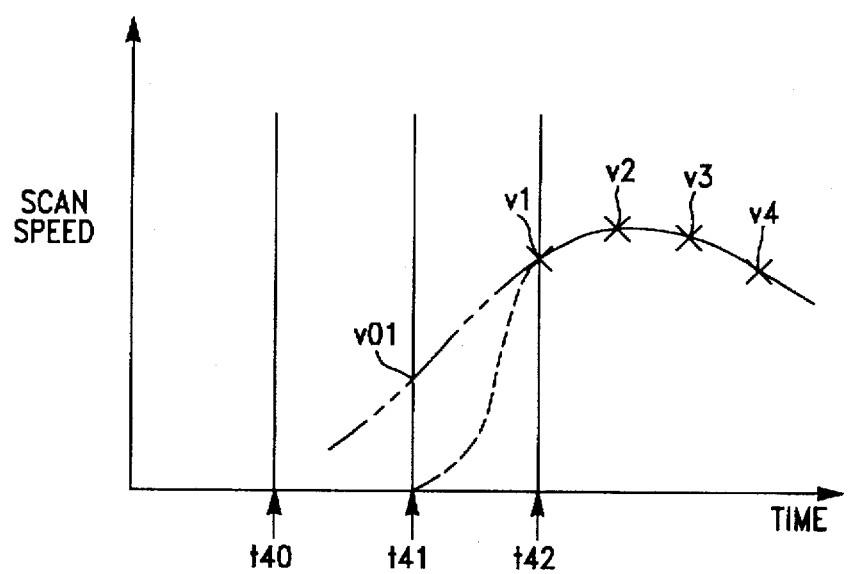
FIG. 19 diagrammatically explains the estimation of the speed change at scan start for the image shown in FIG. 18.

Estimation of the scan start speed under these conditions is explained with reference to FIG. 19. In FIG. 19, t40 is the time at which the input button is depressed and t41 is the time at which a change appears in the image data, i.e., time judged as scan start. Also, the curve indicated by the solid line is the speed change estimated from each average speed (calculated by speed judgment device 225) v1, v2, ... after scan start. Here, if the scan start speed is estimated based on the speed change after scan start, then the scanning speed at time t41 judged as scan start is estimated as speed v01. However, as described above, if considered based on the image before scan start, when a change appears in the image data, i.e., time when scanning is judged to have started, speed estimation is performed that continuously links a 0 scanning speed at time t41 to the average speed v1 (dashed line in figure) since it is clear that the scanning speed of image input member 100 is 0. Therefore, the speed change immediately after scan start can be accurately estimated.

As described above, the scanning speed at the scan starting point of image input member 100 can be estimated by monitoring the change in the input image data before scan start (e.g., the scanning speed at the scan starting point in the above example was estimated to be 0), but there are some images for which the scanning speed at the scan starting point cannot be estimated. For example, in a case like that shown in either FIG. 20 (Japanese) or FIG. 50 (English), wherein the image in interval E21 up until a change appears in the image after the input button is depressed is completely white or the image is the result of the input button being depressed while the image input device is in mid-air as previously shown in FIGS. 16 and 48, even if the scanning speed from the time the input button is depressed until an image appears is 0 or scanning is performed at a certain scanning speed, it is possible that a similar image will be input, and therefore the scan start speed cannot accurately be determined in the same way.

However, since input scanning is a continuous movement, there is sufficient information remaining in the speed change after scan start to estimate the speed at the scan starting point. Therefore, in this embodiment, in the case of images like those in FIGS. 16 or 48 and FIGS. 20 or 50 above, the speed at scan start is not estimated based on the image before the scan starting point by scan start speed judgment device 229. Rather, the speed at the scan starting point is estimated by retracing the speed change backward after scan start. This is better explained using FIG. 21.

Figure 21:
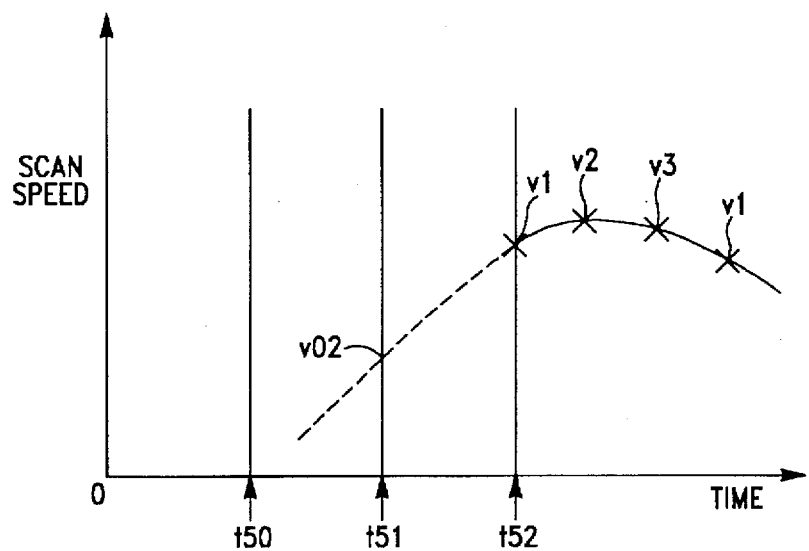
FIG. 21 explains speed estimation when the speed at scan start is estimated to be at least zero according to the second embodiment.

In FIG. 21, t50 is judged as the time when the input button is depressed and t51 is judged as the time when a change appears in the image data, i.e., when scanning is judged to have started. Also, the curve indicated by the solid line is the speed change estimated from each of the average speeds (calculated by overall speed judgment devices 225) v1, v2, ... after scan start. Here, if the scan start speed is estimated by tracing the change in speed backward after scan start so that it links continuously with this speed change, the scanning speed at time t51 judged as scan start is estimated as speed v02 (dashed line in figure). By this means, the speed change immediately after scan start can be accurately estimated.

Figure 22:
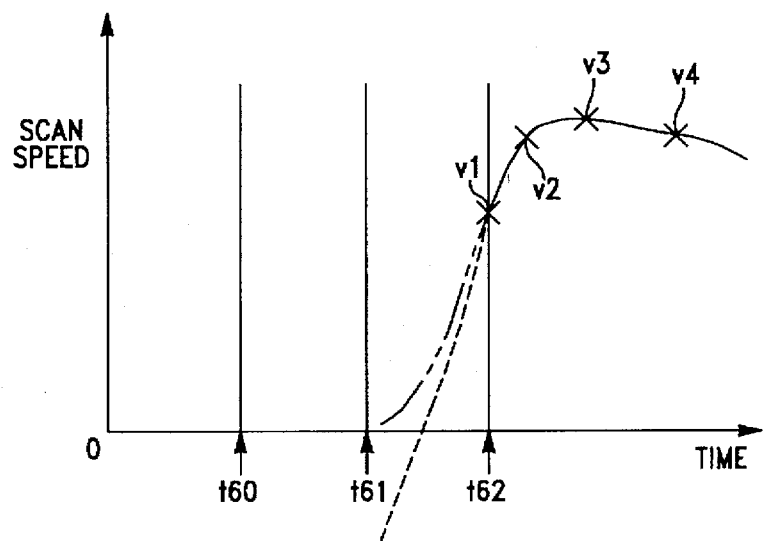
FIG. 22 explains speed estimation when the speed at scan start is estimated to be less than 0 according to the second embodiment.

Even in cases in which the scan start speed cannot be determined in the same way, it is possible to trace the speed change backward after scan start to estimate the speed at the scan starting point, but if the change in speed after scan start is sudden and the speed at the scan starting point is estimated based on that speed change, the speed at the scan starting point may drop below 0 as shown in FIG. 22 by a dashed line. In FIG. 22, t60 is judged as the time when the input button is depressed and t61 is judged as the time when a change appears in the image data, i.e., when scanning is judged to have started. Also, the curve indicated by the solid line beginning at time t62 is the speed change estimated from each of the average speeds (calculated by overall speed judgment device 225) v1, v2, ... after scan start. In this case, the speed rises quickly from average speed v1 to v2.

However, from the input image, a change occurs in the image at time t61 and it is clear that scanning is taking place at a speed at least greater than 0. Therefore, this is judged as the result of a sudden speed change, and at time t61 judged as scan start, the scanning speed of image input member 100 is considered to be 0 and the 0 scanning speed at time t61 is estimated such that it is continuously linked to the average speed v1 as indicated by the chained line in the figure. By this means, correction corresponding to a speed less than 0 is not performed on the image at input start and the speed change immediately after scan start is more accurately estimated.

The above processing is more clearly shown in reference to steps S37 to S49 in the flowchart in FIG. 17. Processing that calculates the average speed by overall speed judgment device 225 is performed in steps S37 to S41, roughly corresponding to steps S1, S9, S10, S11 and S22 in the flowchart in FIG. 13 used to describe the first embodiment. The speed change is estimated from the average speed sought in this manner (step S42). Further, when speed change estimation is complete, then control passes within speed detector 220 to step S43, in which estimation of the speed at scan start begins.

Figure 49:
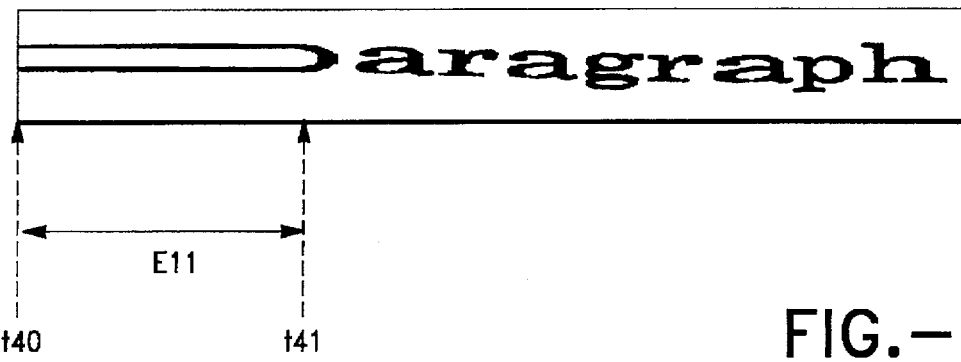
FIG. 49 shows an English language example of an input image obtained in the scan stop state when a scan start event is detected according to the second embodiment.

First, it is judged whether or not correction of the initial image is complete (step S43), and if correction is complete, then it is not necessary to estimate the speed at the start, but if correction is not complete, then it is judged if there is at least sufficient speed information to estimate the speed at scan start (step S44). If there is sufficient information in terms of average scan velocities, then it is judged if the image before the time at which a change appeared in the image data, i.e., time judged as scan start, is a white image or if a black area exists in the edge (step S45). In this judgment, if the image is not white and a black area does not exist in the edge (see, e.g. FIG. 18 or 49), then it is judged that scanning by image input member 100 was stopped in contact with the paper, in which case, as explained in FIG. 19, the scan start speed at the scan starting point is 0 (step S48).

If, however, in step S45 it is determined that the scanned image is entirely white or a black area exists on the edge or periphery (see FIGS. 15A–15B, 47A–47B and FIGS. 20,50 respectively), however, the speed at the scan starting point is judged (step S46) as explained above in reference to FIGS. 21 and 22, then the estimated speed at the scan starting point is judged whether or not it is less than 0 (step S47). In this judgment, if the estimated speed at the scan starting point is not less than 0, then the speed change in the initial part of scanning is estimated (step S49) as indicated by the dashed line in FIG. 21. Further, if the estimated speed at the scan starting point is less than 0 (see FIG. 22), then the scan start speed at the scan starting point is assumed to be 0 (step S48), after which the speed change in the initial part of scanning is estimated (step S49) as indicated by the chained line in FIG. 22.

As described above, the image data input up to the scan starting point is not data that was intended to be input and is unnecessary image data. Therefore, the image data that was input up to this scan starting point need not be corrected. Therefore, the image data input up until the time (t31, t41, t51) at which a change appears in the image data of FIGS. 16 or 48, FIGS. 18 or 49, and FIGS. 20 or 50 is not required as image data and the data during this period is not stored in the buffer or corrected.

Third Embodiment

Figure 23:
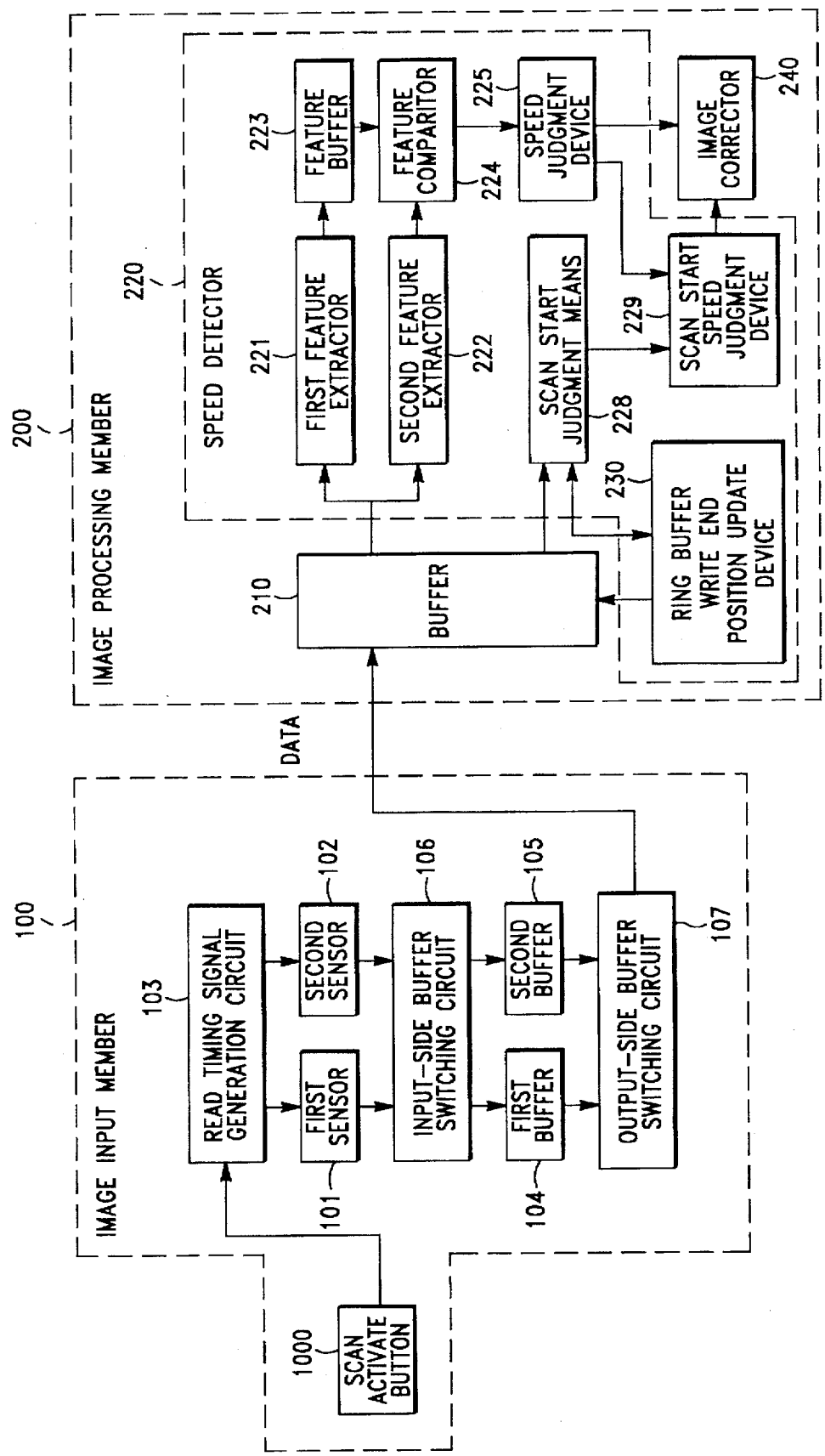
FIG. 23 is a block diagram of the third embodiment of the present invention.

The third embodiment illustrates processing according to the present invention which does not store images input up until the scan starting point in the buffer, and the configuration for realizing that is shown in FIG. 23.

The configuration of image input member 100 is essentially the same as discussed in connection with the first and second embodiments, so a detailed explanation of its structure and function is omitted here.

As discussed in connection with the first and second embodiments above, image processing member 200 mainly comprises buffer 210, speed detector 220, and image corrector 240. Since buffer 210 is a true ring buffer in this embodiment, it will be referred to as ring buffer 210 in the third embodiment. Also, in addition to first feature extractor 221, second feature extractor 222, feature buffer 223, feature comparator 224, overall speed judgment device 225, scan start judgment device 228 and scan start speed judgment device 229, the speed detector 220 now also includes ring buffer write end position update device (abbreviated as write end position update device hereinbelow) 230 which receives information from the scan start judgment device 228 and updates the write end address in the ring buffer 210.

In this embodiment of the present invention, as in the case of the first and second embodiments described hereinabove, the first and second feature extractors 221, 222, feature comparator 224, scan start judgment device 228, scan speed start judgment device 229, write end position update device 230, overall speed judgment device 225, and image corrector 240 take the form of interdependent threads executing on a general purpose processing system 2000 (FIG. 56). These threads permit the processing system 2000 to carry out the image development techniques and processes of the second embodiment when the processing system 2000 reads and executes their corresponding programming instructions from a computer readable storage medium. The storage medium containing the thread instructions can include, but is not limited to, any type of disk media including floppy disks, optical disks, CD-ROMs, magneto-optical disks, hard drives or disk arrays whether located within or external to the processing system 2000. Alternatively, the storage medium can include ROM, RAM, EPROM, EEPROM, Flash EEPROM or any other type of media suitable for storing computer readable instructions.

Figure 20:
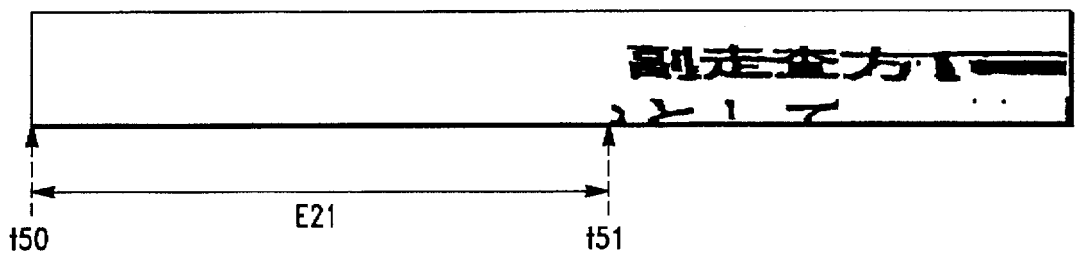
FIG. 20 shows a Japanese language example of an input image in a case in which the input image prior to scan start is entirely white.

In this configuration, in the case of the image in either FIGS. 20 (Japanese) or 50 (English), for example, image input member 100 starts the input of image data from the time the input button is depressed at time t50, and the image data from first and second sensors 101, 102 is stored in first and second buffers 104, 105 and the image data in a buffer that has become full is transferred to ring buffer 210. This is explained below with reference to FIGS. 24A and 24B.

First, ring buffer 210 is still completely empty when the input button is depressed as indicated by column A in FIG. 24B. Following this, when first buffer 104 becomes full, the stored data is transferred to ring buffer 210 and is written sequentially from pointer Ps which indicates the write start position, thus resulting in a state like that indicated by column B of the figure. As second buffer 105 becomes full, the stored data is sequentially written from pointer Ps downward which indicates the write start position, thus resulting in a state like that indicated by column C. Then as first buffer 104 becomes full, the stored data is transferred to ring buffer 210, but as can be seen in column C, there is little free space in ring buffer 210 and only part of the image data stored in first buffer 104 is written, thus resulting in a full state like that indicated by column D. As a result, image input processing cannot be continued and image input is ended.

However, since the image input device of this invention corrects distortion of the image while inputting the image, the pointer Pe, which indicates the image write end position, is continually updated up to the position where processing is completed in normal input. That is, at column C of FIG. 24B, correction processing of much of the image data obtained from first buffer 104 (hatched areas in FIGS. 24A and 24B) is already complete, and therefore, as indicated in column D, the part for which correction processing is completed becomes the write end position for that data. That is, pointer Pe, which indicates the image data write end position, is updated to where processing has been completed( indicated by pointer Pe'), and since this creates free space and makes it possible to write the next image data, the write start position Ps for new image data does not immediately overtake pointer Pe', which indicates the new image write end position, thus making it possible to input image data over a long period in a memory conserving manner.

Figure 50:
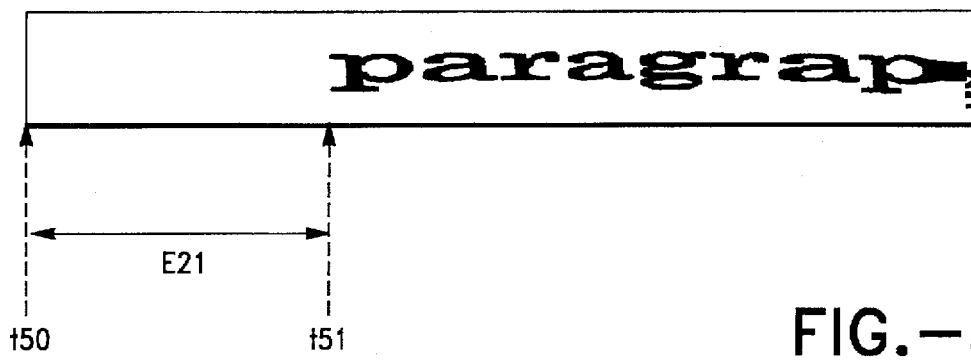
FIG. 50 shows an English language example of an input image in a case in which the input image prior to scan start is entirely white.

As in FIGS. 20, 50 described above, however, if there is no change in the image for a short while after input starts, distortion correction processing of the image data is not performed, and therefore pointer Pe which indicates the image data write end position as described above is not updated. This causes ring buffer 210 to become full right away and makes it impossible to input any more image data. However, as described above, the actual necessary image is the image data after t51 in the case of FIGS. 20 and 50 and there is no need to store image data until t51 is reached.

A solution to this storage issue is presented in FIGS. 25A and 25B. As in FIG. 24A, FIG. 25A shows the image data from the image in either FIG. 20 or 50 stored in first and second buffers 104, 105, and FIG. 25B shows the state of data storage in ring buffer 210.

Ring buffer 210 is still completely empty when the input button is depressed as indicated by column A in FIG. 25B. At this time, pointer Ps, which again indicates the image data write start position, and pointer Pe, which again indicates the image data write end position, are at the same position. When first buffer 104 later becomes full, the stored image data is transferred to ring buffer 210, and ring buffer 210 becomes as shown in column B. As a result, pointer Ps which indicates the image data write start position moves to the position indicated and the next image data are written from this position. Meanwhile, scan start judgment device 228 judges the image data, and it is judged that the image data in column B from first buffer 104 is not in a scan start state. As a result, write end position update device 230 updates pointer Pe which indicates the image data write end position to the position shown in column C and ring buffer 210 becomes completely empty.

Following this, when second buffer 105 becomes full, the stored data is transferred to ring buffer 210 and is sequentially written from pointer Ps, thus resulting in the state shown in column D of FIG. 25B. As described above, by the time the next image data is transferred, the scan start judgment device judges the image data and the column D image data from second buffer 105 is judged to not be in a scan start state. As a result, pointer Pe which indicates the image data write end position is updated to the position indicated by column E of the same figure by write end position update device 230, thus totally flushing ring buffer 210.

Further, when first buffer 104 becomes full, the stored image data is transferred to ring buffer 210 and sequentially written from pointer Ps which indicates the image data write start position, and the data that could not be written is written from the beginning in a ring fashion, thus resulting in the state indicated by column F in FIG. 25B. Here, as described above, in the time until the next image data is transferred, the image data is judged by scan start judgment device 228, but in this case scan start is judged to occur at point contained within the contents of ring buffer 210 transferred from first buffer 104, as shown in column F of FIG. 25B.

Therefore, until scan start is judged to occur, pointer Pe which indicates the image data write end position is updated, and in this case, pointer Pe is ultimately updated to the position indicated by column G of FIG. 25B. Since the image data stored as indicated by column G is data subsequent to scan start and is data subject to distortion correction, pointer Pe which indicates the image data write end position is not updated and the stored image data from second buffer 105 is written from pointer Ps which indicates the image data write start position, thus resulting in the state shown in column H.

Following this, as described above, since correction of image distortion is performed while image input is performed, write start position Ps for new image data does not immediately overtake pointer Pe which indicates the image write end position, thus making it possible to input image data over long periods.

In this way, image data up until scan start is judged by scan start judgment device 228 is not stored in ring buffer 210, and therefore the buffer is effectively utilized, and even in cases in which a scan stop state continues for a long period before scan start, the problem of the buffer becoming full right away and having to stop image data input is solved, thus allowing image data input without worrying about time.

Fourth Embodiment

Figure 26:
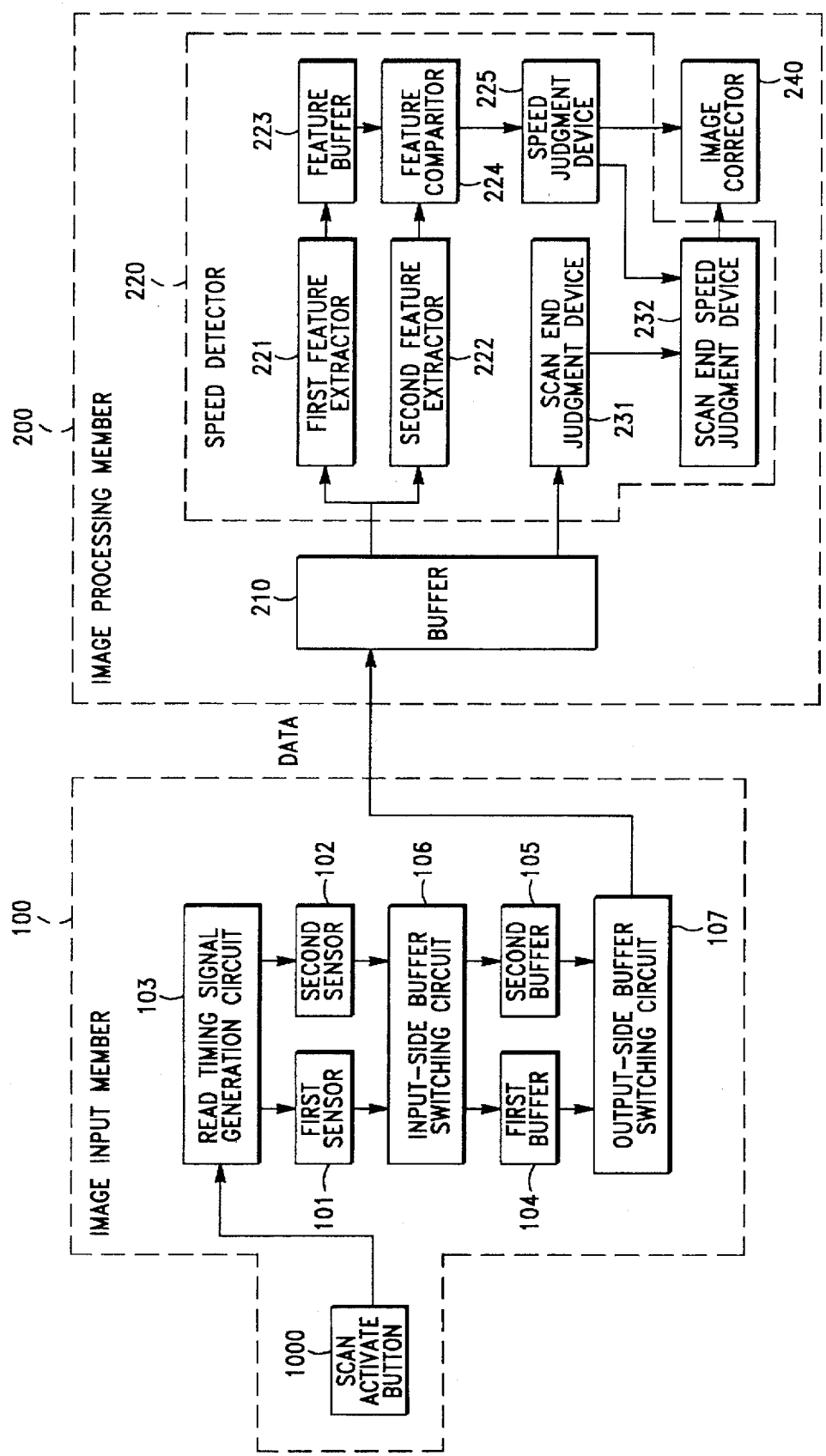
FIG. 26 is a block diagram of the fourth embodiment of the present invention.

Next is an explanation of the fourth embodiment of the present invention. FIG. 26 is a block diagram of the image input device related to the fourth embodiment The configuration of image input member 100 is the same as discussed previously in connection with the previous preferred embodiments, so further explanation is omitted here.

As discussed in connection with the first, second and third preferred embodiments above, image processing member 200 includes buffer 210, speed detector 220, and image corrector 240. Also, in addition to first feature extractor 221, second feature extractor 222, feature buffer 223, feature comparator 224, and overall speed judgment device 225, the speed detector 220 according to the fourth embodiment now also includes scan end judgment device 231 coupled to the buffer 210 which determines when scanning operations by image input member 100 has ended, along with scan end speed judgment device 232 coupled to overall speed judgment device 225, scan end judgment device 231 and image corrector 240 for determining the scanning speed at the end of scanning by image input member 100 based on information generated by the scan end judgment device 231 and overall speed judgment device 225.

In this embodiment of the present invention, as in the case of the first, second and third embodiments described hereinabove, the first and second feature extractors 221, 222, feature comparator 224, scan end judgment device 231, scan end speed judgment device 232, overall speed judgment device 225, and image corrector 240 take the form of interdependent threads executing on a general purpose processing system 2000 (FIG. 56). These threads permit the processing system 2000 to carry out the image development techniques and processes of the second embodiment when the processing system 2000 reads and executes their corresponding programming instructions from a computer readable storage medium. The storage medium containing the thread instructions can include, but is not limited to, any type of disk media including floppy disks, optical disks, CD-ROMs, magneto-optical disks, hard drives or disk arrays whether located within or external to the processing system 2000. Alternatively, the storage medium can include ROM, RAM, EPROM, EEPROM, Flash EEPROM or any other type of media suitable for storing computer readable instructions.

As described above, in the case of a prior art roller type image scanners, even if the input button is depressed, an image is not input as long as the roller is not turning. In a two-line sensor type image scanning system, however, even if scanning is stopped, an image is normally input while the input button is depressed, and a user will often continue to depress the input button a short while after input scanning is complete. According to the known art, if the input or scan activate button is depressed for a short period after scanning is ended, image data is input and distortion correction is performed for this image data. However, image data input after the user stops scanning is not data the user intended to input and can be considered unnecessary image data. Storing this unnecessary image data results in wasted processing and requires a large memory capacity.

Accordingly, the scan end judgment device 231 monitors the images from first and second sensors 101, 102 and judges that image scanning through image input member or scanning wand 100 has ended when there are no more changes in the images. This event is explained using FIGS. 15A, 15B and 47A,47B.

In each of these figures, image input ends at position t26 on the image data when the input button is released (switched OFF). However, there are cases in which the input scanning of image data actually ends before that. By observing the image data from first and second sensors 101 and 102, scan end judgment device 231 detects time t24 which is the last change point in the image data from first sensor 101 and also time t25 which is the last change point in the image data from second sensor 102. Accordingly, image input member 100 is judged to have stopped scanning at time t25. As before in the case of the scan start judgment device 228 featured in the second and third embodiments discussed hereinabove, there is no guarantee that the change point in the image data from second sensor 102 will not come later, and this is greatly affected by the input image and the input start position, as well as scanning wand orientation. Therefore, the images from both first and second sensors 101, 102 are observed, the "latter" last change point in one or the other is detected, and the point that changes last is judged as the scan end point (position and time).

In other words, changes are generated in the image data by scanning image input member 100, but if scanning is stopped, then there are no more changes in the image data. Therefore, if there are no more changes in the image data and this continues for a fixed period of time and then the input button is released after that, the last point at which changes in the image data stopped may be accurately considered to be the last change point. This last change point can also be considered to be the starting point for a state in which no changes occur in the image for at least a fixed period of time. Therefore, as one judgment of the scan end point by scan end judgment device 231, when there is a state in which there is no change in the image data for at least a fixed period of time and the input button has been released, the starting point of that state in which there is no change in the image data for at least a fixed period of time is assumed to be the scan end point. The scan state is judged by determining if said fixed time period is larger than a previously set threshold value as explained in connection with the stop-state judgment device 226 of the first embodiment, and likewise could be modified to accommodate character size and overall scanning speed variations, as previously discussed. Therefore, their further explanation has been omitted herein.

Note, however, when performing scan end judgment, there are many cases in which scanning is ended before the input button is released. This is because the input button is often not released for a short period after completing a scan or the input button is often released after image input member 100 is moved away from the paper surface after completing a scan.

Particularly when the input button is released after moving image input member 100 from the paper surface; i.e., when image input member 100 is in mid-air, the sensors (first and second sensors 101, 102) are not focused on anything. In this condition, the light from the LED, which is the light source, does not focus back on the sensors when reflected off the paper. Therefore, the light from the LED does not reach the sensors, and only extraneous light enters the sensors as noise. Therefore, the image obtained from the sensors becomes a black image as shown in the E31 interval in FIGS. 27 (Japanese) or 51 (English). Before this black image is formed; i.e., when image input member is just starting to be moved away from the paper, the light from the LED reflected off the paper gradually stops entering the sensors and a change occurs in the image resulting in an image like that shown in the E32 interval in FIGS. 27 and 51.

However, this image change is an image change that occurs when the sensors start to go out of focus, and it is not a change in the image obtained by scanning image input member 100. The following processing is performed so that this kind of image change which occurs when the sensors start to go out of focus is not judged as a scan ending point.

Figure 27:
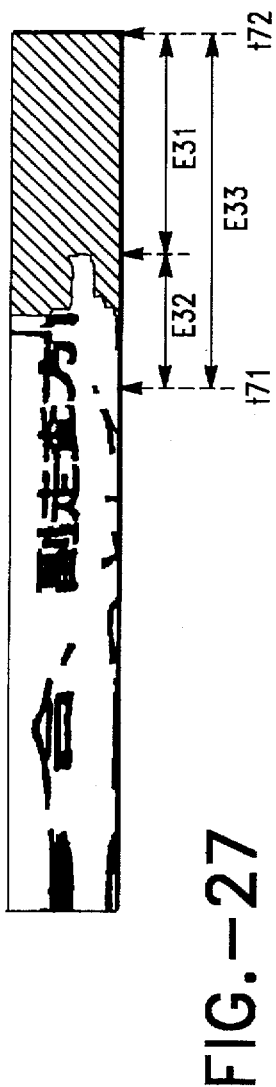
FIG. 27 shows a Japanese language example of an input image with the image input member in mid-air after scan end.
Figure 51:
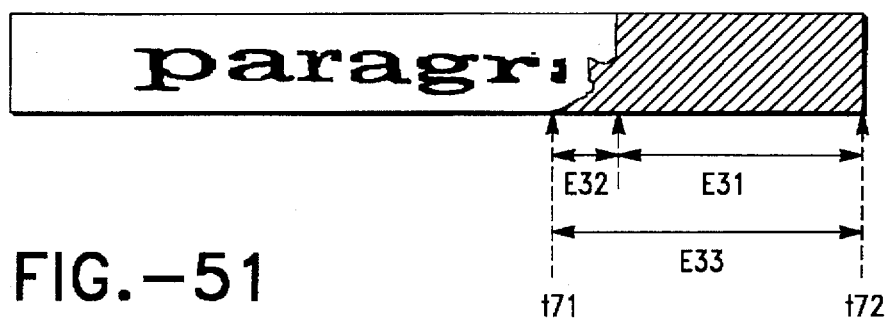
FIG. 51 shows an English language example of an input image with the image input member in mid-air after scan end.

That is, when a miniaturized optical system is used, the aberration is least pronounced near the center of the image. Near the periphery, however, the aberration is great, and if the focus is very much off, a clean image cannot be input. This phenomenon is the reason why the image becomes black from the periphery as image input member 100 moves farther from the paper. Therefore, even if a change appears in the image, if a black area of the image exists in the periphery, then image input member 100 can be judged as not in contact with the paper. There are also cases in which the input image originally has black areas in the periphery, but since a change from a black area to a white area will definitely occur in this case, it does not present a problem. Accordingly, judgment is made as to whether a black area exists in the edge of the image input by the sensors, and if a black area such as that shown in time interval E33 of FIGS. 27 and 51 should exist, it is not judged as a scan end point. In FIGS. 27 and 51, therefore, the t71 position is judged as the scan end time.

In an alternative method of scan end point judgment by scan end judgment device 231, the temporal changes in the image data from the first and second sensors are monitored, and even if a change should occur in the input image data, if a black area of the image data exists in the edge of the read area and the input button has been released, the point at which the black area appears in the read area is considered to be the scan end point (position at t71 as shown in FIGS. 27 and 51).

The scan end speed at this scan end point is greatly affected by the state in which the user released the input button on image input member 100, and a fixed value is not always obtained. However, by looking at the overall changes in the input image data, the scanning speed at the scan end point can be estimated to a certain degree. In this embodiment, the scan end speed is estimated by scan end speed judgment device 232 based on the scanning speed immediately before scan end and the input image after scan end, whereby it is possible to estimate a speed change near that of the actual input operation.

Figure 28:
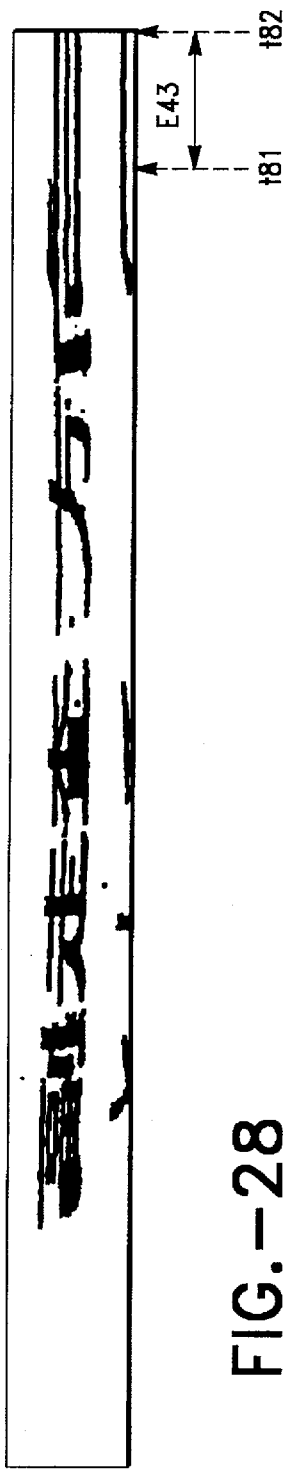
FIG. 28 shows a Japanese language example of an input image obtained in the scan stop state at the time of scan end according to the fourth embodiment.
Figure 52:
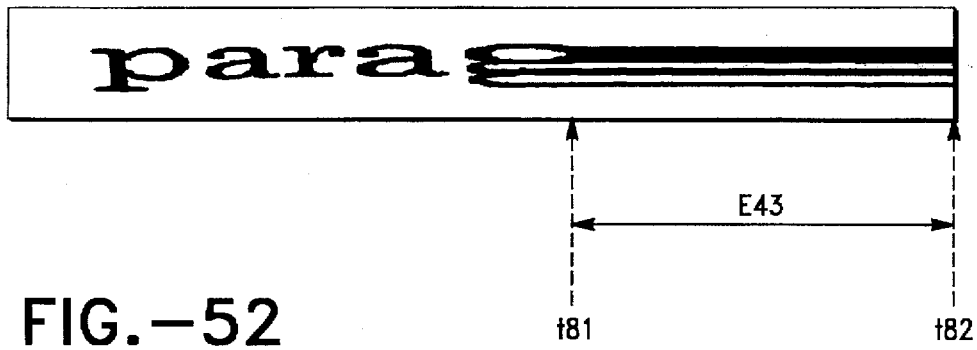
FIG. 52 shows an English language example of an input image obtained in the scan stop state at the time of scan end according to the fourth embodiment.

Both FIG. 28 (Japanese) and English-counterpart FIG. 52 show examples of input image data when the input button is depressed for a short while and then the input button is switched OFF with image input member 100 still in contact with the paper after scanning movement by image input member 100 is stopped. A black area with no changes continues for awhile in this image data after scan end (E43 interval), but since this black area does not extend into the periphery of the image data, it can be judged to be a character image. Therefore, since a change will definitely appear in the image data if scanning continues, scanning by image input member 100 can be considered to have stopped in the E43 interval. Therefore, it is judged that the scanning speed of image input member 100 at the last change point (time t81) of the image in this state is 0 and that scanning ended at this point.

Estimation of the scan end speed in this situation is explained with reference to FIG. 29. In this figure, t81 refers to the time judged as the last change point, i.e., scan end, of the image data, and t82 is the time at which the input button is switched OFF. Further, the curve indicated by a solid line is the speed change estimated from each of the average speeds (as calculated by overall speed judgment device 225) $v_{11}, v_{12}, \ldots$ immediately before scan end. Here, when the scan end speed is estimated based on the speed change immediately before scan end, the scanning speed at time t81, which is judged as scan end, is estimated as speed v02. However, if considered based on the image after scan end as described above, when there are no more changes in the image data; i.e., time judged as scan end, the scanning speed of image input member 100 is clearly 0, and therefore the speed is estimated such that scanning speed 0 at time t81 is continually linked to average speed v14 (dashed line in figure). Consequently, the speed change immediately after scan end can be accurately estimated.

Figure 30:
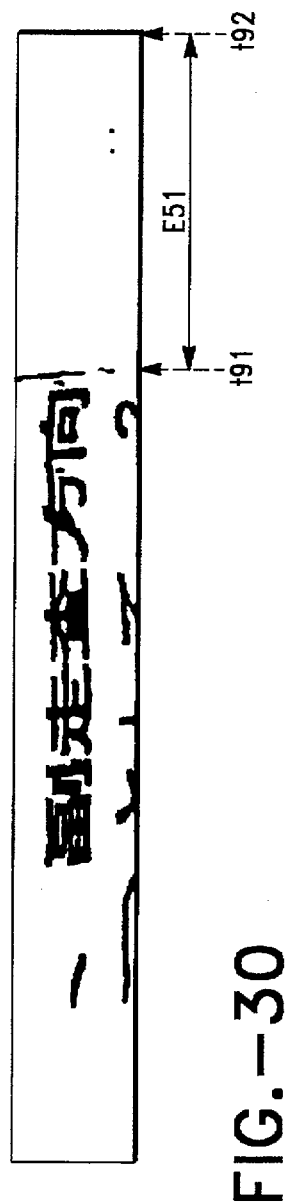
FIG. 30 shows a Japanese language example of an input image in a case in which the input image after scan end is white.

As described above, it is possible to estimate the scanning speed at the scan end point of image input member 100 by monitoring the change state of the input image data after scan end (e.g., the scanning speed at the scan end point was estimated to be 0 in the above example), but there are some images for which it is impossible to estimate the scanning speed at the scan end point. For example, as in FIGS. 30 (Japanese) or 53 (English), if the input button is released when the image is completely white (interval E51), or if the input button is released when the image input member is in mid-air as in FIGS. 27 or 51 described above, it is possible that the same image is being input even if the scanning speed is 0 or even if scanning is being performed at a certain speed from the last image change point, i.e., scan end time, until the input button is released, and the scan start speed cannot be determined in the same way.

However, since input scanning is a continuous operation, there is sufficient information in the speed change before scan end to estimate the speed at the scan end point. Therefore, in this embodiment, in the case of images like those in FIGS. 27, 51 and FIGS. 30, 53 described above, the speed at the scan end point is not estimated from the image after scan end judged by scan end speed judgment device 232. Rather, the speed at the scan end point is estimated from the speed change before scan end. This method can be explained using FIG. 31.

Figure 31:
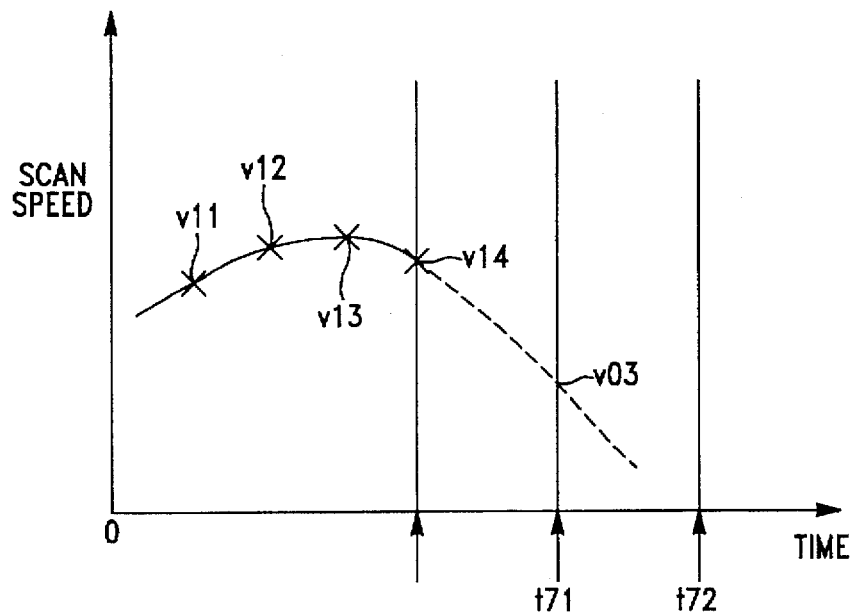
FIG. 31 explains speed estimation according to the fourth embodiment when the speed at scan end is estimated to be not less than zero.

In FIG. 31, t71 is the last image change point in the image data; i.e., the time judged as scan end, and t72 is the time at which the input button is switched OFF. Also, the curve indicated by a solid line is the speed change estimated from each of the average speeds (sought by speed judgment means 225) v11, v12, ... immediately before scan end. Here, when the scan end speed is estimated based on the speed change immediately before scan end such that it is continuously linked to this speed change, the scanning speed at time t71, which is judged as scan end, is judged as speed v03 (dashed line in figure). Therefore, the speed change after scan end can be estimated accurately.

Figure 32:
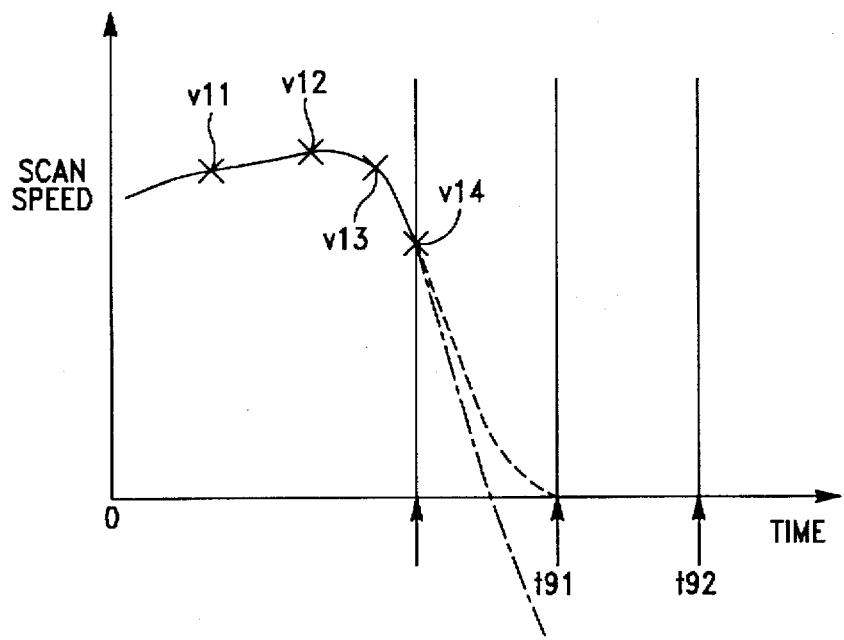
FIG. 32 explains speed estimation according to the fourth embodiment when the speed at scan end is estimated to be less than zero.

As described here, even in cases in which the scan end speed cannot be determined the same all the time, it is possible to estimate the speed at scan end from the speed change immediately before scan end, but if the speed change immediately before scan end is sudden, the speed at the scan end point may drop below 0 as shown in FIG. 32 (chained line in figure) when the speed at scan end is estimated based on that speed change. In FIG. 32, t92 is the time judged as the last image change point in the image data, i.e., scan end, and t92 is the time at which the input button is depressed. Also, the curve indicated by the solid line is the speed change estimated from each of the average speeds (as calculated by overall speed judgment device 225) v11, v12, ... immediately before scan end. In this case, the drop in speed from the average speed v13 to v14 is shown to be sudden.

However, since t91 is the last image change point after the input image, i.e., scan end, it is obvious that scanning is being performed at a speed greater than 0. Therefore, since it is judged that the sudden speed change is the cause of the estimated speed dropping below 0 at the scan end point, the scanning speed of image input member 100 is considered to be 0 at time t91 judged as scan end, and a speed is estimated that continuously links the 0 scanning speed at time t91 to the average speed v14 (dashed line in figure). By this means, the problem of having to correct the image at scan end corresponding to a speed of less than 0 is eliminated and the speed change at scan end can be accurately estimated.

Figure 33:
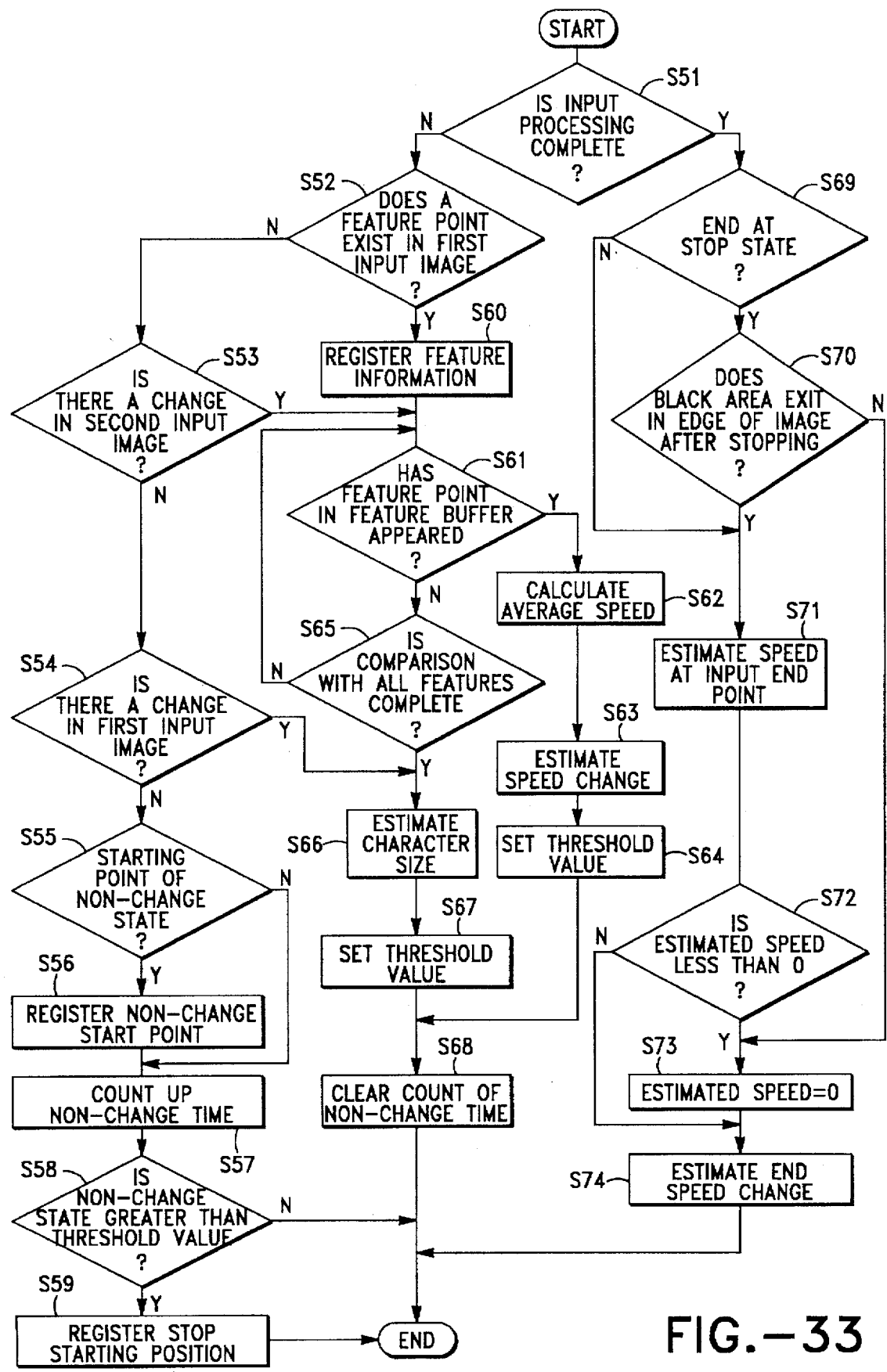
FIG. 33 is a flowchart explaining image processing according to the fourth embodiment.

FIG. 33 is a flowchart showing the above processing, and using this flowchart, the processing of the fourth embodiment is summarized below.

In FIG. 33, the scan end judgment processing is shown in the sequence of steps S51 to S59. First, at step S51, a determination is made whether or not input processing has ended, that is, whether or not the input button has been released. If input processing has not ended, control within the speed detector 240 then passes to step S52 where it is judged whether or not there is a feature point in the image data (first input image) from first sensor 101. If there is no feature point, then it is judged whether or not there is a change in the image data (second input image) from second sensor 102 (step S53), and if there is a change, it indicates that image input member is moving, but if there is no change, it is possible that it has stopped. Therefore, if there is no change in the second input image, it is judged whether or not there is a change in the first input image (step S54). If it is judged there is no change in the first input image in this step S53, there is a strong possibility that image input member 100 has stopped, and then it is judged if this point is the starting point of a non-change state (step S55), and if it is a starting point, this point is registered or initialized as a non-change state starting point (step S56) and the non-change time is counted up from this point (step S57).

However, if the point is judged in step S55 as not being the starting point of a non-change state (if a non-change state starting point is already registered and still in effect), then the non-change time is already counted up to that point and the non-change time continues to increment (step S57). Also, it is judged whether or not the count number is greater than a previously set threshold value Δts (step S58), and if the count number is greater than the threshold value Δts, then the starting point of said non-change state is registered as a possible scan end point (step S59).

The threshold value Δts is set, as described in connection with the first embodiment above, corresponding to the scanning speed of the perceived image data input and the size of the characters being input, and these threshold values are used (one or the other or a threshold value that considers both). The threshold value corresponding to the scanning speed of this image data input is set, as shown in step S62 to step S64 in the flowchart in FIG. 33, by calculating the average speed of image input scanning, estimating the speed change and then setting a threshold value corresponding to this scanning speed. Further, the threshold value corresponding to the size of the characters being input is determined by setting a threshold value corresponding to the character size after estimating the character size as shown in step S66 and step S67.

Calculation of average speed (step S62) is done in a case in which a feature point is judged to exist in the first input image (step S52), for example, by loading the feature information of the first input image in feature buffer 223 (step S60) and then judging whether or not the feature point of the first input image loaded in feature buffer 223 appears in the second input image (step S61). If so, then the average speed is calculated based on that (step S62). Further, estimation of character size (step S66) is done in a case in which a feature point is judged to exist in the first input image (step S52), for example, by loading the feature information of the first input image in feature buffer 223 (step S60) and then judging whether or not the feature point of the first input image loaded in feature buffer 223 appears in the second input image (step S61), and then after comparing with all of the features (step S65), the character size is estimated (step S66). When these threshold values are set, counting of the non-change time is cleared (step S68).

Next, when it is judged (step S51) that input processing has ended (input button has been released), it is judged whether or not input processing ended with the scan stop state (step S69), and if input processing did end with the scan stop state, control thereafter passes to step S70 in which it is then judged whether or not a black area exists at the periphery of the image after the time judged as the scan end point (step S70). If it is judged that a black area does not exist in the edge (see FIGS. 28 or 52), then it is judged that scanning by image input member 100 stopped while it was in contact with the paper, in which case, as explained in FIG. 29, or, the scan end speed at the scan end point is considered to be 0 (step S73). If judged to be a white image or a black area is judged to exist in the edge (see FIGS. 27, 51 and FIGS. 30, 53) in the judgment in step S70, the speed at the scan end point is estimated as explained in FIGS. 31 and 32 (step S71), and this estimation of the speed at the scan end point is judged whether or not it is less than 0 (step S72). If the speed is not less than 0 in this judgment when the speed at the scan end point is estimated, then the speed change at scan end is estimated as shown by the curve indicated by the dashed line in FIG. 31 (step S74). If the speed is less than 0 when the speed at the scan end point is estimated (see FIG. 32), then the scan end speed at the scan end point is assumed to be 0 (step S73), after which the speed change at scan end is estimated as shown by the curve indicated by the dashed line in FIG. 32 (step S74).

As explained above, image data input after the scan end point is not data that was intended to be input and can be considered unnecessary data. Therefore, it is not necessary to correct image data input after this scan end point. Therefore, the image data after the respective positions (times t71, t81, t91) judged to be scan end in FIGS. 27 or 51, FIGS. 28 or 52, and FIG. 29 is data not required as image data, and the image data during this period is not stored in the buffer or subjected to correction. Therefore, the distortion correction processing time at scan end can be shortened and accurate distortion correction processing is possible.

Fifth Embodiment

Figure 34:
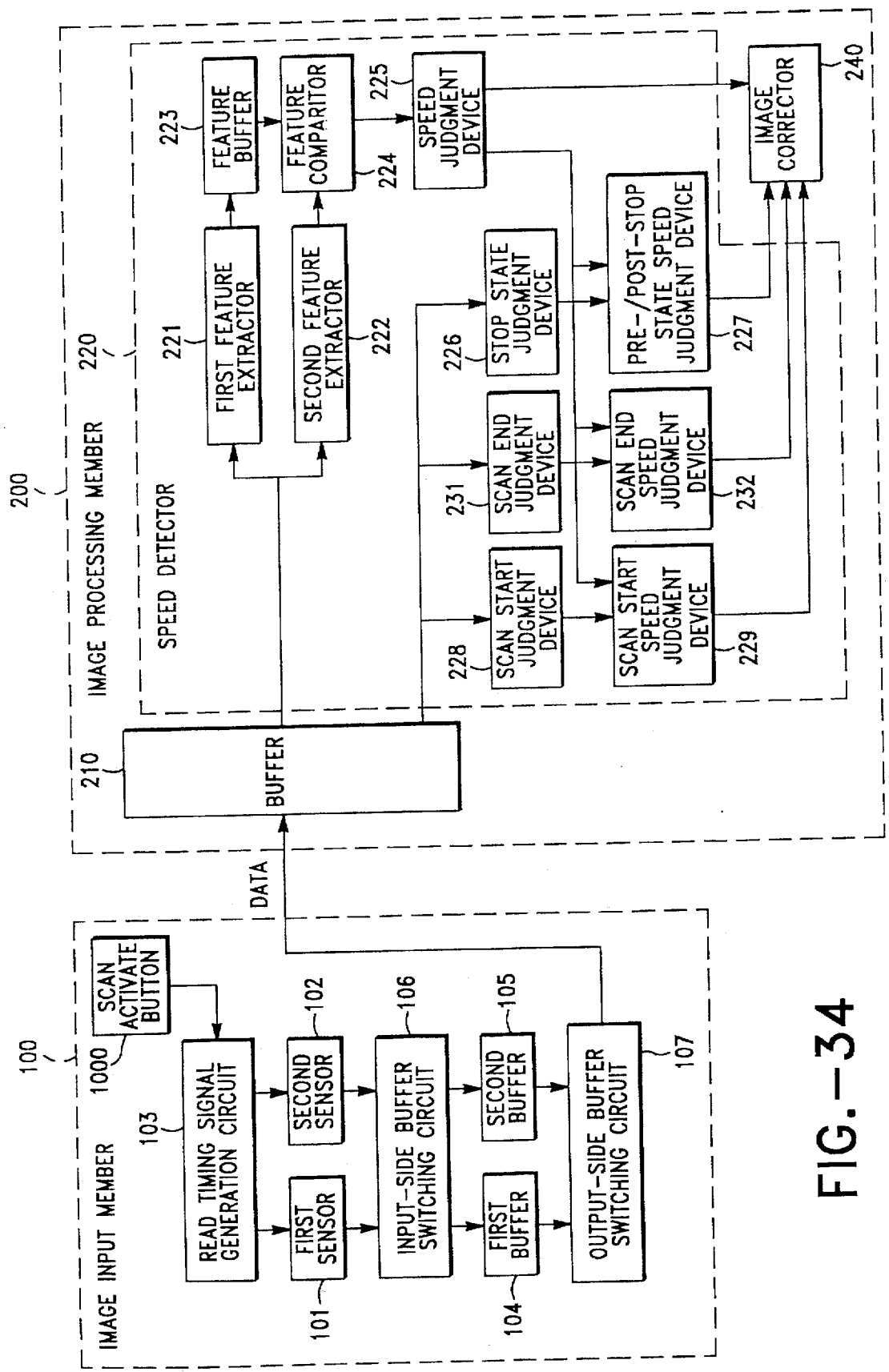
FIG. 34 is a block diagram of the fifth embodiment of the present invention.

The fifth embodiment is explained below. This fifth embodiment is a configuration that combines the teachings of the first embodiment, the second embodiment and the fourth embodiment. FIG. 34 is a representative block diagram of an image scanning and processing device incorporating such features in unison. By employing this kind of configuration, in a case in which scanning is temporarily stopped part way through scanning by image input member 100 and then scanning is started again, the scan stop state can be accurately judged by stop state judgment device 226 and the scanning speed before and after stopping is estimated based on information developed from the stop state judgment device 226 and the overall speed judgment device 225, thus making it possible to estimate a speed near the actual scanning state and generate a distortion-free image for operation in which scanning is stopped and then scanning is started again part way through scanning.

In addition to being able to reliably judge that scanning by image input member 100 has started at the start of scanning, it is also possible to reliably estimate the scanning speed at scan start by judging the scanning speed at the start of scanning by image input member 100 by means of scan start speed judgment device 229 based on information from this scan start judgment device 228 and information calculated by the overall speed judgment device 225. Further, because distortion correction is not performed on image data input before scanning has started, processing time is reduced since unnecessary correction processing is not performed, thus facilitating high precision correction.

Also, in addition to being able to reliably judge by scan end judgment device 231 that scanning by image input member 100 has ended at the end of scanning, it is also possible to reliably estimate the scanning speed at scan end by judging the scanning speed at the end of scanning by image input member 100 by means of scan end speed judgment device 232 based on information from this scan end judgment device 231 and information from the overall speed judgment device 225. Further, since distortion correction is not performed on image data input after scanning has ended, processing time is reduced since unnecessary correction processing is not performed, thus facilitating high precision correction.

Figure 35:
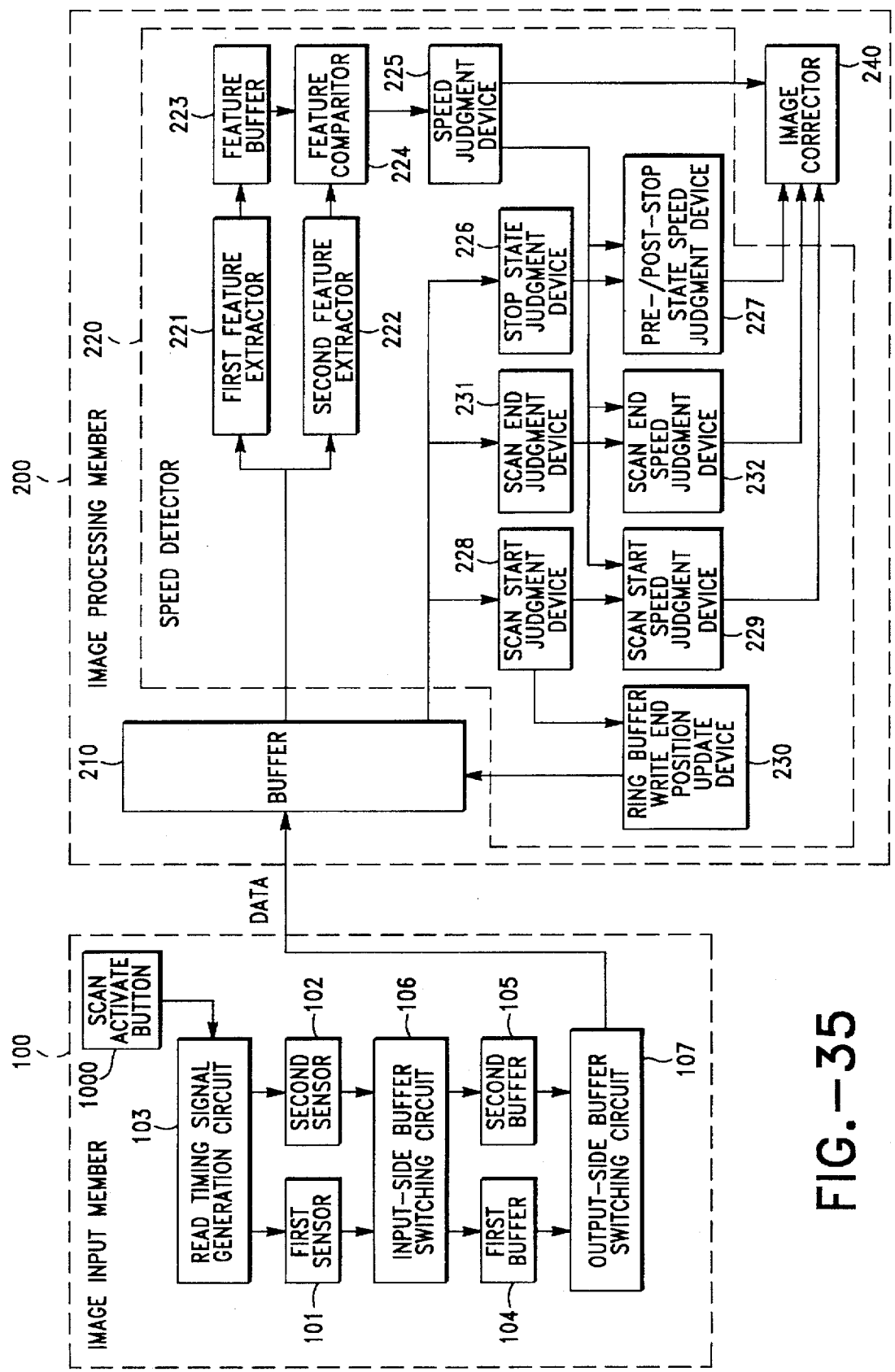
FIG. 35 is a block diagram of the fifth embodiment of the present invention modified to accommodate a ring buffer write end position update apparatus.

Moreover, FIG. 35 shows a configuration that adds a ring buffer write end position update device 230, which was explained in the third embodiment, to the configuration of the fifth preferred embodiment shown in FIG. 34. In this case, buffer 210 comprises a ring buffer. Since this ring buffer write end position update device 230 was explained in the third embodiment, a detailed explanation will be omitted here. Note, though, that this ting buffer write end position update device 230 is added, memory resources can be easily conserved through employment of a write end position memory pointer into the ring buffer which is continually updated until a scan start event has been perceived by the speed detector 220 component of the present embodiment. Therefore, the buffer can be effectively utilized and solves the problem of the buffer becoming full prematurely even in cases in which a scan stop state continues for a long period before scan start.

While the invention has been described in conjunction with several specifically preferred embodiments, it is evident to those skilled in the art that many further alternatives, modifications and variations will be apparent in light of the forgoing description. Thus, the invention described herein is intended to embrace all such alternative, modifications, applications and variations as may fall within the spirit and scope of the appended claims.

What is claimed is:

1. An image acquisition and processing device, comprising:
    an image input member for acquiring character and graphical information from a document, said image input member comprising:
        a scan activation means for selectively activating and deactivating scanning operations within said image input member; and
        spaced apart first and second sensors for reading the character and graphical information when illuminated by a light source and converting the read-in information into corresponding first and second image data streams in response to said scan activation means; and
    an image processing member in communication with said image input member, said image processing member comprising:

a buffer in communication with said image input member for receiving and storing the first and second image data streams;

an overall speed judgment device in communication with said buffer for extracting image features for the first and second image data streams, comparing the extracted features for the first and second image data streams and obtaining correlation and time-offset information therefrom, and generating overall scanning speed in response to the obtained correlation and time-offset information;

a stop state judgment device in communication with said buffer for detecting when said image input member is in a scan stop state with said scan activation means activating scan operations, and determining a scan stop time interval if the scan stop state is so detected;

a pre/post stop state speed judgment device in communication with said overall speed judgment and stop state judgment devices for generating scanning speeds immediately prior to and after the scan stop time interval when the scan stop state is detected based on the overall scanning speed generated by said overall speed judgment device; and an image corrector in communication with said overall speed judgment device and said pre/post stop state speed judgment device for correcting scanning distortion present in one of the stored image data streams based on the scanning speeds generated by said pre/post stop state speed judgment and overall speed judgment devices.

2. The image acquisition and processing device of claim 1, wherein said stop state judgment device observes temporal changes in at least one of said image data streams and determines that said image input member is in the scan stop state when no temporal changes have been detected for at least a predetermined time period.

3. The image acquisition and processing device of claim 2, wherein the predetermined time period is based on the overall scanning speed prior to detection of the scan stop state.

4. The image acquisition and processing device of claim 2, wherein the predetermined time period is based on relative character size of images contained within said first and second image data streams.

5. The image acquisition and processing device of claim 2, wherein the predetermined time period is based on the overall scanning speed prior to detection of the scan stop state and relative character size of images contained within said first and second image data streams.

6. The image acquisition and processing device of claim 2, wherein the predetermined time period ranges from approximately 100 msec to 200 msec.

7. The image acquisition and processing device of claim 1, wherein said pre/post stop state speed judgment device estimates the scanning speed immediately prior to the scan stop state based on previously calculated overall scanning speeds generated by said overall speed judgment device and estimates the scanning speed immediately after the scan stop state based on the estimated scanning speed immediately prior to the scan stop state.

8. The image acquisition and processing device of claim 7, wherein said pre/post stop state speed judgment device continuously links the scanning speed immediately prior to the scan stop state to a scanning speed at the start of the scan stop time interval when the estimated scanning speed immediately prior to the scan stop state is less than zero, and discontinuously links the scanning speed immediately prior to the scan stop state to the scanning speed at the start of the scan stop time interval when the estimated scanning speed immediately prior to the scan stop state is greater than zero.

9. The image acquisition and processing device of claim 7, wherein said pre/post stop state speed judgment device continuously links the scanning speed immediately after the scan stop state to a scanning speed at the end of the scan stop time interval.

10. The image acquisition and processing device of claim 1, said image processing member further comprising:

a scan start judgment device in communication with said buffer for detecting when said image input member has commenced scanning movement with said scan activation means activating scan operations, and generating a scan start event if scanning movement has been so detected; and a scan start speed judgment device in communication with said scan start judgment device, said overall speed judgment device, and said image corrector for generating a scanning speed at the scan start event generated by said scan start judgment device; and wherein said image corrector corrects scanning distortion present in one of the stored image data streams based on the scanning speeds generated by said pre/post stop state speed judgment, said scan start speed judgment and said overall speed judgment devices.

11. The image acquisition and processing device of claim 10, wherein said scan start judgment device observes temporal changes in the first and second image data streams and determines that a scan start event has occurred when there is a change in either image data stream.

12. The image acquisition and processing device of claim 11, wherein said scan start judgment device observes temporal changes in the first and second image data streams and determines that a scan start event has not occurred when a black region is perceived within a periphery of either sensor read area when a change has been detected within either of the image data streams.

13. The image acquisition and processing device of claim 11, wherein said scan start speed judgment device estimates a scanning speed at the scan start event based on an overall scanning speed calculated by said overall speed judgment device immediately after the scan start event and the input image prior to the scan start event.

14. The image acquisition and processing device of claim 13, wherein said scan start speed judgment devices assumes the scanning speed at the scan start event to be zero when a black region is perceived in the input image prior to the scan start event which does not extend to a periphery of either sensor read area.

15. The image acquisition and processing device of claim 13, wherein said scan start speed judgment device estimates the scanning speed at the scan start event based on an overall scanning speed calculated by said overall speed judgment device immediately after the scan start event when the input image prior to the scan start event is either entirely white or contains a black region extending to a periphery of either sensor read area.

16. The image acquisition and processing device of claim 15, wherein said scan start speed judgment device assumes the scanning speed at the scan start event to be zero when the estimated scanning speed at the scan start event is less than zero.

17. The image acquisition and processing device of claim 10, wherein said buffer comprises a ting buffer; and wherein said image processing member further comprises a ring buffer write end position update device in communication with said scan start event device and said ring buffer for manipulating a write end address of said ring buffer when image data from either said first and second image data streams is deposited in said ring buffer and continually updating the write end address until a scan start event has been generated by said scan start judgment device.

18. The image acquisition and processing device of claim 1, said image processing member further comprising:
   a scan end judgment device in communication with said buffer for detecting when said image input member has terminated scanning movement with said scan activation means activating scan operations, and generating a scan end event if no scanning movement has been so detected; and
   a scan end speed judgment device in communication with said scan end judgment device, said overall speed judgment device, and said image corrector for generating a scanning speed at the scan end event generated by said scan end judgment device; and
   wherein said image corrector corrects scanning distortion present in one of the stored image data streams based on the scanning speeds generated by said pre/post stop state speed judgment, said scan end speed judgment, and said overall speed judgment devices.

19. The image acquisition and processing device of claim 18, wherein said scan end judgment device observes temporal changes in at least one of said image data streams and determines that said image input member is in the scan end state when no temporal changes have been detected for at least a second predetermined time period.

20. The image acquisition and processing device of claim 19, wherein said scan end judgment device determines the scan end event to occur at a time period immediately prior to detection of a black region at a periphery of either sensor read area, even when subsequent temporal changes to either image data stream has been detected.

21. The image acquisition and processing device of claim 18, wherein said scan start speed judgment device estimates a scanning speed at the scan end event based on an overall scanning speed calculated by said overall speed judgment device immediately before the scan start event and the input image after the scan end event.

22. The image acquisition and processing device of claim 21, wherein said scan end speed judgment devices assumes the scanning speed at the scan end event to be zero when a black region is perceived in the input image after the scan end event which does not extend to a periphery of either sensor read area.

23. The image acquisition and processing device of claim 21, wherein said scan end speed judgment device estimates the scanning speed at the scan end event based on an overall scanning speed calculated by said overall speed judgment device immediately before the scan end event when the input image after the scan end event is either entirely white or contains a black region extending to a periphery of either sensor read area.

24. The image acquisition and processing device of claim 23, wherein said scan end speed judgment device assumes the scanning speed at the scan end event to be zero when the estimated scanning speed at the scan end event is less than zero.

25. The image acquisition and processing device of claim 10, said image processing member further comprising:
   a scan end judgment device in communication with said buffer for detecting when said image input member has terminated scanning movement with said scan activation means activating scan operations, and generating a scan end event if no scanning movement has been so detected; and
   a scan end speed judgment device in communication with said scan end judgment device, said overall speed judgment device, and said image corrector for generating a scanning speed at the scan end event generated by said scan end judgment device; and
   wherein said image corrector corrects scanning distortion present in one of the stored image data streams based on the scanning speeds generated by said pre/post stop state speed judgment, said scan end speed judgment, and said overall speed judgment devices.

26. The image acquisition and processing device of claim 25 wherein said scan end judgment device observes temporal changes in at least one of said image data streams and determines that said image input member is in the scan end state when no temporal changes have been detected for at least a second predetermined time period.

27. The image acquisition and processing device of claim 26, wherein said scan end judgment device determines the scan end event to occur at a time period immediately prior to detection of a black region at a periphery of either sensor read area, even when subsequent temporal changes to either image data stream has been detected.

28. The image acquisition and processing device of claim 25, wherein said scan start speed judgment device estimates a scanning speed at the scan end event based on an overall scanning speed calculated by said overall speed judgment device immediately before the scan start event and the input image after the scan end event.

29. The image acquisition and processing device of claim 28, wherein said scan end speed judgment devices assumes the scanning speed at the scan end event to be zero when a black region is perceived in the input image after the scan end event which does not extend to a periphery of either sensor read area.

30. The image acquisition and processing device of claim 28, wherein said scan end speed judgment device estimates the scanning speed at the scan end event based on an overall scanning speed calculated by said overall speed judgment device immediately before the scan end event when the input image after the scan end event is either entirely white or contains a black region extending to a periphery of either sensor read area.

31. The image acquisition and processing device of claim 30, wherein said scan end speed judgment device assumes the scanning speed at the scan end event to be zero when the estimated scanning speed at the scan end event is less than zero.

32. An image acquisition and processing device, comprising:
   an image input member for acquiring character and graphical information from a document, said image input member comprising:
      a scan activation means for selectively activating and deactivating scanning operations within said image input member; and
      spaced apart first and second sensors for reading the character and graphical information when illuminated by a light source and converting the read-in information into corresponding first and second image data streams in response to said scan activation means; and
   an image processing member in communication with said image input member, said image processing member comprising:

a buffer in communication with said image input member for receiving and storing the first and second image data streams;

an overall speed judgment device in communication with said buffer for extracting image features for the first and second image data streams, comparing the extracted features for the first and second image data streams and obtaining correlation and time-offset information therefrom, and generating overall scanning speed in response to the obtained correlation and time-offset information;

a scan start judgment device in communication with said buffer for detecting when said image input member has commenced scanning movement with said scan activation means activating scan operations, and generating a scan start event if scanning movement has been so detected; and a scan start speed judgment device in communication with said scan start judgment device, said overall speed judgment device for generating a scanning speed at the scan start event generated by said scan start judgment device; and an image corrector in communication with said overall speed judgment device and said scan start speed judgment device for correcting scanning distortion present in one of the stored image data streams based on the scanning speeds generated by said scan start speed judgment and overall speed judgment devices.

33. The image acquisition and processing device of claim 32, wherein said scan start judgment device observes temporal changes in the first and second image data streams and determines that a scan start event has occurred when there is a change in either image data stream.

34. The image acquisition and processing device of claim 33, wherein said scan start judgment device observes temporal changes in the first and second image data streams and determines that a scan start event has not occurred when a black region is perceived within a periphery of either sensor read area when a change has been detected within either of the image data streams.

35. The image acquisition and processing device of claim 33, wherein said scan start speed judgment device estimates a scanning speed at the scan start event based on an overall scanning speed calculated by said overall speed judgment device immediately after the scan start event and the input image prior to the scan start event.

36. The image acquisition and processing device of claim 35, wherein said scan start speed judgment devices assumes the scanning speed at the scan start event to be zero when a black region is perceived in the input image prior to the scan start event which does not extend to a periphery of either sensor read area.

37. The image acquisition and processing device of claim 35, wherein said scan start speed judgment device estimates the scanning speed at the scan start event based on an overall scanning speed calculated by said overall speed judgment device immediately after the scan start event when the input image prior to the scan start event is either entirely white or contains a black region extending to a periphery of either sensor read area.

38. The image acquisition and processing device of claim 37, wherein said scan start speed judgment device assumes the scanning speed at the scan start event to be zero when the estimated scanning speed at the scan start event is less than zero.

39. The image acquisition and processing device of claim 32, wherein said buffer comprises a ring buffer; and wherein said image processing member further comprises a ring buffer write end position update device in communication with said scan start event device and said ring buffer for manipulating a write end address of said ring buffer when image data from either said first and second image data streams is deposited in said ring buffer and continually updating the write end address until a scan start event has been generated by said scan start judgment device.

40. The image acquisition and processing device of claim 32, said image processing member further comprising:

a scan end judgment device in communication with said buffer for detecting when said image input member has terminated scanning movement with said scan activation means activating scan operations, and generating a scan end event if no scanning movement has been so detected; and a scan end speed judgment device in communication with said scan end judgment device, said overall speed judgment device, and said image corrector for generating a scanning speed at the scan end event generated by said scan end judgment device; and wherein said image corrector corrects scanning distortion present in one of the stored image data streams based on the scanning speeds generated by said pre/post stop state speed judgment, said scan end speed judgment, and said overall speed judgment devices.

41. The image acquisition and processing device of claim 40 wherein said scan end judgment device observes temporal changes in at least one of said image data streams and determines that said image input member is in the scan end state when no temporal changes have been detected for at least a second predetermined time period.

42. The image acquisition and processing device of claim 41, wherein said scan end judgment device determines the scan end event to occur at a time period immediately prior to detection of a black region at a periphery of either sensor read area, even when subsequent temporal changes to either image data stream has been detected.

43. The image acquisition and processing device of claim 40, wherein said scan start speed judgment device estimates a scanning speed at the scan end event based on an overall scanning speed calculated by said overall speed judgment device immediately before the scan start event and the input image after the scan end event.

44. The image acquisition and processing device of claim 43, wherein said scan end speed judgment devices assumes the scanning speed at the scan end event to be zero when a black region is perceived in the input image after the scan end event which does not extend to a periphery of either sensor read area.

45. The image acquisition and processing device of claim 43, wherein said scan end speed judgment device estimates the scanning speed at the scan end event based on an overall scanning speed calculated by said overall speed judgment device immediately before the scan end event when the input image after the scan end event is either entirely white or contains a black region extending to a periphery of either sensor read area.

46. The image acquisition and processing device of claim 45, wherein said scan end speed judgment device assumes the scanning speed at the scan end event to be zero when the estimated scanning speed at the scan end event is less than zero.

47. An image acquisition and processing device, comprising:

an image input member for acquiring character and graphical information from a document, said image input member comprising:
- a scan activation means for selectively activating and deactivating scanning operations within said image input member; and
- spaced apart first and second sensors for reading the character and graphical information when illuminated by a light source and converting the read-in information into corresponding first and second image data streams in response to said scan activation means; and an image processing member in communication with said image input member, said image processing member comprising:
- a buffer in communication with said image input member for receiving and storing the first and second image data streams;
- an overall speed judgment device in communication with said buffer for extracting image features for the first and second image data streams, comparing the extracted features for the first and second image data streams and obtaining correlation and time-offset information therefrom, and generating overall scanning speed in response to the obtained correlation and time-offset information;
- a scan end judgment device in communication with said buffer for detecting when said image input member has terminated scanning movement with said scan activation means activating scan operations, and generating a scan end event if no scanning movement has been so detected; and
- a scan end speed judgment device in communication with said scan end judgment device and said overall speed judgment device for generating a scanning speed at the scan end event generated by said scan end judgment device; and
- an image corrector in communication with said overall speed judgment device and said scan end speed judgment device for correcting scanning distortion present in one of the stored image data streams based on the scanning speeds generated by said scan end speed judgment and overall speed judgment devices.

48. The image acquisition and processing device of claim 47 wherein said scan end judgment device observes temporal changes in at least one of said image data streams and determines that said image input member is in the scan end state when no temporal changes have been detected for at least a second predetermined time period.

49. The image acquisition and processing device of claim 48, wherein said scan end judgment device determines the scan end event to occur at a time period immediately prior to detection of a black region at a periphery of either sensor read area, even when subsequent temporal changes to either image data stream has been detected.

50. The image acquisition and processing device of claim 47, wherein said scan start speed judgment device estimates a scanning speed at the scan end event based on an overall scanning speed calculated by said overall speed judgment device immediately before the scan start event and the input image after the scan end event.

51. The image acquisition and processing device of claim 50, wherein said scan end speed judgment device assumes the scanning speed at the scan end event to be zero when a black region is perceived in the input image after the scan end event which does not extend to a periphery of either sensor read area.

52. The image acquisition and processing device of claim 50, wherein said scan end speed judgment device estimates the scanning speed at the scan end event based on an overall scanning speed calculated by said overall speed judgment device immediately before the scan end event when the input image after the scan end event is either entirely white or contains a black region extending to a periphery of either sensor read area.

53. The image acquisition and processing device of claim 52, wherein said scan end speed judgment device assumes the scanning speed at the scan end event to be zero when the estimated scanning speed at the scan end event is less than zero.

54. A method for acquiring and processing images presented on a document, comprising the steps of:
- (A) scanning at least one document image into a plurality of image data streams when a scan activation button of an image input member is depressed;
- (B) storing the image data streams into a buffer;
- (C) extracting image features form the stored image data streams;
- (D) comparing the extracted image features of the stored image data streams;
- (E) obtaining correlation and time-offset information based on the extracted image features compared in said comparing step (D);
- (F) calculating an overall scanning speed based on the correlation and time-offset information obtained in said obtaining step (E);
- (G) detecting a scan stop event based on the stored image data streams when the scan activation button of the image input member is depressed;
- (H) determining a scan stop time interval if the scan stop is detected in said detecting step (G);
- (I) estimating scanning speeds immediately before and after the scan stop time interval determined in said determining step (H), based on the overall scanning speed calculated in said calculating step (F), when the scan stop event is detected in said detecting step (G);
- (J) detecting a scan start event based on the stored image data streams when the scan activation button of the image input member is depressed;
- (K) estimating a scanning speed at the scan start event based on the overall scanning speed calculated in said calculating step (F) when the scan start event in detected in said detecting step (J);
- (L) detecting a scan end event when the image input member has terminated scanning movement with the scan activation button released;
- (M) estimating a scanning speed at the scan end event based on the overall scanning speed calculated in said calculating step (F) when the scan end event is detected in said detecting step (L); and
- (N) correcting scanning distortion present in one of the stored image data streams based on the scanning speeds estimated in said estimating steps (I), (K), and (M) and the overall scanning speed calculated in said calculating step (F).

55. An article of manufacture, comprising a computer usable medium having readable code means embodied therein for processing a plurality of image data streams developed through scanning a document by an input image member having a scan activation button, the computer readable program code means comprising:
- (A) computer readable program code means for storing the image data streams into a buffer;

(B) computer readable program code means for extracting image features form the stored image data streams;

(C) computer readable program code means for comparing the extracted image features of the stored image data streams;

(D) computer readable program code means for obtaining correlation and time-offset information based on the extracted image features compared in said comparing means (C);

(E) computer readable program code means for calculating an overall scanning speed based on the correlation and time-offset information obtained in said obtaining means (D);

(F) computer readable program code means for detecting a scan stop event based on the stored image data streams when the scan activation button of the image input member is depressed;

(G) computer readable program code means for determining a scan stop time interval if the scan stop is detected in said detecting means (F);

(H) computer readable program code means for estimating scanning speeds immediately before and after the scan stop time interval determined in said determining means (G), based on the overall scanning speed calculated in said calculating means (E), when the scan stop event is detected in said detecting means (F);

(I) computer readable program code means for detecting a scan start event based on the stored image data streams when the scan activation button of the image input member is depressed;

(J) computer readable program code means for estimating a scanning speed at the scan start event based on the overall scanning speed calculated in said calculating means (E) when the scan start event in detected in said detecting means (I);

(K) computer readable program code means for detecting a scan end event when the image input member has terminated scanning movement with the scan activation button released;

(L) computer readable program code means for estimating a scanning speed at the scan end event based on the overall scanning speed calculated in said calculating means (E) when the scan end event is detected in said detecting means (K); and (M) computer readable program code means for correcting scanning distortion present in one of the stored image data streams based on the scanning speeds estimated in said estimating means (H), (J), and (L) and the overall scanning speed calculated in said calculating means (E).

* * * * *

UNITED STATES PATENT AND TRADEMARK OFFICE
CERTIFICATE OF CORRECTION

PATENT NO.     : 5,719,970
DATED          : February 17, 1998
INVENTOR(S)    : Mikio Aoki, et al.

It is certified that an error appears in the above identified patent and that said Letters Patent is hereby corrected as shown below:

Title page, item number 56, "Other Publications", change "July 23, 1995" to --July 28, 1995-- and change "Metod" to --Method--. before "Metod" insert --Process--.

Column 36, line 67, change "ting" to --ring--.

Signed and Sealed this

Sixteenth Day of June, 1998

*Attest:*

BRUCE LEHMAN

*Attesting Officer*   *Commissioner of Patents and Trademarks*